US010412538B2

(12) United States Patent
Moussavian et al.

(10) Patent No.: US 10,412,538 B2
(45) Date of Patent: *Sep. 10, 2019

(54) PARTIAL INFORMATION THROTTLE BASED ON COMPLIANCE WITH AN AGREEMENT

(71) Applicant: ETURI CORP., San Diego, CA (US)

(72) Inventors: Negeen Moussavian, San Diego, CA (US); Amir Moussavian, San Diego, CA (US); Mark Lewis, San Diego, CA (US); Godfrey Lawrence Duke, III, San Diego, CA (US)

(73) Assignee: ETURI CORPORATION, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/854,626

(22) Filed: Dec. 26, 2017

(65) Prior Publication Data

US 2018/0352369 A1 Dec. 6, 2018

Related U.S. Application Data

(63) Continuation of application No. 15/215,523, filed on Jul. 20, 2016, now Pat. No. 9,854,393, which is a
(Continued)

(51) Int. Cl.
*H04W 4/02* (2018.01)
*H04L 12/825* (2013.01)
(Continued)

(52) U.S. Cl.
CPC ............ *H04W 4/02* (2013.01); *G06F 16/955* (2019.01); *G06F 16/957* (2019.01); *H04L 43/08* (2013.01);
(Continued)

(58) Field of Classification Search
CPC ...................................................... G06Q 50/20
See application file for complete search history.

(56) References Cited

U.S. PATENT DOCUMENTS 5,835,722 A 11/1998 Bradshaw
5,949,415 A 9/1999 Lin
(Continued)

FOREIGN PATENT DOCUMENTS

EP 1090492 4/2001
EP 1271352 1/2003
(Continued)

OTHER PUBLICATIONS

International Search Report issued for PCT/US2013/049806, dated Nov. 7, 2013, 7 pages.
(Continued)

*Primary Examiner* — Abdullahi E Salad
(74) *Attorney, Agent, or Firm* — Sheppard, Mullin, Richter & Hampton LLP

(57) ABSTRACT

Partially reduces performance or features of a user's electronic device if the user does not comply with an agreement. An agreement may specify tasks or activities to be performed, such as homework or chores, or required results such as grades. Partial throttling of the device when the user is not in compliance with the agreement may include for example disabling a subset of the apps or services on the device, slowing down the device or selected applications, denying access to selected information sources, limiting audio volume or display resolution, or limiting time on activities such as web browsing. The device may remain usable, but with reduced features or performance. Throttling actions may also be based on location, schedule, or environmental conditions. The system may reward compliance with the agreement by increasing performance, by re-en-
(Continued)

abling previously disabled applications, or by providing direct rewards such as money or credits.

2 Claims, 47 Drawing Sheets

Related U.S. Application Data continuation-in-part of application No. 14/720,943, filed on May 25, 2015, now Pat. No. 9,660,923, which is a continuation of application No. 14/279,326, filed on May 16, 2014, now Pat. No. 9,043,462, which is a continuation of application No. 14/222,653, filed on Mar. 23, 2014, now Pat. No. 9,847,948, which is a continuation-in-part of application No. 13/568,135, filed on Aug. 7, 2012, now Pat. No. 8,706,872, and a continuation-in-part of application No. 13/568,138, filed on Aug. 7, 2012, now Pat. No. 8,966,064, said application No. 14/222,653 is a continuation-in-part of application No. 13/568,140, filed on Aug. 7, 2012, now Pat. No. 10,075,764.

(60) Provisional application No. 61/669,541, filed on Jul. 9, 2012.

(51) Int. Cl.
| | | |
|---|---|---|
| *H04L 12/851* | (2013.01) | |
| *G06F 17/30* | (2006.01) | |
| *H04L 29/08* | (2006.01) | |
| *G06F 16/955* | (2019.01) | |
| *G06F 16/957* | (2019.01) | |
| *H04L 12/26* | (2006.01) | |
| *H04W 88/02* | (2009.01) | |
| *H04W 4/04* | (2009.01) | |
| *H04W 4/80* | (2018.01) | |
| *H04W 4/40* | (2018.01) | |

(52) U.S. Cl.
CPC .......... *H04L 47/2425* (2013.01); *H04L 47/25* (2013.01); *H04L 67/22* (2013.01); *H04W 4/046* (2013.01); *H04W 4/40* (2018.02); *H04W 4/80* (2018.02); *H04W 88/02* (2013.01)

(56) References Cited

U.S. PATENT DOCUMENTS

| | | | |
|---|---|---|---|
| 5,987,506 A | 11/1999 | Carter | |
| 6,023,507 A | 2/2000 | Wookey | |
| 6,070,190 A | 5/2000 | Reps | |
| 6,195,622 B1 | 2/2001 | Altschuler | |
| 6,233,428 B1 | 5/2001 | Fryer | |
| 6,446,119 B1 | 9/2002 | Olah | |
| 6,691,067 B1 | 2/2004 | Ding | |
| 6,711,474 B1 | 3/2004 | Treyz | |
| 6,721,688 B1 | 4/2004 | Clarke | |
| 6,745,367 B1 | 6/2004 | Bates | |
| 6,754,664 B1 | 6/2004 | Bush | |
| 6,889,169 B2 | 5/2005 | Kirshenbaum | |
| 6,904,168 B1 | 6/2005 | Steinberg | |
| 6,978,303 B1 | 12/2005 | McCreesh | |
| 7,103,215 B2 | 9/2006 | Buzuloiu | |
| 7,185,015 B2 | 2/2007 | Kester | |
| 7,206,845 B2 | 4/2007 | Banning | |
| 7,237,024 B2 | 6/2007 | Toomey | |
| 7,290,278 B2 | 10/2007 | Cahill | |
| 7,383,333 B2 | 6/2008 | Philyaw | |
| 7,502,797 B2 | 3/2009 | Schran | |
| 7,577,739 B2 | 8/2009 | Donahue | |
| 7,797,270 B2 | 9/2010 | Kester | |
| 7,814,542 B1 | 10/2010 | Day | |
| 7,846,020 B2 | 12/2010 | Walker | |
| 7,870,189 B2 | 1/2011 | Philyaw | |
| 7,899,862 B2 | 3/2011 | Appelman | |
| 7,904,596 B1 | 3/2011 | Wang | |
| 7,925,780 B2 | 4/2011 | Philyaw | |
| 7,958,234 B2 | 6/2011 | Thomas | |
| 7,979,576 B2 | 7/2011 | Philyaw | |
| 8,010,037 B2 * | 8/2011 | Bannwolf | G09B 7/02 434/350 |
| 8,015,174 B2 | 9/2011 | Hubbard | |
| 8,020,209 B2 | 9/2011 | Kester | |
| 8,024,471 B2 | 9/2011 | Sinclair | |
| 8,046,250 B1 | 10/2011 | Cohen | |
| 8,078,724 B2 | 12/2011 | Wang | |
| 8,141,147 B2 | 3/2012 | Sinclair | |
| 8,150,817 B2 | 4/2012 | Kester | |
| 8,255,950 B1 | 8/2012 | Wick | |
| 8,281,037 B2 | 10/2012 | Julia | |
| 8,281,366 B1 | 10/2012 | McCorkendale | |
| 8,281,382 B1 | 10/2012 | Sanyal | |
| 8,285,249 B2 | 10/2012 | Baker | |
| 8,285,250 B2 | 10/2012 | Rubin | |
| 8,307,068 B2 | 11/2012 | Schuler | |
| 9,075,901 B2 | 7/2015 | Dawson | |
| 2001/0056544 A1 | 12/2001 | Walker | |
| 2002/0094111 A1 | 7/2002 | Puchek | |
| 2002/0099578 A1 | 7/2002 | Eicher | |
| 2002/0146667 A1 | 10/2002 | Dowdell | |
| 2002/0183644 A1 | 12/2002 | Levendowski | |
| 2002/0194008 A1 | 12/2002 | Yang | |
| 2003/0026424 A1 | 2/2003 | McGarrahan | |
| 2003/0074494 A1 | 4/2003 | Rene Salle | |
| 2003/0221118 A1 | 11/2003 | Walker | |
| 2004/0158631 A1 | 8/2004 | Chang | |
| 2005/0068961 A1 | 3/2005 | Raghunath | |
| 2006/0025282 A1 | 2/2006 | Redmann | |
| 2006/0052909 A1 | 3/2006 | Cherouny | |
| 2007/0220144 A1 | 9/2007 | Lovell | |
| 2007/0234380 A1 * | 10/2007 | Sahasrabudhe | G06F 21/35 725/25 |
| 2008/0080691 A1 | 4/2008 | Dolan | |
| 2008/0229233 A1 | 9/2008 | Blattner | |
| 2009/0174566 A1 | 7/2009 | Volk | |
| 2009/0327179 A1 | 12/2009 | Strassner | |
| 2010/0048272 A1 | 2/2010 | Koh | |
| 2010/0191561 A1 | 7/2010 | Jeng | |
| 2010/0216509 A1 | 8/2010 | Riemer | |
| 2010/0263055 A1 | 10/2010 | Habif | |
| 2010/0318642 A1 | 12/2010 | Dozier | |
| 2011/0046519 A1 | 2/2011 | Raheman | |
| 2011/0078767 A1 | 3/2011 | Cai et al. | |
| 2011/0082946 A1 | 4/2011 | Gopalakrishnan | |
| 2011/0202555 A1 | 8/2011 | Cordover | |
| 2012/0000011 A1 | 1/2012 | Grewall | |
| 2012/0011105 A1 | 1/2012 | Brock | |
| 2012/0034946 A1 * | 2/2012 | Skalicky | H04W 4/023 455/521 |
| 2012/0108200 A1 * | 5/2012 | Rubin | H04L 47/14 455/405 |
| 2012/0122066 A1 | 5/2012 | Dohring | |
| 2012/0130770 A1 | 5/2012 | Heffernan | |
| 2012/0143694 A1 | 6/2012 | Zargahi | |
| 2012/0202555 A1 | 8/2012 | Bergman | |
| 2012/0215328 A1 | 8/2012 | Schmelzer | |
| 2012/0237908 A1 | 9/2012 | Fitzgerald | |
| 2012/0239173 A1 | 9/2012 | Laikari | |
| 2012/0244879 A1 | 9/2012 | Freathy | |
| 2012/0250646 A1 | 10/2012 | Rubin | |
| 2012/0290950 A1 | 11/2012 | Rapaport | |
| 2012/0331113 A1 | 12/2012 | Jain | |
| 2013/0012160 A1 | 1/2013 | Rubin | |
| 2013/0013130 A1 | 1/2013 | Emam | |
| 2013/0065555 A1 | 3/2013 | Baker | |
| 2013/0067070 A1 | 3/2013 | Rowe | |
| 2013/0225151 A1 | 8/2013 | King | |
| 2013/0276055 A1 | 10/2013 | Jacobson | |
| 2013/0305158 A1 | 11/2013 | Vasquez | |
| 2013/0318005 A1 | 11/2013 | Bass | |
| 2014/0012878 A1 | 1/2014 | Moussavian | |

(56) References Cited

U.S. PATENT DOCUMENTS

| | | | |
|---|---|---|---|
| 2014/0012977 | A1 | 1/2014 | Moussavian |
| 2014/0024339 | A1 | 1/2014 | Dabbiere |
| 2014/0032023 | A1 | 1/2014 | Kumar |
| 2014/0038546 | A1 | 2/2014 | Neal |
| 2014/0255889 | A1 | 9/2014 | Grimes |
| 2014/0272894 | A1 | 9/2014 | Grimes |
| 2014/0344718 | A1 | 11/2014 | Rapaport |

FOREIGN PATENT DOCUMENTS

| | | |
|---|---|---|
| EP | 1376981 | 1/2004 |
| EP | 2239679 | 10/2010 |
| RU | 2326439 | 6/2008 |
| WO | 0198936 | 12/2001 |
| WO | 2002025415 | 3/2002 |
| WO | 2009059199 | 5/2009 |
| WO | 2010051455 | 5/2010 |
| WO | 2010102265 | 10/2010 |
| WO | 2011061412 | 5/2011 |

OTHER PUBLICATIONS

International Search Report issued for PCT/US2013/049809, dated Nov. 7, 2013, 7 pages.

International Search Report issued for PCT/US2013/049813, dated Oct. 24, 2013, 7 pages.

Karlsson, Magnus et al. "Triage: Performance Isolation and Differentiation for Storage Systems", Mar. 10, 2004, 24 pages.

Blei, David, "Probabilistic Topic Models", Communications of the ACM, vol. 55, dated Apr. 2012, pp. 77-84.

Bradley, M.M., & Lang, P.J. (1999). Affective norms for English words (ANEW): Instruction manual and affective ratings. Technical Report C-1, The Center for Research in Psychophysiology, University of Florida (49 pages).

European Search Report received in 13816695.4 dated Feb. 11, 2016 (7 pages).

Extended European Search Report received in 13816695.4, dated May 16, 2016, 13 pages.

International Search Report for PCT/US2015/021794, dated Jul. 2, 2015, 8 pages.

Kamps, Haje, Jan, "Flipd app forces you to put your iPhone away so you can get some work done," publishd Mar. 31, 2016, AOL, Inc. (7 pages).

Supplementary European Search Report filed in EP15769201.3, dated Sep. 28, 2017, 9 pages.

International Search Report and Written Opinion for PCT/US17/42903 dated Nov. 9, 2017.

International Search Report and Written Opinion for PCT/US17/52112 dated Nov. 17, 2017, 14 pages.

International Search Report issued for PCT/US2013/049809, dated Oct. 31, 2013, 7 pages.

Extended European Search Report received in 13816695.4 dated May 20, 2016 (13 pages).

International Preliminary Report on Patentability filed in PCT/US2015/021794, dated Oct. 6, 2016, 7 pages.

International Search Report issued for PCT/US2017/42898, dated Nov. 9, 2017, 7 pages.

International Search Report issued for PCT/US2017/52112, dated Nov. 17, 2017, 13 pages.

* cited by examiner

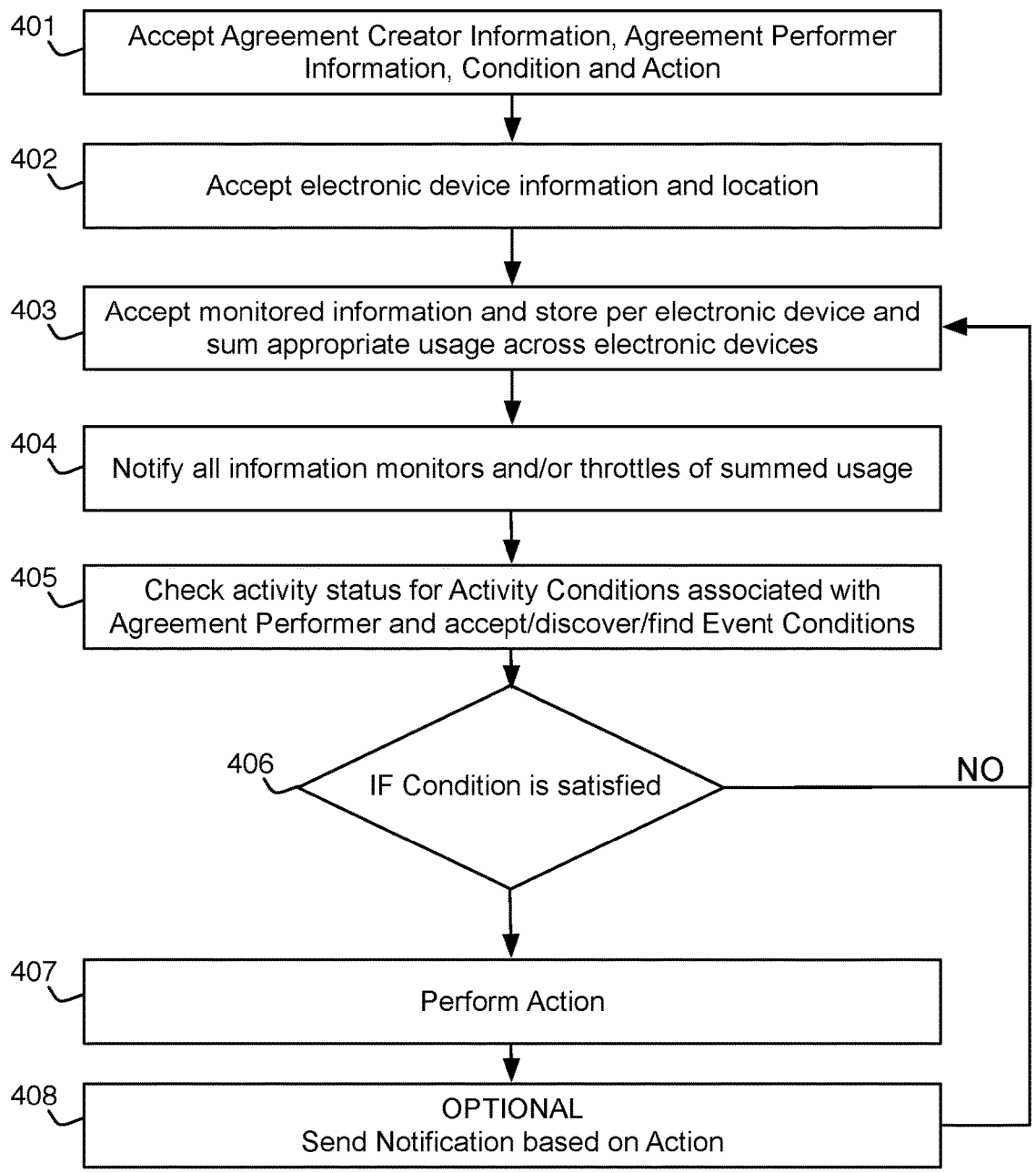

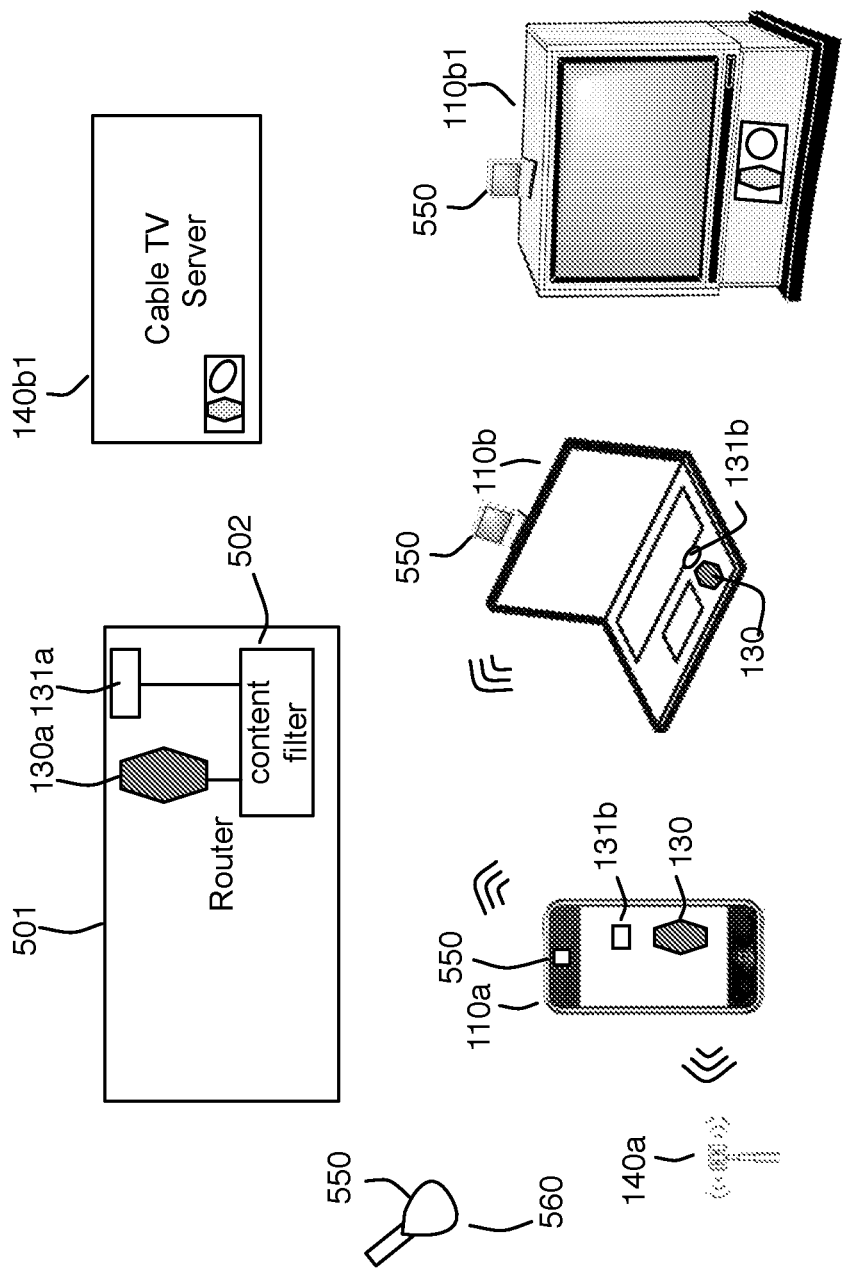

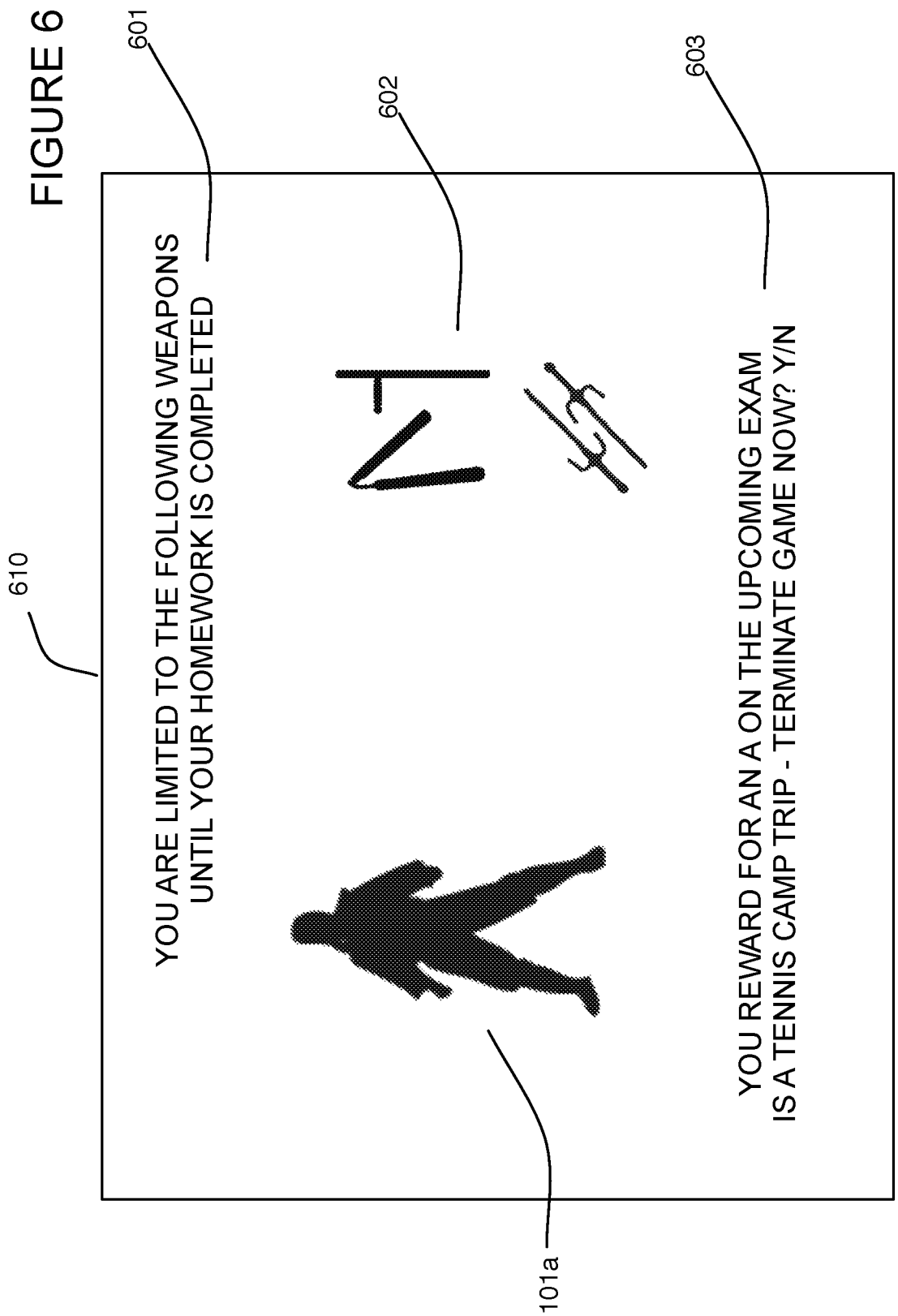

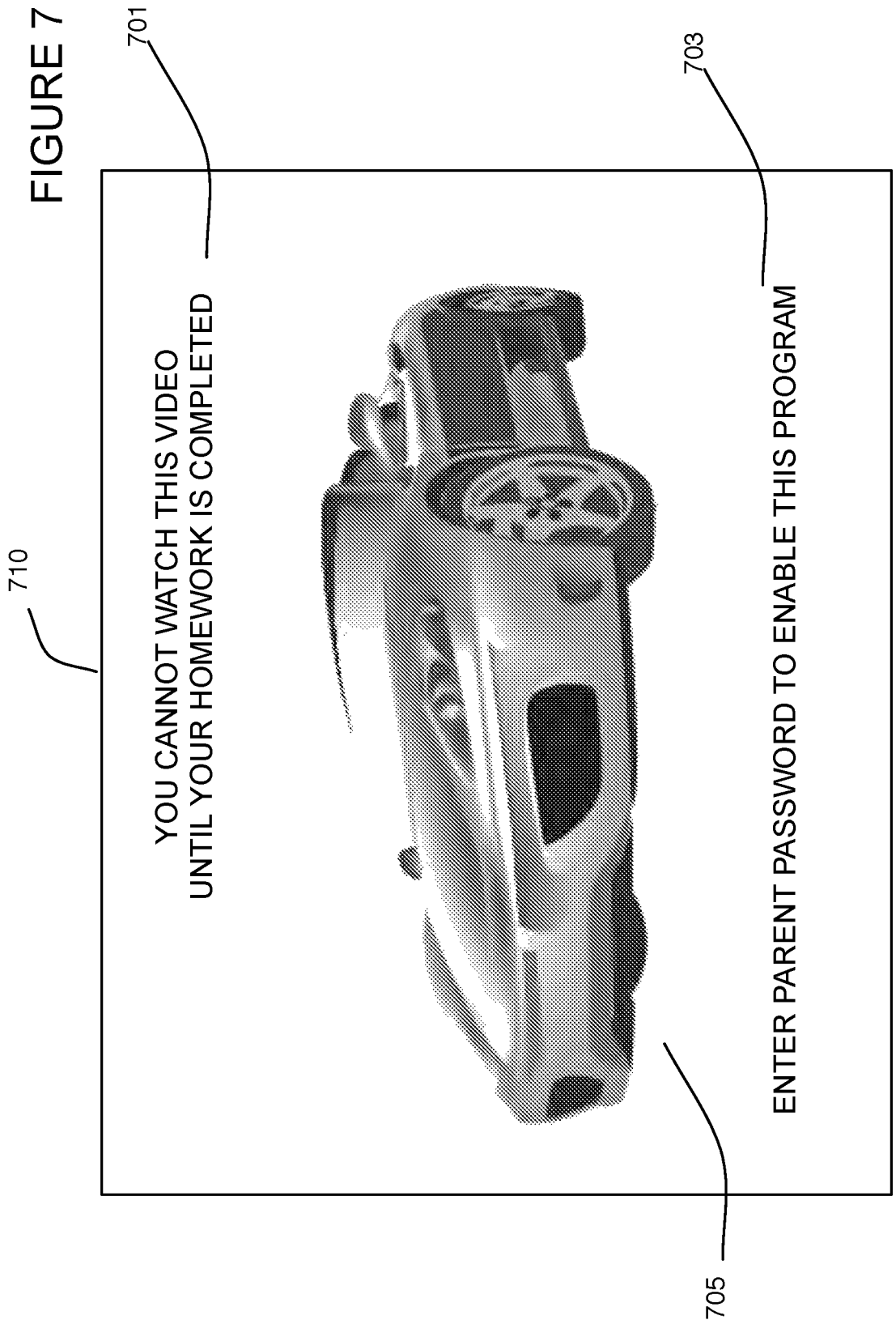

FIGURE 18
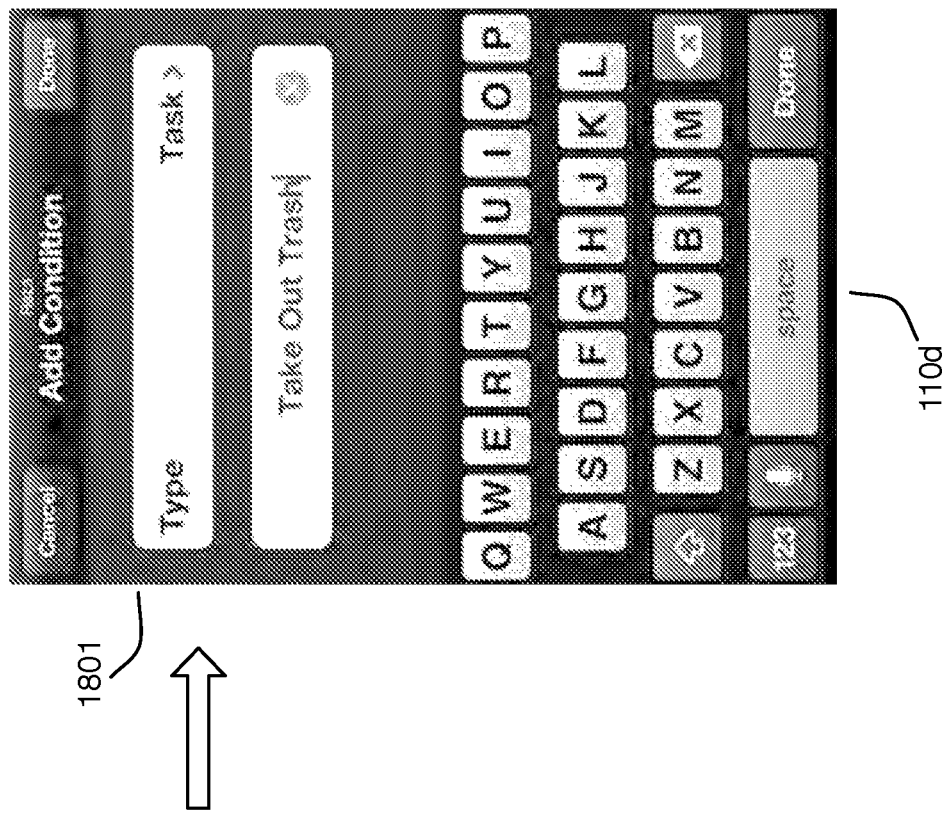
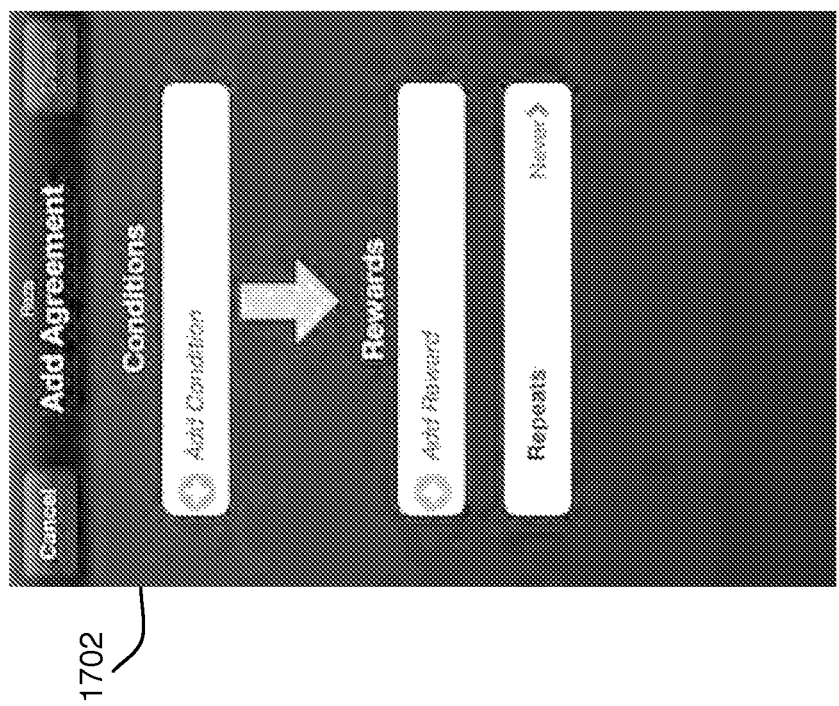

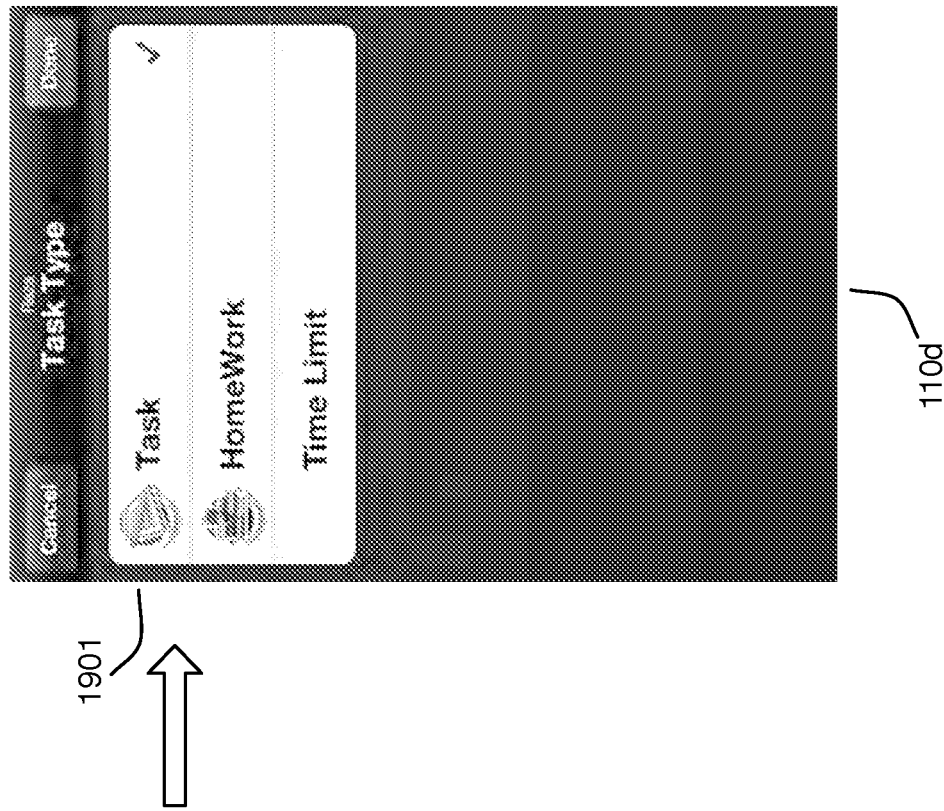
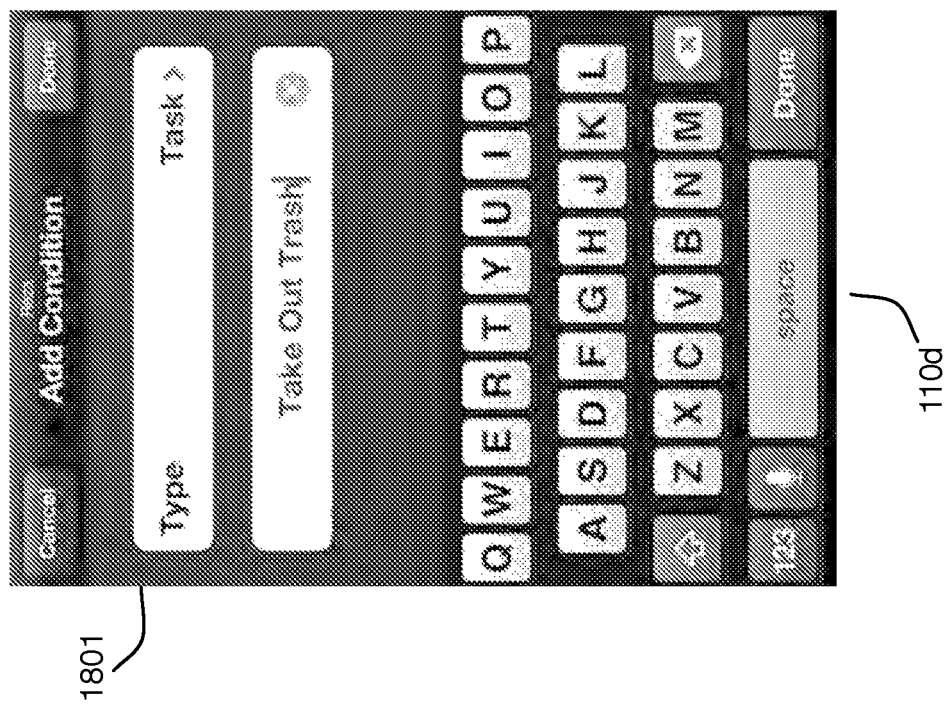
FIGURE 19

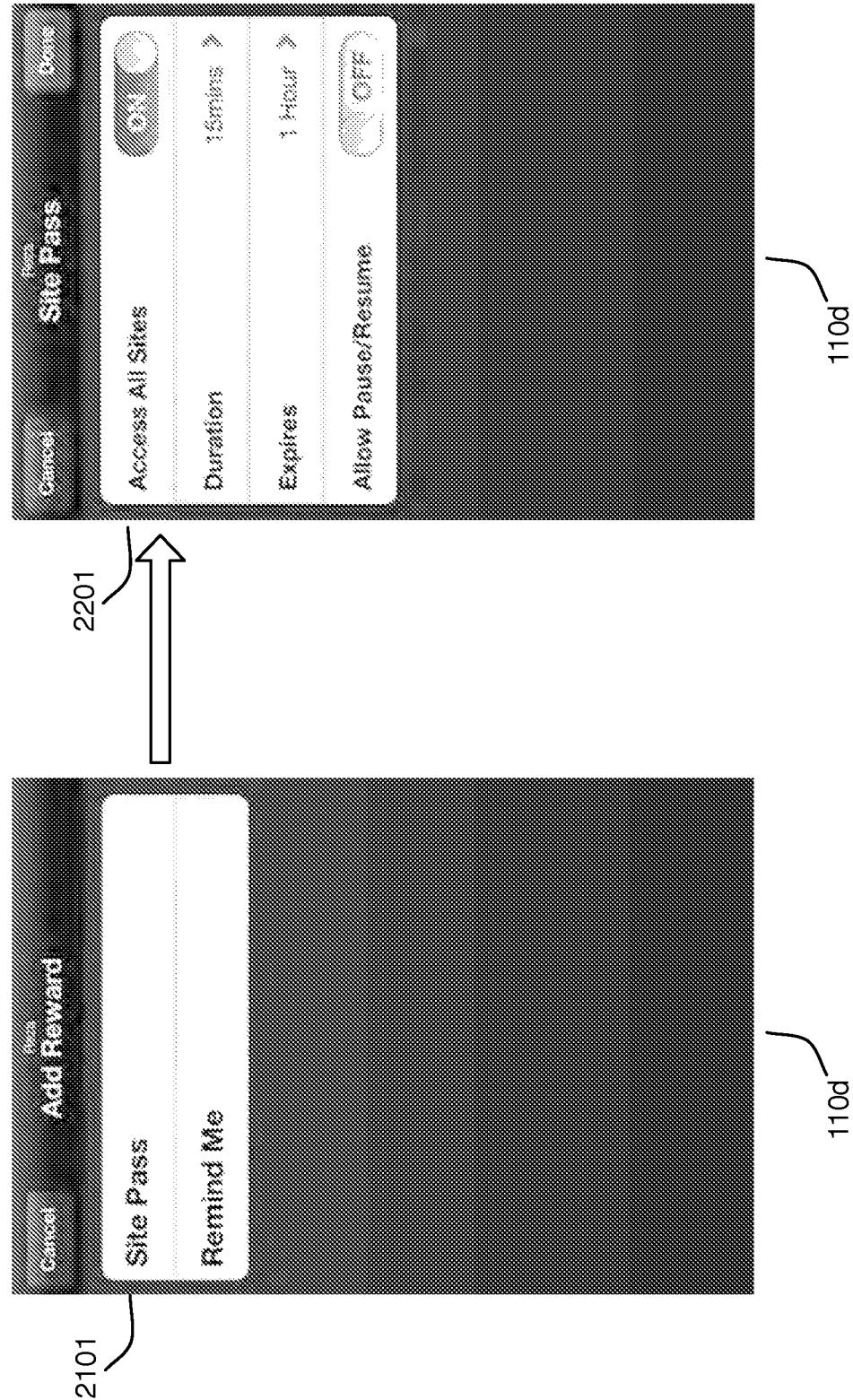

FIGURE 28
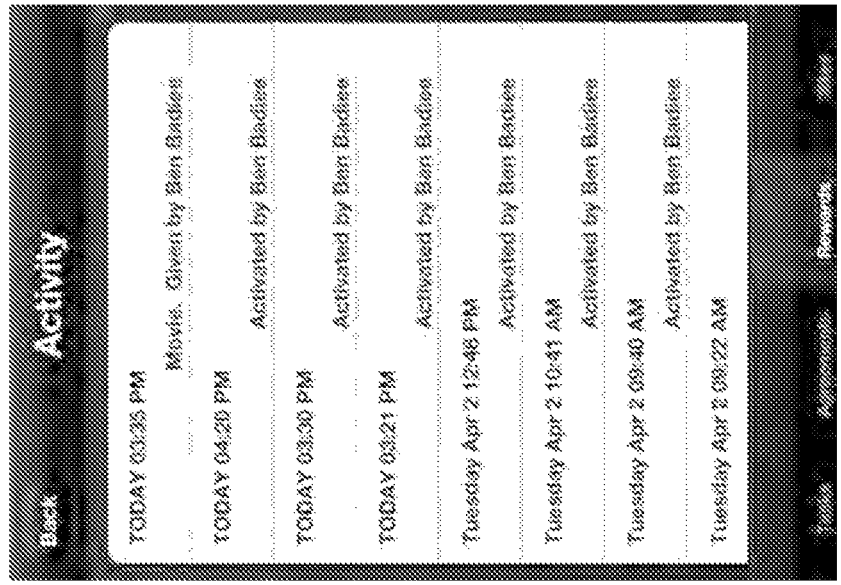
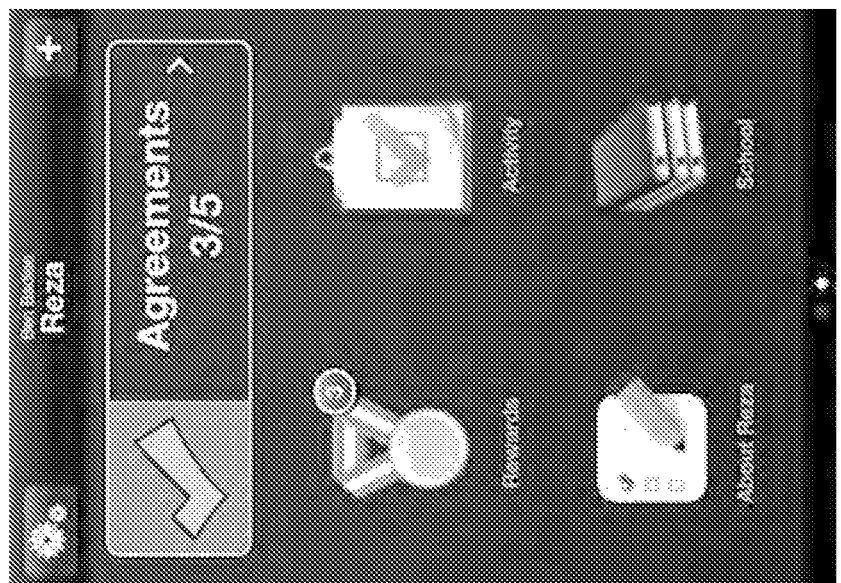

FIGURE 30
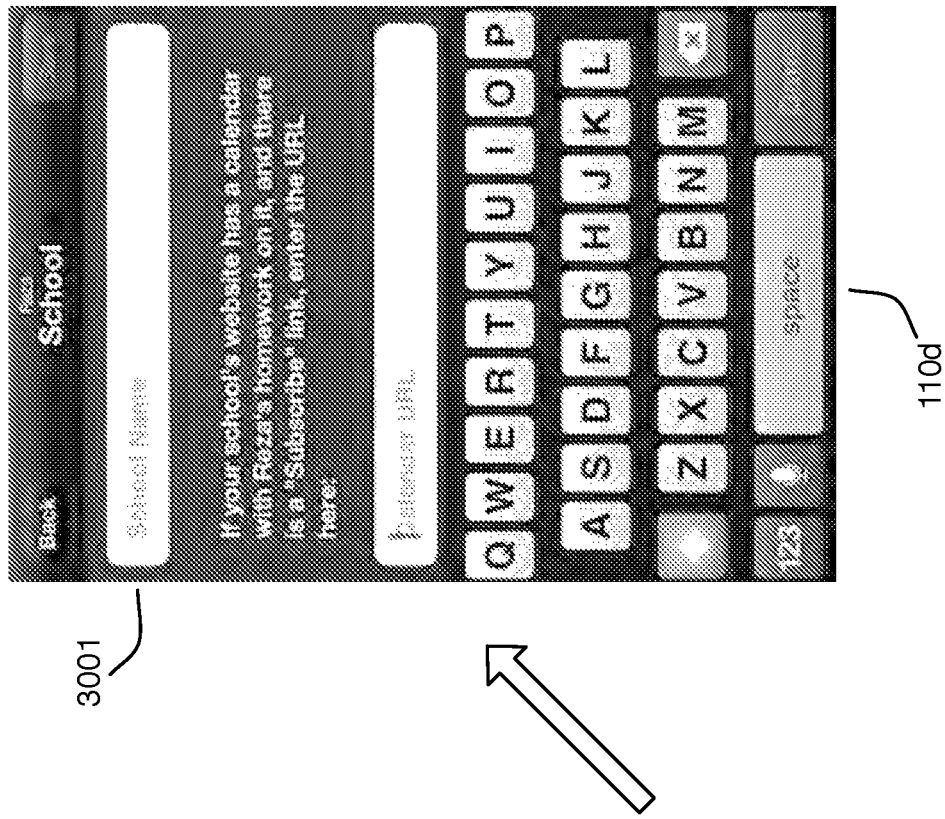
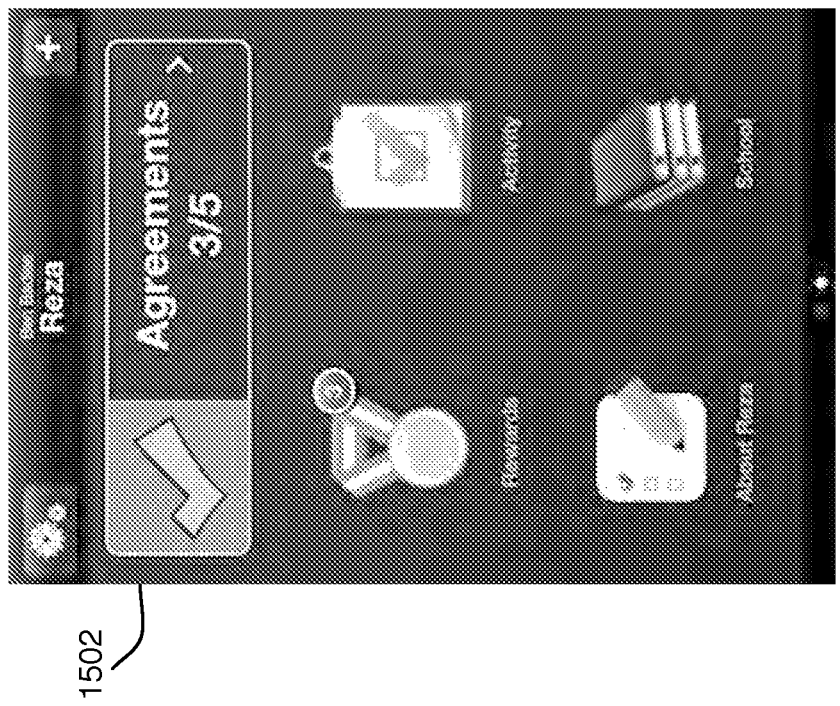

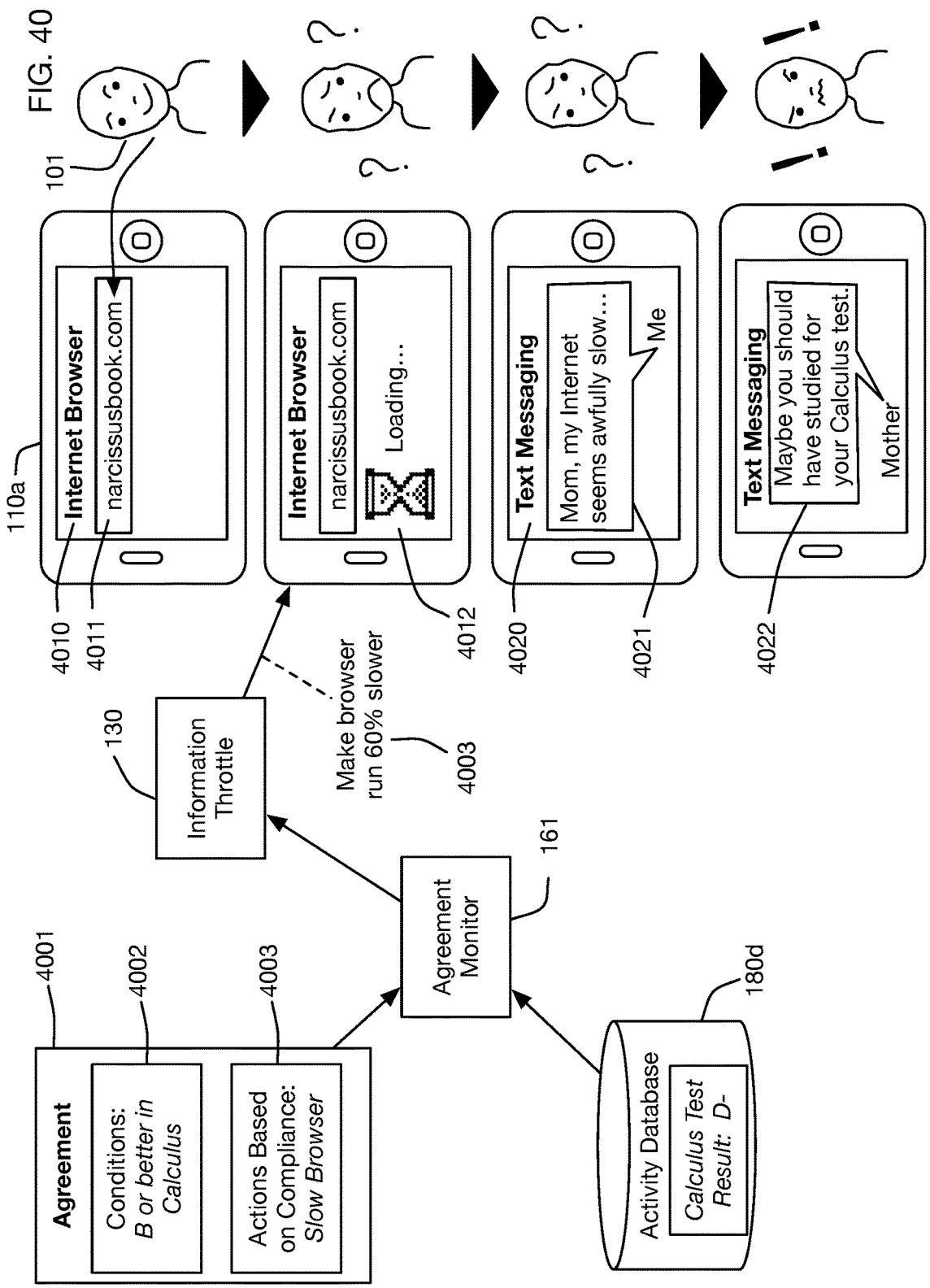

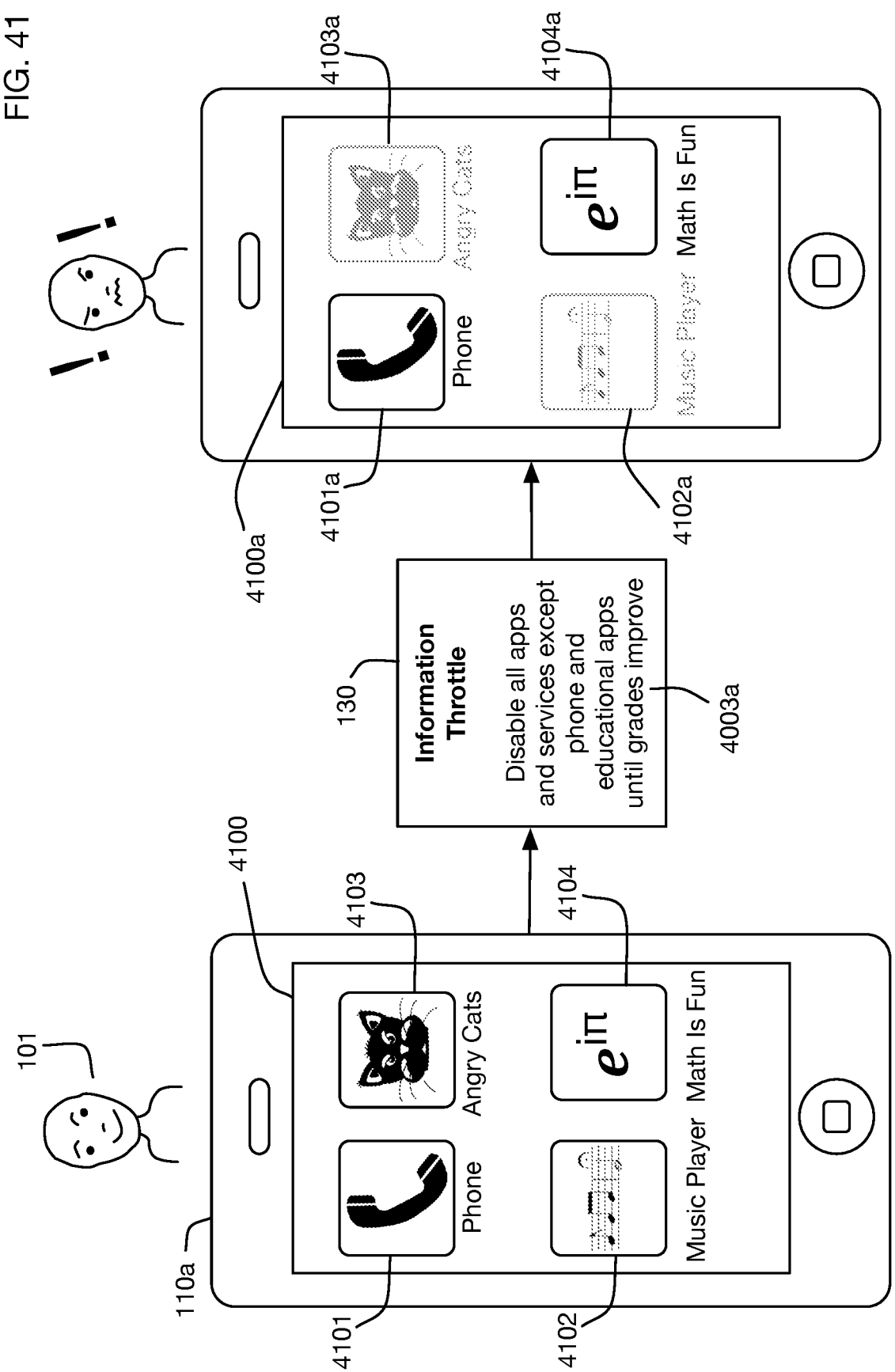

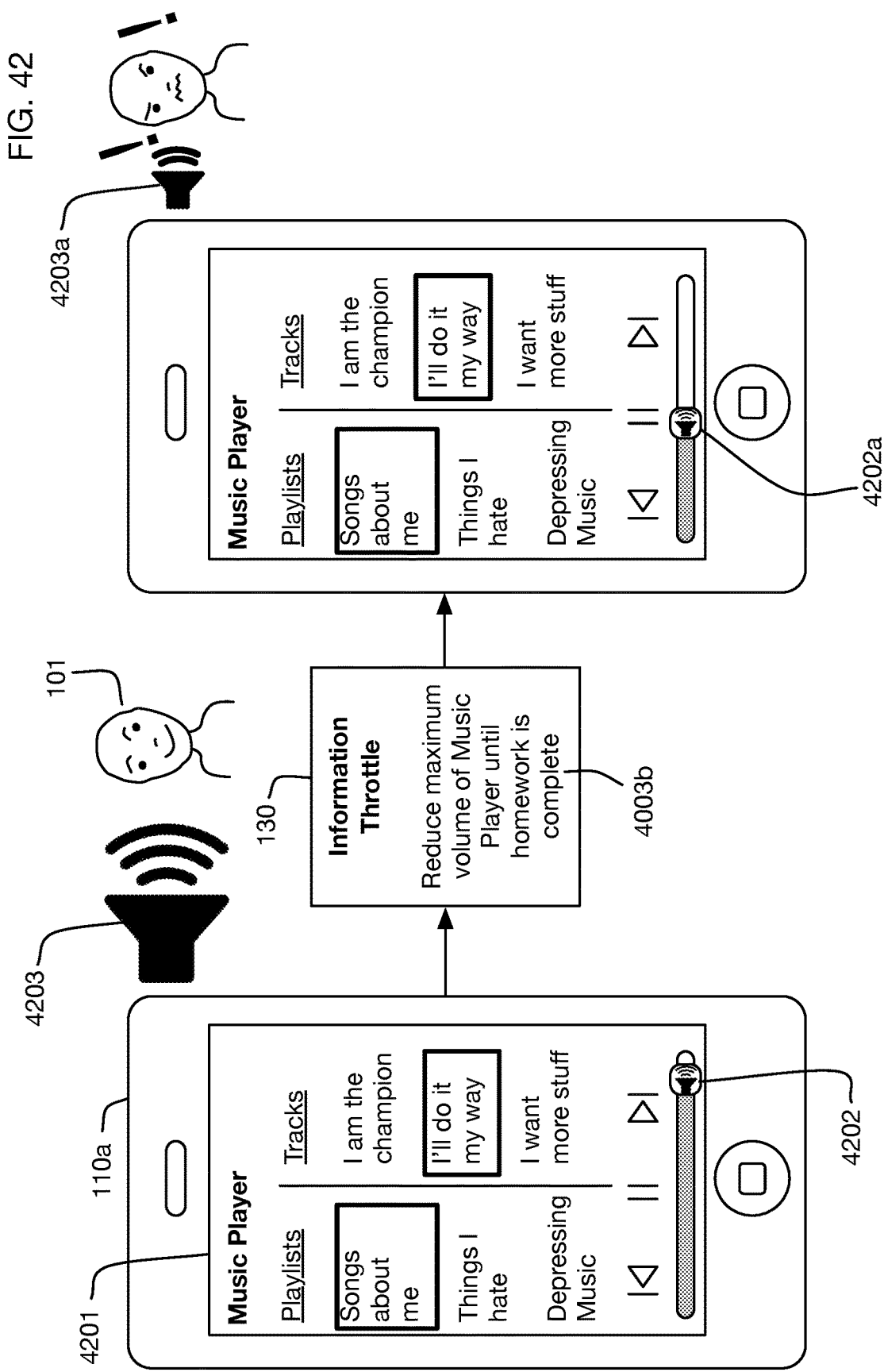

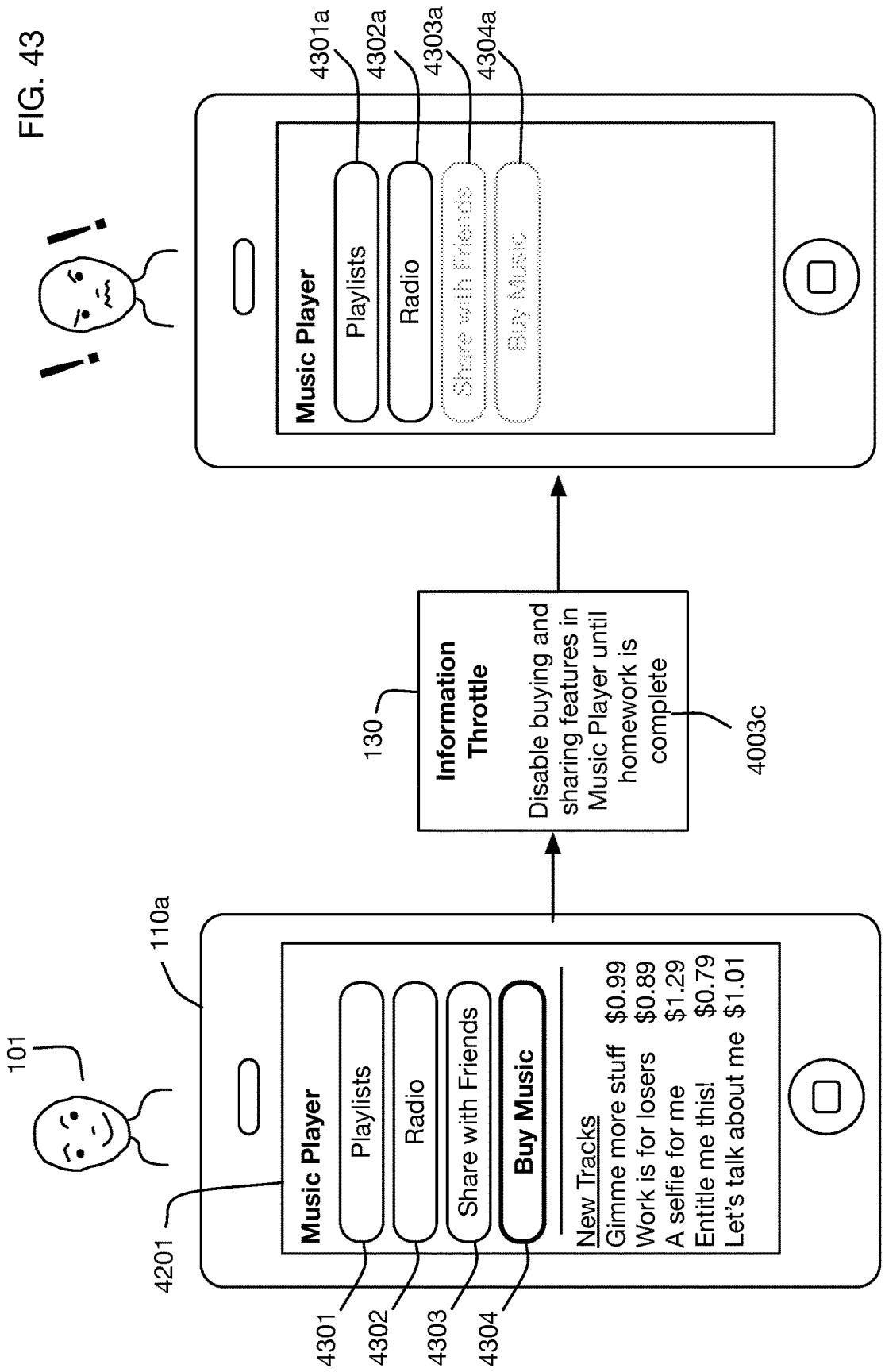

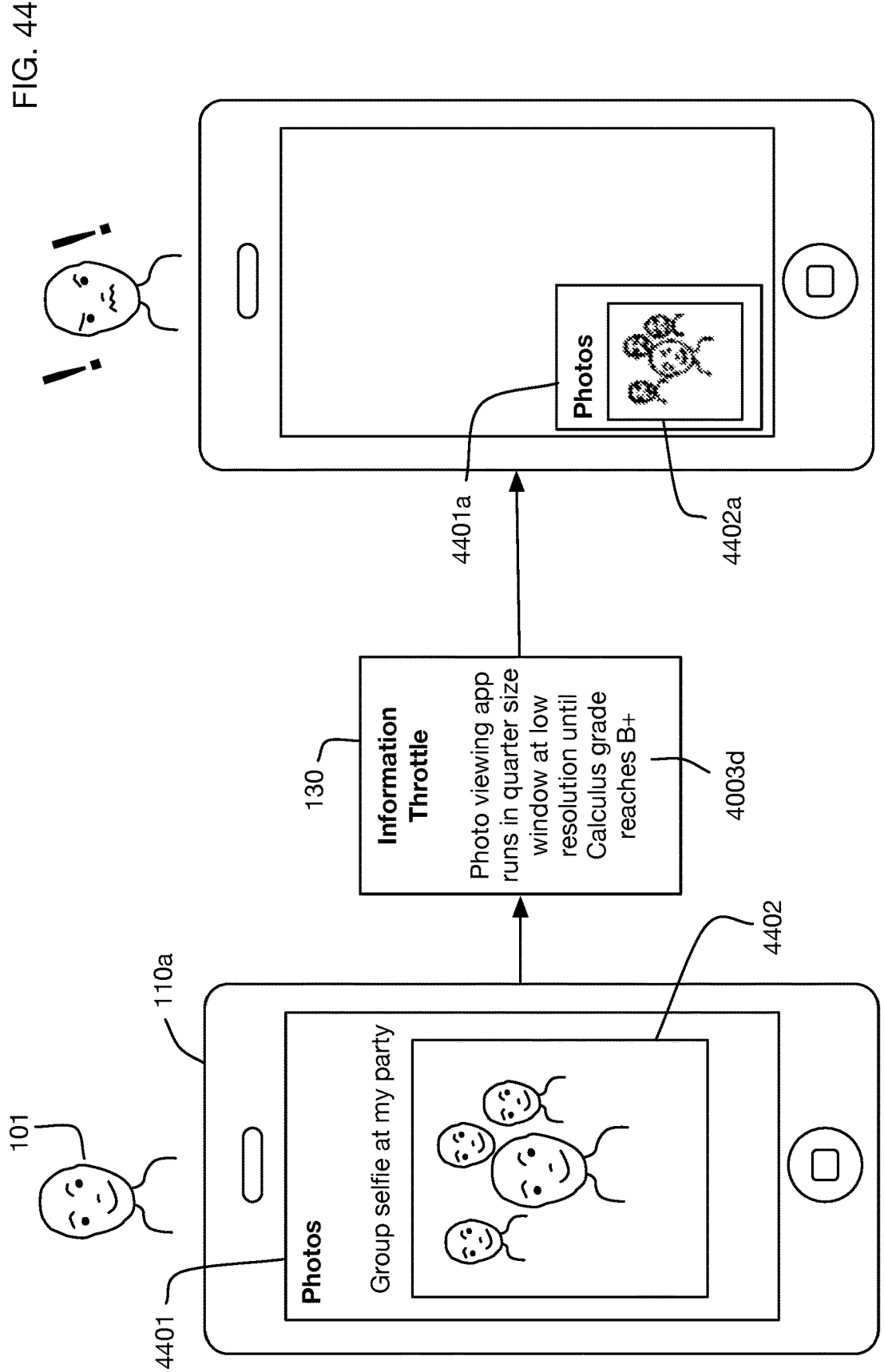

PARTIAL INFORMATION THROTTLE BASED ON COMPLIANCE WITH AN AGREEMENT

CROSS REFERENCE

This application is a continuation of U.S. Utility patent application Ser. No. 15/215,523, filed on Jul. 20, 2016, now U.S. Pat. No. 9,854,393, issued on Dec. 26, 2017, which is a continuation-in-part of U.S. Utility patent application Ser. No. 14/720,943, filed 25 May 2015, which is a continuation of U.S. Utility patent application Ser. No. 14/279,326, filed 16 May 2014, which is a continuation of U.S. Utility patent application Ser. No. 14/222,653, filed 23 Mar. 2014, which is a continuation-in-part of U.S. Utility application Ser. No. 13/568,135, filed 7 Aug. 2012, now U.S. Pat. No. 8,706,872, and is a continuation-in-part of U.S. Utility patent application Ser. No. 13/568,138, filed 7 Aug. 2012, and is a continuation-in-part of U.S. Utility patent application Ser. No. 13/568,140, filed 7 Aug. 2012 all of which claim the benefit of U.S. Provisional Patent Application 61/669,541 filed 9 Jul. 2012, the specifications of which are hereby incorporated herein by reference.

BACKGROUND OF THE INVENTION

Field of the Invention

One or more embodiments of the invention are related to the field of information monitoring, content filtering and content control of information for electronic devices and/or control of electronic devices or apparatus employing one or more electronic devices, as well as compliance management and event detection. Any electronic devices may be throttled including but not limited to telephones, computers, games, video game consoles, virtual reality headsets, augmented reality headsets, wearable devices (such as for example Apple Watch™ or NikeFuel™), streaming set-top boxes (such as for example Apple TV™ or Roku™), smart hubs or connected hubs (such as for example Amazon Echo™ or Google Home™), smart household devices (such as for example a Nest™ thermostat), beacons (such as for example iBeacons™) televisions, smart televisions, music players, vehicles, cars, motorcycles, autonomous vehicles, self-driving cars or other self-driving or driverless vehicles, drones, unmanned aerial vehicles, robots, remote controls for audio/visual components, household devices or any other stationary or moveable object. Embodiments are configured to throttle or in any manner limit, alter, for example at least partially decrease or increase the functionality of any electronic device/apparatus and/or throttle or in any manner limit, alter, for example at least partially decrease or increase information that is input to, output from, used on or exchanged with electronic devices based on compliance with agreements" or events and/or based on schedule, location, time. Throttling thus may include changing functionality of a device from and including 0% functionality to any partial functionality up to and including 100% functionality, as opposed to known solutions that are off or on only, i.e., completely blocked/unusable or fully functional devices. One or more embodiments may partially throttle a device such that the device remains usable after throttling, albeit with reduced functionality or performance. Functionality involves the set of functions or capabilities associated with an electronic device, including but not limited to the speed of responsiveness, speed of information access, the number of apps accessible on a mobile device, the amount or type of weapons in a game, the acceleration levels or speed of the actual electronic device for example an engine computer coupled with an automobile or motorcycle. For example, throttling may be utilized to continue to provide a functional device and/or access to information such as websites or TV channels, albeit with at least partially decreased or at least partially increased capabilities or functionality, e.g., at a reduced rate or lower resolution/brightness/audio quality than maximum and/or continue to allow a person to drive a car albeit at a reduced acceleration, RPM or speed, for example based on the person's grades at school, etc., unlike the completely on/off content filters currently in use. If the agreement performer's agreements are satisfied, the functionality may be restored fully or partially increased for example. An agreement includes one or more conditions to satisfy the agreement, and actions that are performed to enforce or assert the agreement with respect to any or all electronic devices associated with the agreement performer. Conditions may include one or more tasks or activities to be performed by an agreement performer for example based on a schedule and/or location, at a particular time, or time period, or events that may be encountered or monitored. Actions may include throttling of electronic devices or associated information based on whether an agreement performer such as a child has finished assigned homework, chores or extracurricular activities or events such as weather or health related for example or any combination thereof to redefine the experience of parenting. Embodiments may reduce or block information from particular sources not related to a scheduled event, e.g., school class and at least partially increase or enable web surfing for information related to that event, or class based on a schedule and/or location of the electronic device. Other embodiments may be utilized for improved compliance and control of electronic devices in corporate or institutional settings or self-compliance single user settings.

Description of the Related Art

Electronics devices are ubiquitous and include telephones, computers, games, televisions, music players or any other electronic devices that are programmable, including but not limited to programmable controllers or computers within vehicles, cars, motorcycles, remote controls, household devices or any other stationary or moveable object. Many of these devices are being adopted and utilized for more diverse functions and at increasingly younger ages, especially information devices. Some electronic devices are considered to be "externally facing" because of their network capabilities that may include for example exchanging of information with external servers. These devices may include Internet access, WiFi capabilities, BLUETOOTH® or other wireless communications technologies, and generally have IP addresses, or other unique identifiers and/or GPS functions. Currently, electronic devices that historically have not had an external exchange of information with a communications network are gradually becoming network-enabled, for example part of the standard "home network". The home network includes television and/or cable set top boxes, computer printers capable of remote status reporting, air conditioning units with remote monitoring, and even appliances, including refrigerators with remote temperature setting capabilities.

There are no known systems that throttle electronic devices or throttle information, e.g., at least partially limit or increase/decrease functionality, for example at a value between completely off and completely on while also including fully off and on values or blocked or full bandwidth, e.g., to/from/on the electronic devices, based on compliance with agreements having conditions based on activities performed by an agreement performer or events such as external events and/or based on schedule, location, time or any combination thereof. Known solutions may interrupt a child from playing a game or watching a programming in order to ask a question that a parent must create, which places a burden on the parent to create test questions and which completely cuts off access to the function that the electronic device was performing until the question is answered, e.g., complete blocking for a period of time as opposed to throttling to partially decrease functionality which enables a child to continue to watch a program albeit at a reduced resolution, brightness, black and white instead of color, reduced sound quality or any combination thereof. Existing solutions related to Quality of Service (QoS) and Grade of Service (GoS) are related to providing priority to different users, and not providing an altered priority or service level for a particular user based on conditions of an agreement that include activities or events that may directly or indirectly affect a user, such as school grades, schedule associated with a person or location associated with the person and/or electronic device. For example, QoS products attempt to preserve a particular data flow for a given user or application and are not capable of altering bandwidth or type of information accessed or altering the functionality of the device itself based on homework status, test grades, compliance with a corporate training requirements, or health related events such as heat, cold, pollen, smog or other events, or for example whether or not a child can access math related websites if the child is scheduled to be in math class at the time.

With respect to younger age groups, use of mobile electronic devices such as mobile phones, tablets, and portable computers is increasingly. For example, children are being given mobile devices at younger ages and/or Internet access. This has led to a new generation of technically knowledgeable children whose lives are centered on "networked" communication such as texting, mobile phone calls, use of applications on mobile devices, use of social networks/media, peer-to-peer video games, cloud-based video games, and general websites on the Internet. For this generation, the web has expanded to well beyond e-mail and e-commerce web sites, and has become a source of videos, game playing, social connection, news, applications, and a platform for sharing ideas, music, pictures, videos and various forms of multimedia.

This incredible paradigm shift has resulted in individuals of all ages spending an inordinate amount of time using electronic devices, and in turn becoming distracted by them, hindering productivity and adversely impacting time and organizational management systems and in general making people less engaging in person, less physically active and less healthy. Whether through phone calls, texting, use of apps, social networks, video games, and general websites, children in their most formative years, for example 5-12 years old and even younger and older children as well, are particularly at risk for distraction. This level of distraction leads to sub-par academic performance, incompletion or delayed completion of household chores, or other assigned activities, such as physical exercise, taking of medications, etc. There are no known systems that throttle electronic devices or throttle information to/from/on electronic devices associated with children based on their compliance with agreements or other events and/or based on schedule, location, time or any combination thereof. For example, known solutions completely set functionality at 0% or 100%, but nowhere in between and there are no known systems that at least partially increase or decrease web access to websites, television programs or limit mobile phone or text message usage or any combination thereof, or otherwise as described herein, based on compliance with an agreement, such as achieving a particular grade on homework or a test or an event such as temperature, allergy or smog events or any combination thereof. Known systems either completely disable access or enable access fully, i.e., 0% or 100% and in no way provide any partial functionality or speed based on grades or weather related events for example. At stated, some solutions require a question to be answered in order to regain access to a game or the Internet. This is an example of a device that completely blocks access and then fully enables access after a question is answered. Until that question is answered there is no way in which to access the Internet, even in an emergency.

In corporate settings, some employees are required to maintain competency in a particular area and are required to read or be tested, for example on safety or other job requirements. There are no known systems that throttle electronic devices or throttle information to/from/on electronic devices associated with employees based on their compliance with agreements or other events. There are no known systems that limit web access to work related websites or limit mobile phone or text message usage within a building or any combination thereof, or otherwise as described herein, based on compliance with an agreement, such as taking a required training test or an event such as a weather emergency or only enabling access to particular sets of documents during a meeting related to a particular matter or any combination thereof.

One method for controlling these devices and/or networks is to confiscate the devices, or deactivate Internet access. This is sometimes difficult to do or may cause safety issues by disabling ones ability to dial emergency telephone numbers for example. Other solutions to limit Internet access include use of proxy servers or web filtering software. Known proxy servers and web filtering software are basic content filters that filter information on computers based on a web address or the content at a website. In effect, these filters limit "what" a user may view or do. These types of filters generally block all information from a domain or website that contains content that meets some criteria, wherein the blocking is based entirely on the content itself and not any external criteria or conditions or events. In addition, some types of filters have time ranges for use that limit the times at which a user may view or do something. Phone based filtering is used for parental control to limit the number of texts or cell phone minutes that a child may use, or to alert a parent if a child is out of a defined area. Other solutions may disable texting if the mobile phone is moving, to prevent texting while driving, without regard to a portable computer such as a tablet or laptop that a child may have which may not block this behavior. Hence, known solutions are also standalone, configured on a per device basis and not across all electronics devices associated with a particular person, e.g., the person's tablet computer, cell phone and personal computer.

Knowledgeable users may easily bypass some types of content filters. One such method for bypassing these types of filters includes using open and anonymous HTTPS transparent proxies for example. Thus, known filters cannot control email, instant messages or chat sessions in any sophisticated manner since these types of open proxies may be utilized to bypass any installed web filtering software.

Other solutions do not actually control the devices, but rather involve monitoring software that is highly invasive and intercepts or otherwise supervises electronic devices and copies keystrokes, screen images, text messages and any other input or output to the electronic device to a third party for surveillance purposes. This type of solution is used to monitor children, employees, in intelligence services and for remote home surveillance for example. There are negative limitations to this solution, privacy being a major problem area.

On the positive side of reinforcement, there are also point based incentive systems that attempt to positively reward a person for a type of behavior, for example by earning points. These types of systems are also standalone and do not tie into any electronics to limit usage in any intelligent manner for example for across multiple electronics devices associated with a person, such as a child or employee or institutionalized individual.

There are no known systems that control electronic devices, for example dim screens, i.e., adjust brightness or color space of a display, limit sound power output, activate sounds, introduce delays or throttle, decrease or increase the amount of or type of information to/from/on the electronic device based on compliance with an agreement or event and/or based on schedule, location, time or any combination thereof or any combination thereof. This includes vehicles, such as a car, wherein there are no known solutions that set a maximum acceleration, RPM or speed limits setting based on performance on homework or a grade obtained on an examination as part of an agreement for example or based on an event such as if a weather website indicates a chance of slippery road conditions or an accident local to an area where the automobile is currently travelling or during particular time periods where motorists may be inclined to drink alcohol or any combination thereof.

There are no known systems that increase bandwidth or sources of information for an agreement performer if the agreement performer has walked, biked, run or swim or otherwise moved by their own effort over a predefined distance for health compliance. There are no known systems that throttle or increase bandwidth in case of high pollen count or smog alert events to encourage a child to stay inside and surf the web or play games, or decrease bandwidth or type of information if the weather is good outside to promote exercise such as physical game play instead of video game play. There are no known systems that throttle or limit or reduce bandwidth or sources of information based on the location of an electronic device if a child is currently grounded and increase the bandwidth in the location where the child is not grounded. There are no known systems that limit game playing capabilities or levels in games based on compliance with an agreement or event. There are no known systems that limit playlists, or particular songs or song types, e.g., with offensive lyrics, based on compliance with an agreement or event. There are no known systems that throttle a device based on activities associated with another user or a group of other users, i.e., friends of a child or work groups to encourage better circles of friends or improved group performance. This for example enables a parent to indirectly reward a child to encourage a child to associate with well-behaved children.

In addition, there are no known systems that data mine for rewards that may be utilized by a parent for a reward that is similar to a reward for a condition that another parent or person has utilized. There are no known systems that enable manufacturers to data mine for types of rewards or incentives and target a group of parents or persons that may buy certain types of products based on agreements and conditions. There are no known systems that enable parents or other persons to remain up to date on items popular amongst children that are based on agreements that other parents have entered and which have resulted in rewards for meeting conditions of the agreements. There are no known systems that displays potential rewards based on bandwidth usage based on information monitoring with respect to a condition of an agreement, to provide further incentive to perform a task for example. There are no known systems that provide popups or text messages during game play showing tasks to be completed according to agreements. There are no known systems that determine if a child is communicating with a known sex offender, for example based on sex offender maps and IP tracing, for example alert to a parent and potentially throttle other forms of electronic device utilization to further protect a child. There are no known systems that alert a parent when a child's friends have gotten in trouble or are not meeting their agreements, so that a parent may limit a child's interactions with particular people or groups. There are no known solutions that limit a person's agreement with himself or herself to throttle usage based on addictive behavior such as online gambling or obsessive pornography viewing. There are no known systems that data mine an agreement database having multiple parents and children to determine whether a parent is strict or not strict, or to rate how strict a parent is being with respect to other parents, agreements and conditions, or in any other manner rate what kind of parent a parent is based on how a child is performing and the rewards that a child is receiving for example. There are no known systems that provide tips or recommendations for example to improve a child's performance based on parent and/or child behavior with respect to agreements.

In summary, known solutions either intrusively monitor, or filter content entirely on a per device basis and do not throttle information based on conditions, or compliance with agreements or events, for example that are network detectable. Known solutions simply enable or disable the information entirely and on a per device basis without regard to the other devices associated with an agreement performer, such as a child, or employee or other user. For example, known solutions do not throttle an electronic device to at least partially limit or decrease or increase information input, output or exchanged with one or more electronic devices such as but not limited to a telephone, computer, game, television or music player or any other device having a computer or any combination thereof based on whether a student has finished assigned homework, chores or extra-curricular activities, or whether an employee has complied with a work requirement.

For at least the limitations described above there is a need for a partial information throttle based on compliance with an agreement.

BRIEF SUMMARY OF THE INVENTION

One or more embodiments on the invention enable a partial information throttle based on compliance with an agreement. Embodiments may be utilized to throttle, or in any manner limit, alter, for example at least partially decrease or increase the functionality of electronic devices and/or throttle, or in any manner limit, alter, for example at least partially decrease or increase the information that is input to, output from, used on or exchanged with electronic devices based on compliance with an "agreement". For example, throttling may be utilized to continue to provide access to information such as websites or TV channels, albeit at a reduced rate or lower resolution/brightness/color space than maximum and/or continue to allow a person to drive a car albeit at a reduced RPM or speed, for example based on the person's grades at school, etc., unlike the completely on/off content filters currently in use. For example if a student's grades are a "C" level, then a television or web video may be displayed at standard definition and/or dimmed and/or with less bright colors for example anywhere between black and white and the original color to provide an incentive for the child to improve grades. An agreement includes one or more conditions to satisfy the agreement, such as one or more tasks or activities to be performed by an agreement performer for example based on a schedule and/or location, at a particular time, or time period, or events that may be encountered or monitored, and actions that are performed to enforce or assert the agreement with respect to any or all electronic devices associated with the agreement performer. Any electronic devices may be throttled including but not limited to telephones, computers, games, televisions, cable set top boxes, satellite set top boxes, routers, music players, vehicles, cars, motorcycles, remote controls for audio/visual components, household devices or any other stationary or moveable object. For example, embodiments enable throttling of electronic devices or associated information based on whether an agreement performer such as a child has finished assigned homework, chores or extracurricular activities or events such as weather or health related for example or any combination thereof to redefine the experience of parenting. Embodiments may reduce or block information from particular sources during a scheduled school class and increase or enable web surfing for information related to that class based on a schedule and/or location of the electronic device. In addition, embodiments of the invention enable a parent to pause or "un-pause" access or partially increase or decrease functionality for a child due to bad/good behavior or during an event such as a family dinner. Other embodiments may be utilized for improved compliance and control of electronic devices in corporate or institutional settings or self-compliance single user settings.

One or more embodiments of the invention may be implemented with an agreement database including an agreement, an activity database an agreement monitor and an information throttle. In one or more embodiments, the agreement is associated with an agreement creator and an agreement performer. In at least one embodiment, the agreement further includes a first unique identifier associated with the agreement performer, a second unique identifier associated with the agreement creator and an action to be performed.

In one or more embodiments, the condition includes one or more of an activity to be performed by the agreement performer or an event and the action to be performed is based on compliance with the condition by the agreement performer or the event. In at least one embodiment, the agreement database includes at least one condition having a first activity that is independent of input into at least one electronic device by the agreement performer.

According to at least one embodiment of the invention, the activity database includes activity status associated with the activity of the condition to be satisfied by the agreement performer, in which the activity database includes a schedule associated with the agreement performer, for example a class schedule, task schedule, chore schedule or any other schedule having activities and associated times for example. In at least one embodiment, the agreement monitor may be coupled with the agreement database and the activity database, such that the agreement monitor may check if the condition has been satisfied based on the activity status or if the condition has been satisfied based on the event, in order to determine the compliance.

By way of one or more embodiments, the information monitor may determine monitored information associated with at least one electronic device associated with the agreement performer from each of the at least one electronic device. In at least one embodiment, the information throttle may be coupled with the agreement monitor and optionally with the information monitor, such that the information monitor may perform the action based on the compliance with the condition, and with one or more of a location associated with the electronic device, the schedule associated with the agreement performer, and both the location and the schedule.

According to at least one embodiment of the invention, the action may direct the information throttle to at least partially increase or decrease a performance of the at least one electronic device, e.g., somewhere between 0% and 100% of functionality. This provides an annoyance or incentive to comply with an agreement to regain better or full functionality. As such, based on if the condition has been satisfied and during use of the at least one electronic device by the agreement performer, the information throttle may maintain functionality of the at least one electronic device, and at least one of decrease a speed of functionality or information bandwidth of the at least one electronic device and limit speed of responsiveness of the at least one electronic device, or screen resolution/brightness/color space or audio power and/or quality, e.g., number of bits per sound sample or number of samples per second or both, or any combination thereof. In one or more embodiments, at least partially increasing or decreasing a performance of the at least one electronic device may occur through an insertion of at least one time delay between at least one of acceptance of an input of the information, between a display of the information, or between a transfer of the information to or from the at least one electronic device. The information throttle, in one or more embodiments, may perform the action to at least partially degrade or increase performance of the electronic device or an apparatus coupled with the electronic device, dim or brighten a display or change from standard or low definition to high definition, etc., or alter the color space to display video in black and white or slightly colored or in original color, lower or raise the display resolution for TV or video, lower or raise the audio quality (samples per second or bits per sample or both for example), or lower or raise a volume level that may be utilized or play a sound on the electronic device or any combination thereof, for example to provide an audio warning or status to the agreement performer.

One or more embodiments may include "lights out" time at which all devices cease to operate or operate in a limited manner. For example, all devices become inoperable or throttled at less than 100% of functionality at a predefined "lights out" time, e.g., 10 PM until 6 AM. Embodiments may include a remote cut off command so that if an agreement performer has not complied with an agreement or for any other reason, then one or more or all of the devices associated with a particular agreement performer may be throttled or disabled. Embodiments may also keep track of all websites or games or other actions that an agreement performer has asserted or viewed for reporting purposes according to the settings provided by the agreement creator for example. Embodiments may include a list of websites or programs that an agreement performer may always access as well, for example educational websites or games. In addition, if an agreement performer is not at a particular location associated with a schedule a notification may be sent to the agreement creator or other interested party alerting the agreement creator of the issue. For example, if a child is supposed to be in math class based on the schedule and the math class has a particular room that the math class is given, then the location of the room is the location associated with the associated time slot of the schedule. If the child is not in that location, then the child's electronic device may be throttled for example. One or more embodiments may enable access to only one or a predefined number of devices at a given time period. The logon times and durations may also be recorded for report generation for the agreement creator or any other interested party for example.

In one or more embodiments of the invention, the information throttle may perform the action, such as by limiting information displayed on the at least one electronic device based on the location of the at least one electronic device, and based on the schedule associated with the agreement performer. Therefore, the information displayed may be associated with the schedule and the location. If the agreement performer is in a specific class, course and/or at an event, for example, the information throttle limits or otherwise throttles information displayed on the at least one electronic device, to allowable websites and/or applications. Hence, the information throttle allows information directly related to the specific class, course and/or event the agreement performer should be attending, by using the schedule and location the agreement performer is scheduled and/or registered to be in. The information throttle, in one or more embodiments, may perform the action, such as by enabling other information displayed on the at least one electronic device, if the location of the at least one electronic device is not associated with the location at which the schedule associated with an activity is to occur with respect to the agreement performer. As such, the other information is accessible if the agreement performer is not at the location associated with the activity. If the agreement performer is not scheduled and/or registered to be in a specific class, course and/or event at a particular time according to the agreement performer's schedule, for example if the agreement performer is at home sick, not at school, the day is not a school day, and/or there is no event scheduled, then the agreement performer is able to visit websites and/or access applications and/or watch TV/cable/web channels not associated with the one or more schedules activities, classes, courses and/or events. As such, information throttle may be contingent upon other throttling conditions, independent of or in combination with the activity, as determined by the agreement creator.

In at least one embodiment, the action may be performed across a plurality of electronic devices from the at least one electronic device associated with the agreement performer, wherein the plurality of electronic devices may include a telephone, a computer, a music player, a game or a television, a vehicle computer or a remote control or an appliance or any combination thereof. The agreement monitor, in at least one embodiment, may sum the monitored information from each respective information monitor from the at least one electronic device into a combined monitored information total. The information throttle, in at least one embodiment, may limit the monitored information on all of the plurality of electronic devices based on the combined monitored information total. By way of at least one or more embodiments, the at least one electronic device may notify the agreement performer on one or more upcoming activities to be performed by the agreement performer or on one or more upcoming events. For example, in at least one embodiment, the agreement performer may be pre-warned about an upcoming assignment, exam and/or homework, via the electronic device, based on the agreement performers schedule and location. As such, the agreement performer may be warned 1 day before a due date of a homework assignment, 1 week before an upcoming exam, etc. As one of ordinary skill in the art would appreciate, any other pre-warning of an upcoming task or activity in advanced of the actual time or due date is in keeping with the scope of the invention.

In one or more embodiments of the invention, the agreement monitor may push new agreements to the at least one electronic device, or the at least one electronic device may poll the agreement database to the new agreements. In at least one embodiment, the new agreements may include a serial number to enable robust transfer of the new agreements without loss of the new agreements.

According to one or more embodiments of the invention, the information throttle may perform the action based on one or more of a site pass, a reward or a partial reward. As such, in at least one embodiment, the site may include a list of websites, amount of time of enabled access and/or expiration of time thereof. For example, if the agreement performer performs the actions required based on multiple conditions, such as taking out the trash and completion of assignments and/or homework, the agreement performer may receive more than one reward, such as one or more site passes and/or other rewards such as monetary rewards and rewards at the discretion of the agreement creator. In at least one embodiment, the agreement creator may be reminded, via the agreement monitor, that the agreement performer has complied with the required conditions and performed the necessary action(s) and that the agreement performer should receive at least one reward.

In one or more embodiments, a partial reward may be associated with a time-based and/or quantity-based partial activity performed by the agreement performer. For example, the agreement performer may study for an upcoming exam, as scheduled, by studying for a limited amount of time per day for a number of days. As such, the agreement performer may receive a reward, such as one site pass, per day for each of the days the agreement performer studies. As one of ordinary skill in the art would appreciate, other rewards may be given to the agreement performer, as well as other types of partial activities may be monitored, other than studying for an exam, are in keeping with the scope of the invention.

By way of one or more embodiments, the at least one electronic device may provide a list of rewards and may accept a selection of a particular reward from the agreement performer. As such, the agreement performer may be provided with a list of rewards that may result in a much higher compliance, in that the agreement performer may be allowed to pick one or more rewards to apply at a certain time, giving the agreement performer more inventive to complete the required activity to gain the selected reward(s). In at least one embodiment, the list of rewards is categorized based on one or more categories selected from one or more of an age group, sex and behavioral patterns. In one or more embodiments, the electronic device may provide recommendations to the agreement performer for one or more rewards from the list of rewards and from the one or more categories prior to accepting the selection from the agreement performer.

In at least one embodiment of the invention, the condition may include a list of one or more conditions, wherein the agreement monitor may allow the agreement performer to pick from the list that results in a higher compliance ratio.

As such, for example, instead of forcing a reward onto the agreement performer, the agreement performer is able to select a desired one or more rewards, such as selecting a movie ticket versus money, and the agreement performer would be more apt to complete the required tasks. As one of ordinary skill in the art would appreciate, any other combination of rewards is in keeping with the scope of the invention. In at least one embodiment, the agreement monitor may accept at least one image or video to confirm the compliance from the agreement performer or the agreement creator.

According to one or more embodiments, the at least one electronic device may display an average amount of time required to achieve a particular school grade based on performance associated with one or more other agreement performers. In one or more embodiments, the average amount of time required to achieve the school grade is obtained using data mining techniques, such as based on all students in a particular class. For example, the electronic device may display information to the agreement performer stating that if the agreement performer studies for "X minutes" per day, the agreement performer is likely to receive an A on the upcoming exam, homework or assignment. In addition, the electronic device may display information to the agreement performer stating that if the agreement performer studies for "Y minutes" per day, or "Z minutes" per day, the agreement performer is likely to receive a B or C, respectively, on the upcoming exam, homework or assignment. As one of ordinary skill in the art would appreciate, "X minutes", "Y minutes" and "Z minutes" may be of any time frame of minutes and/or hours. The displayed amount of time and associated grade, in at least one embodiment of the invention, may be displayed to either or both the agreement performer and the agreement creator.

In at least one embodiment, the information monitor may transmit one or more notices to the agreement creator and to a plurality of other users. The plurality of other users, in at least one embodiment, may include a plurality of other agreement creators, or other interested parties for example. In one or more embodiments, the one or more notices may include one or more of the activity status, a reward associated with the activity status, and the condition. For example, in at least one embodiment, the plurality of other agreement creators may comprise one or more of at least one parent, at least one boss, at least one supervisor, at least one older sibling, at least one professor, any other responsible guardian, or any combination thereof.

In one or more embodiments of the invention the agreement performer may include a plurality of agreement performers, and the agreement creator may include a plurality of agreement creators. The information monitor, in one or more embodiments, may display a list of the plurality of agreement performers to one or more of the plurality of agreement creators in an orderly manner based on a history of actions associated with each of the plurality of agreement performers. In one or more embodiments, for example, if more than one agreement performer are being monitored, such as siblings in one household, the list of the plurality of agreement performers are listed in an orderly manner based on how good or bad they have previously complied with required activities and/or tasks. As such, it may be easier for one or more of the agreement creators to view and determine which agreement performer of the plurality of agreement performers that does not comply with required activities and tasks and may be given more tasks and activities to complete, with a fewer number of associated rewards, compared to a second agreement performer from the plurality of agreement performers, such as siblings in a household.

The agreement, in at least one embodiment, may include a plurality of conditions, such that the agreement monitor may accept the compliance as associated with each of the plurality of conditions in any order, as performed by the agreement performer. As such, an agreement may comprise a plurality of conditions, and the agreement monitor may accept compliance associated with each condition, of the plurality of conditions, in any order as obtained from the agreement performer. Alternatively or in combination, the agreement monitor may provide and/or accept compliance associated with each condition or a group of conditions in a particular order. In one or more embodiments, the multiple conditions may be associated with one or more rewards provided in a particular order or any order as either indicated by the agreement creator and/or selected by the agreement performer.

According to at least one embodiment of the invention, the action may be associated with one or more monetary rewards, such that the one or more monetary rewards may be provided to the agreement performer based on the compliance by one or more of the agreement creator and one or more third party users. In at least one or more embodiments, the one or more monetary rewards may be associated with a financial institution, such that the one or more third party users may increase, or add onto, the one or more monetary rewards based on the monitored information. For example, in at least one embodiment, monetary or point rewards may be placed in a financial institution, such as a bank, or frequent flyer program and tracked in the agreement database. As such, one or more agreement creators or other third party users, such as one or more of friends, professors, teachers, local businesses, colleges and/or universities, may sign up to match the monetary rewards provided in the financial institution and add onto the monetary rewards, giving the agreement performer an incentive to perform the required activities and/or tasks. Embodiments may implement a marketplace where agreement performers may remit points for rewards for example.

In one or more embodiments of the invention, one or more businesses and/or companies may provide free samples, trial offers, coupons, discounts, etc., to use as rewards for the agreement performer(s). In addition, in at least one embodiment, one or more businesses and/or companies may provide product feedback(s) and/or survey(s) for the agreement performer and/or the agreement creator to respond to.

In at least one embodiment of the invention, rewards may be given to the agreement performer(s) for on time performance of homework, chores, behavior, exercise, proper diet, music/sports practice and may be in the form of tokens/points. In one or more embodiments, the tokens may be accumulated and utilized as rewards for predefined levels. Rewards may include increase data throughput on the electronic device, or may include physical items such as gifts, food, events, and/or cash. For younger children, in one or more embodiments, stickers and/or other toys may be utilized. In at least one embodiment, tokens may be deducted for timeouts, bad manners, not obeying, disruptive behavior, incomplete homework, incomplete chores, use of bad words, fighting or aggressive behavior. For example, in at least one embodiment, the agreement creator(s) may increase or deduct the number of token to respective increase or decrease rewards, based on good or bad behaviors.

According to at least one embodiment of the invention, the rewards and/or tokens may be tied to existing point systems, for example if capable of external access and/or integration, in order to provide the agreement performer(s) with the necessary token(s) and/or reward(s). Embodiments of the invention enable the activity performer to store the tokens or cash in an account and also accrue interest at a negotiated rate. In addition, the tokens or cash may be donated by the activity performer to a specific charity for example. Alternatively, or in combination, the activity performer may donate or otherwise transfer tokens and/or cash to another account, such as a sibling's account or family account. In addition, the tokens may also be exchanged for time with other individuals such as parents. Alternatively, the system may also store time earned from activity completion for example. For example, an activity performer may earn an hour with an uncle or other friend or relative, e.g., for performing some chores, etc.

Embodiments generally utilize or interface with an agreement database that includes an agreement that can be between two roles, which may be played by one or more humans, for example an agreement creator and an agreement performer. This may include parents and children or employers and employees or any other role between agreement creator and agreement performer. These roles may be taken by the same person, or by groups of people. One or more embodiments may be utilized to redefine the experience of parenting by making the system enforce agreements between parents and children, rather than the parent. Embodiments of the system foster a collaborative process with respect to goal setting and management. This enables electronic device usage dependent upon agreements between parents and children, e.g., throttling access to websites/apps/text messaging or total time of electronic device usage across all devices associated with or otherwise utilized by a child based on completion of school, home or extracurricular activities, which is heretofore unknown in the art. Embodiments may be utilized in corporate or institutional settings as well for compliance with corporate requirements. The agreement may be implemented for example in an object oriented or relational database or any other type of data retaining apparatus. The agreement generally includes information related to an agreement performer, an agreement creator, a condition to be satisfied by the agreement performer, or an event that may or may not be related to the agreement performer and an action to be performed based on compliance with the condition by the agreement performer. In one or more embodiments of the invention, the agreements may include actions/limits that are performed or enforced before a condition is satisfied.

One type of condition may be based on an activity performed by the agreement performer. The system may utilize or interface with one or more activity database that contains activity status associated with the condition to be satisfied by the agreement performer. The activity database may be integrated with the agreement database or separate or distributed in any manner as desired. One form of activity database is a School Information System or SIS, which holds assignments, tests, grades, dates and other school related activities and associated status. The compliance and activity status may be based on trust, evidence or confirmation or any combination thereof.

Bandwidth or information type may be throttled down or up, for example at either blocked or maximum speed or anywhere between blocked and maximum speed of the network connection. For example if an employee has not completed a required corporate training session, their bandwidth or access to text messages or websites may be decreased for example. Alternatively, throttling of bandwidth or type of information may be increased, for example in the case of an event such as high pollen count or smog alert that the system detects or is otherwise made aware of. This encourages children or employees to remain inside to use electronic devices in case of hazardous outdoor conditions or alternatively encourages children or employees to locate outdoors in healthy conditions.

Another type of condition may be based on an event that may be discovered or otherwise determined by the system. In one or more embodiments, the system may also encounter, discover, obtain or in any other way utilize events to control the electronic device, for example set information parameters in the electronic device that alters the functionality of the electronic device. For example, one or more embodiments of the invention may set the maximum acceleration, speed or RPM setting in a computer that controls a vehicle or any combination thereof based on performance on homework or a grade obtained on an examination as part of an agreement, or based on an event such as a weather event that is discovered by the system when a weather website indicates a chance of slippery road conditions or an accident local to an area where the vehicle is currently travelling or any combination thereof. Embodiments of the invention may throttle information parameters up or in an any increasing fashion as well, wherein the acceleration setting in the computer on the vehicle may be increased to allow for more aggressive driving performance if the agreement performer has complied with an agreement or in case of emergency as determined by the system or in case of exiting an area where an accident has been passed.

Furthermore, the volume of a car radio or stations allowed, audio quality or a music player utilized whether or not moving in a vehicle, may be set based on the activities of the agreement performer, for example good grades or bad grades, or based on the weather events for example to set a station automatically to a weather or hazard channel if the weather event detected is of a particular nature. The combination of setting or throttling devices themselves or information associated therewith may be based on activity type conditions and event type conditions or any combination thereof, which is unknown in the art.

The system may utilize an agreement monitor coupled with the agreement database and the activity database that is configured to check if the condition has been satisfied based on the activity status to determine compliance. Alternatively or in combination the agreement monitor or any other element in the system may be configured to utilize the Internet or other network connection to discover events that may trigger conditions of agreements and assert actions. The agreement monitor may be implemented in a variety of configurations that may monitor agreements, activities, events or any other quantity wherein the agreement monitor may execute on any computing element within the system.

An information monitor may be utilized in many configurations wherein the information monitor is configured to determine monitored information associated with an electronic device that is associated with the agreement performer. Alternatively, or in combination, the information monitor may locally check conditions based on the monitored information to determine when a limit is reached. For example, if a certain number of text messages have been sent/received in a month, the system may limit or block access to all text based applications on all devices associated with a child by broadcasting the monitored information and/or limit event to the agreement server and/or other electronic devices associated with the agreement performer. By determining the monitored information, for example the application being utilized, the information being viewed, the amount of text messages input, etc., the system may throttle the amount or speed of that monitored information, or allow or block the information altogether based on compliance, as opposed to content. Embodiments of the invention may throttle information by throttling associated applications as well, by introducing delays and or dimmed screens, or asserting sounds or warnings or otherwise limiting the application, or disabling the application altogether.

In one or more embodiments, the system utilizes an information throttle coupled with the agreement monitor and optionally coupled with the information monitor, wherein the information throttle is configured to perform the action, based on the compliance with the condition by the agreement performer, or event associated with the condition. The information throttle may implement the action wherein the action is configured to control the electronic device itself, for example dim a screen, activate sounds, introduce delays and/or limit or throttle or decrease or increase the monitored information associated with one or more electronic device, for example slow or limit the number of text messages on a cell phone, display of web pages for any set of web sites, limit the resolution of the display and/or display a reminder on a television to finish homework if changed to a particular channel or program, or in any other manner limit, allow or block information. For example, embodiments may limit access to a website or disable an application, limit audio power and/or quality and/or play an audio message during music playing, or in any other manner limit, allow or block any functionality of any electronic device associated with the agreement performer. Embodiments of the invention may perform in a non-standalone or integrated manner in order to disable all texting on all devices associated with a child if a text message is sent from a particular location, for example if "grounded", or while moving over a threshold speed indicative of driving. In one or more embodiments of the invention, if a text message is sent via a mobile computer or tablet and a cell phone associated with the child is moving over a certain speed, then the computer or tablet may block access by obtaining a speed event from the cell phone and determine that the child is attempting to bypass text throttling through use of a device other than a cell phone to send a text message.

In a parent/child embodiment, a parent may embody the agreement creator and may propose an agreement with a condition such as "IF all assigned homework is completed by 9 PM" and an action such as "enable social media websites for 1 hour at unlimited bandwidth across all electronic devices associated with an agreement performer, and 1 hour with 50% speed degradation up to 20 text messages". In this scenario, a child may embody the agreement performer, and may agree to the conditions in order to obtain access to information, including websites, videos and/or television shows, text messages, phone minutes, game time, music, etc. In this scenario, the condition is effectively an activity to be performed by the agreement performer. In other scenarios, the condition may be related to an activity performed by a third party, such as "if payment from third party received is greater than $50" then an action of "enable text messaging" for example on the mobile phone associated with the child, for example if the child has earned enough money from a job or chores. Conditions may also include time components in addition to an activity, for example when some activity is due. Alternatively, or in combination, the time component may include a time range, for example a time start and time stop. The time component may be in any format and include any temporal information including a day, date, recurring interval such as "every other Friday", or any other description related to time. One or more embodiments of the invention may show text or play audio reminders on electronic devices of upcoming deadlines, e.g., tests or homework or chores or piano lessons or any other activity with an associated deadline or due date. Embodiments of the invention may implement actions that throttle or limit monitored information in any manner. For example, actions may include a time limit that limits an amount of time that the monitored information may be utilized or displayed on the electronic device, or a total across all electronic devices associated with a particular agreement performer, a numerical limit that limits a number of data entries associated with the monitored information, a web limit that limits access to a website associated with the monitored information, an application limit that limits access to an application associated with the monitored information, a game limit that limits game parameters associated with the monitored information, a television limit that limits a television program or channel associated with the monitored information. Video and television are utilized herein as different delivery mechanisms for potentially the same time sequenced multi-picture media, whether delivered on a computer or television. Activities may originate from the electronic devices themselves and may include any output that each electronic device is capable of generating, such as the output results of character inputs, to determine if a child has read an entire chapter. Conditions, for example that specify event and values thereof or ranges may be utilized including but not limited to the orientation, location, speed or any other characteristic of any electronic device, along with a description of the application being used may then be utilized to assert an action, for example to limit text messaging if driving for example, even if the texting is occurring on a device other than the device that is capable of detecting speed. Events such as location-based events may be checked against agreements to find out whether to assert an action to control an electronic device or throttle information to/from/on the electronic device. For example, if a child is grounded, then bandwidth may be decreased or terminated outside of the grounded area and increased when the child is within the grounded area. In addition, events such as predefined distance events that occur if an agreement performer has moved themselves over an agreed upon distance and for example under the speed associated with a car may be utilized to throttle or increase the amount of bandwidth or type of data that the agreement performer may interact with or game playing levels may be increased or more aggressive games may be allowed or more weapons may be enabled within games or playlists with more energetic music may be enabled, etc.

One or more embodiments of the invention may interface with or otherwise utilize one or more activity databases that include activities related to schoolwork, chores or extracurricular activities or any combination thereof. For example, an activity database such as a school information system or SIS that includes homework activities and other assignments or tasks and associated activity status may be utilized. In addition, a parent may implement a similar system with chore related activities including "mow the lawn every other Saturday" with associated activity status of True or False for the current time period. The associated action may include "enable 20 extra phone minutes" or "enable TV program XYZ" or any other action including "transfer $20 to allowance money card" for the payment of an allowance for example. The activity status may include information related to completion of an activity assigned to the agreement performer in the form of Boolean True or False, or a range, which may be utilized a range of actions based on a condition of "grade A", "grade B", "grade C" conditions in a particular class or on a particular test or as a cumulative average across classes or any other combination thereof. This range of conditions may be utilized to provide a corresponding range of actions that correspond to the different grades, for example "provide unlimited web browsing", "degrade browsing speed by 20%", "send alert when electronic device is greater than 0.25 miles from home", "set resolution of table computer display to VGA level for videos" to implement a "grounding" of the child respectively.

Non-time oriented conditions or events may also be implemented, for example if a speed of an electronic device is indicative of driving, an action such as limiting or disabling text messaging from one or more electronic devices associated with an agreement performer may be implemented. This condition may be broadcast widely or locally to limit or disable text messaging if moving over a certain speed indicative of driving or may be conditional based on a location of movement, such as in a school zone. Any other condition or action that throttles information to one or more electronic devices associated with an agreement performer is in keeping with the spirit of the invention. Alternatively, or in combination, if an agreement performer has walked or run over a certain distance as per the GPS tracking on the electronic device associated with the agreement performer, then bandwidth or access may be increased. This may be utilized for medical purposes to ensure that the agreement performer is getting the prescribed amount of exercise. In addition, bandwidth or access time or access to particular games, websites, text messaging or any other electronic device usage may be increased for example on days with high smog or high pollen counts or based on any other external condition, whether medical or not.

In corporate settings, some employees are required to maintain competency in a particular area and are required to read or be tested. Embodiments of the system may be utilized to control electronic devices or limit information to/from/on electronic devices associated with employees based on their compliance with agreements. For example, embodiments may limit web access to work related websites or limit mobile phone usage within a building or any combination thereof, or otherwise as described herein, based on compliance with an agreement or an event or any combination thereof. Embodiments may be utilized within institutions such as jails to provide incentives for compliance with increases in bandwidth or type of information based on good behavior.

Any combination of hardware may be utilized to implement the system. In one or more embodiments, the agreement monitor is configured to execute on the server computer that for example be remotely accessed over a computer network. The information monitor and information throttle may execute on an electronic device associated with the agreement performer, or on a router, or a cable/satellite/TV set top box, or any other computational component coupled with the system or any combination thereof so long as the information monitor and information throttle may limit monitored information associated with the agreement performer based on compliance with an agreement. In one or more embodiments, the information monitor is configured to interface with a proxy server or web filtering software, to enable existing hardware or software content filtering solutions to throttle monitored information based on compliance by an agreement performer, in addition to their inherent content filtering. In one or more embodiments, any electronic device on a local area network may communicate with any other electronic device on the local area network to coordinate or in any other manner communicate information regarding information monitoring and enforcement, for example using mDNS.

In one or more embodiments, monitored information includes telephone time usage, a number of telephone calls, a telephone number, a number of text messages, a location of the electronic device, a speed of the electronic device, a website address, a computer application that is running or has run or attempted to run, a game, a television channel, an image captured from the electronic device, an image captured from a camera coupled with the electronic device, a speed and location of the electronic device. Embodiments of the invention may implement an action configured to limit the monitored information to limit input to, output from or data exchange with the electronic device. Other actions may transfer money, send notifications to other parties, etc. Alternatively or in combination an action may be configured to limit the monitored information in a manner for example that degrade performances on the electronic device. This may be implemented as processing cycles or time delays that may be inserted between accepting input or displaying information or transferring information to or from the electronic device.

At least one embodiment of the system may control or throttle one or more electronic devices in an integrated manner or control or throttle information to/from/on one or more electronic devices associated with an agreement performer in an integrated manner, such as a telephone, a computer such as a laptop, tablet, smart phone, or a music player, a game controller, or a television, or any other device such as a network interfaced device or any information input or output device, or any apparatus with a programmable element such as a computer or any combination thereof.

In one or more embodiments, the action may be performed across two or more electronic devices associated with the agreement performer, for example a telephone, a computer, a music player, a game or a television, or any other information input or output device, or any combination thereof. In this embodiment, the agreement monitor is configured to sum the monitored information from each respective information monitor into a combined monitored information total and the information throttle is configured to limit the monitored information on each of the two or more electronic devices based on the combined monitored information total. This for example can be utilized to limit total time spent by a child online, watching television, playing electronic games, texting and talking on the phone, so that the child for example may do any of these activities so long as the time spent doing all of the activities is less than a particular threshold, after which for example a degraded performance may be employed on one or more of the electronic devices if desired. Although this example relates to time, it may also relate to any monitored information. For example, limiting a child to 1 hour web browsing across all electronic devices such as a cell phone, tablet computer and laptop computer is accomplished by adding the usage from all monitored devices and throttling all devices when the limit is reached. This sophisticated throttling of information is unknown in the art with respect to agreement compliance and known content filters and makes the agreement monitor the enforcer, not the parent.

At least one embodiment of the information throttle or agreement monitor or any other component in the system is configured to notify the agreement creator based on the compliance. This can be in the form of an email, text message, web page, voice message, or any other type of communication and may include a display such as a visual or audio display of information related to the compliance. In addition, the agreement monitor may be configured to display information to the agreement creator or other party related to an attempt to bypass the action configured to limit the monitored information by the agreement performer. For example, electronic devices having cameras may take videos or pictures, for example with forward or reverse pointing cameras and send the pictures to a parent, and/or perform face recognition on any images to determine if the child that is associated with the electronic device is really the one using it. The system may also check the digital image or video for metadata that indicates the location of the image or video capture to determine whether the activity was completely where it was supposed to be completed. The system may then send an attempted bypass message to the parent or other child's parent not using the system, after looking up the face in any social media accounts associated with the child, and for example upsell the system to the other child's parents. Alternatively or in combination, the agreement monitor is configured to display information related to the compliance and the monitored information. In addition, web cams or televisions with forward pointing cameras integrated therein or coupled directly or indirectly to a forward pointing camera may be utilized by the system with any known facial recognition functionality or device to determine if one, or more, or all or any other set of the users watching the television have enough credit, authorization, rewards or time to watch a particular channel or television or video at all. If one of the agreement performers, such as a child is attempting to watch a channel that is too mature or which is longer than the amount of reward time that the child has accumulated, then the television or set top box or cable server for example may provide a display that disables the channel or requests parental override to enable watching the channel for example. Alternatively or in combination, the channel may be displayed in standard definition if one of the plurality of children has a grade average below a certain level for example, or in high definition if all children watching have met their grade goals, completed their activities/chores, etc. The same may apply to the sound associated with the television or web broadcast as well as any music players for example. As stated, the brightness and/or color space may also be adjusted based on the grade average for example. The agreement monitor is generally configured to accept input from the agreement creator to define the condition and the action. All information that is monitored, and any events generated based thereon may be encrypted when broadcast, as may be the case for any conditions and actions that are communicated between devices as one skilled in the art will appreciate.

In addition, embodiments of the invention may be configured to allow a parent or other entity to data mine for rewards that may be utilized for a reward that is similar to a reward for a condition that another parent or person has utilized, for example with respect to a particular condition, e.g., a reward for an "A" on a final exam. Embodiments of the invention may also be configured to enable manufacturers to data mine for types of rewards or incentives and target a group of parents or persons that may buy certain types of products, for example based on agreements and conditions. This allows manufacturers to target parents of friends of a child that just won a particular reward for achieving a condition for example. Embodiments of the invention also enable parents or other persons to remain up to date on items popular amongst children that are based on agreements that other parents have entered and which have resulted in rewards for meeting conditions of the agreements. This allows parents to receive product literature, overviews, pictures, movies, blogs or other information to keep a parent "hip". Embodiments of the invention may be configured to display potential rewards on an electronic device being utilized by a person, for example based on bandwidth usage based on information monitoring with respect to a condition of an agreement, to provide further incentive to perform a task for example. Alternatively or in combination, embodiments of the invention may also provide popups or text messages during game play showing tasks to be completed according to agreements. This capability allows a child to see a potential reward for studying, for example while playing a game, wherein the child may make a decision to go study or simply to remind the child that a test is coming up or that homework is due. Embodiments of the system may also determine if a child is communicating with a known sex offender, for example based on sex offender maps and IP tracing, and alert a parent and potentially throttle other forms of electronic device utilization to further protect a child. Embodiments of the invention may also alert a parent when a child's friends have gotten in trouble or are not meeting their agreements, so that a parent may limit a child's interactions with particular people or groups. Embodiments may be utilized in a one-person configuration to throttle usage based on addictive behavior such as online gambling or obsessive pornography viewing. Embodiments of the system may also allow for information in the system to be data mined, wherein an agreement database having multiple parents and children is mined to determine whether a parent is strict or not strict, or to rate how strict a parent is being with respect to other parents, agreements and conditions, or in any other manner rate what kind of parent a parent is based on how a child is performing and the rewards that a child is receiving for example. Embodiments of the invention may also provide tips or recommendations based on parent and/or child behavior with respect to agreements, for example as data mined to achieve better performance by the child. The system may provide a suggested type of action to take based on levels of performance of conditions by a child for example. Data mining may also be performed to detect attention deficit disorder (ADD) or any other medical condition, for example by mining for patterns in monitored information, such as reaction time in games, grades and derivatives of grades to determine if a child is improving or getting worse for example with respect to certain medications. Data mining may be utilized to suggest alternative courses of treatment that increase or decrease the throttled information or enable or disable particular forms of communication, channels, apps or games, etc., to improve an agreement performer or the performance of an agreement performer, for example with our without data mining information related to medical information.

Embodiments of the invention may be configured to enable payment for data mining of the information regarding activities, usage, equipment identification or any other quantity stored in any element of the system. Embodiments of the invention may also be purchased on a fee for use basis, monthly basis, enterprise basis, or in any other manner.

One or more embodiments of the invention may partially decrease performance of one or more electronic devices without fully disabling the device. The partial performance decreases may be based on an agreement. When an agreement monitor determines that the conditions of the agreement have not been met, an information throttle may execute an action to perform the partial performance decrease. Conversely, one or more embodiments may partially increase the performance of an electronic device, for example when an agreement performer is in compliance with the condition or conditions of the agreement.

Partial performance decreases or increases may be based on compliance with agreement conditions that address for example, without limitation, homework completion, test results, grades, extracurricular activities, or chores. In one or more embodiments application of performance partial decreases or partial increases may also be based on location, schedule, or environmental conditions.

One or more embodiments may apply partial performance decreases across all applications and services of a device, or apply partial performance decreases to selected applications and services. Partial performance decreases may entail, for example, without limitation, any or all of the following: delays between inputs, transfers, and outputs in an application; changes in execution speed; modifications to display characteristics, such brightness, resolution, color, or window size; modifications to audio output parameters, for example to reduce audio quality or maximum volume; reductions in access to information sources, such as websites or databases; limitations on the amount of information that can be viewed or transferred; and limitations on acceleration or velocity of a vehicle when the device is a vehicle control computer.

One or more embodiments may partially decrease performance of a device by disabling one or more applications or services on the device, without disabling all of the applications and services on the device. The device therefore may remain usable, but with reduced functionality since selected applications or services are disabled.

One or more embodiments may partially decrease performance by reducing the performance of one or more applications or services on the device, without reducing the performance of all of the applications and services on the device. Performance reductions applied to selected applications or services may include for example, without limitation, disabling of a subset of the features of an application or service, slowing down execution of an application or service, reducing the size or resolution of a display window in which the application or service runs, and reducing the audio volume or quality output by the application or service. These partial reductions in performance may not fully disable the device, since the device remains usable, but with reduced functionality or performance.

In one or more embodiments, partial throttling of devices may be used to enforce company policies or work policies. For example, some work environments may support "bring your own device" rules that allow employees or contractors to bring their own phones, laptops, tablets, or other devices to the work environment. However, in these environments the employer may want to establish and enforce rules and agreements that restrict the use of these devices at the workplace; for example the employer may want to ensure that the devices are only used for legitimate work, rather than for entertainment or leisure. One or more embodiments may use partial throttling of these "bring your own" devices to establish and enforce these rules. For example, one or more embodiments may disable or limit selected apps, selected websites, or selected features when a device is at a work location, or is used during work hours. As an illustration, apps for playing games may be disabled on a user's phone when the phone is at a work location. However, other apps such as mail may be enabled since these apps may have legitimate work applications. Similarly, certain websites may be disabled on a user's phone or computer while at a work location (or during work hours), while other websites may be enabled since they may have legitimate work uses. Partial throttling of devices to enforce work rules may be based for example on the location of the device (such as whether the device is at a work site), on a schedule (such as whether the device is being used during work hours), or both. Partial throttling of devices to enforce work rules may also be based on compliance with an agreement; for example, a top-rated employee may have greater privileges to use a device than a lower-rated employee, or throttling may be based on employee compliance with corporate policies, work rules, required hours of work, or any other measurable factors. Schedule-based or location-based throttling may for example take into account breaks in work schedules; for instance, all apps on a device may be enabled during an employee's lunch hour, but only selective apps may be enabled during normal work hours.

Throttling or partial throttling of devices in a work environment may also be used to enforce confidentiality or privacy policies. For example, to ensure that employees, contractors, or visitors to a work site do not steal information or share it inappropriately, one or more embodiments may selectively block device features such as cameras or microphones when devices are at a work site. One or more embodiments may block outgoing communications such as email or text when devices are at a work site, for example to prevent users from sending company information outside the company. Throttling or partial throttling may also be used to limit selected features, applications, or access while devices are not in a work environment. For example, an application that allows users to view company information may be enabled only while the device is at the work location, and may be disabled when the user is at home or at other non-work sites since these sites may not be secure.

One or more embodiments that throttle devices in a work environment may modify throttling actions based on events. For example, one or more embodiments may block access to selected apps, features, or websites for devices while they are at a work environment; however, if an emergency event or a disaster event is detected, the system may stop all throttling and enable full access to ensure that users can communicate and obtain information during the emergency or disaster.

One or more embodiments may apply agreements and throttling rules in selected locations and environments instead of or in addition to work environments or schools. For example, one or more embodiments may apply device throttling rules in hospitals, for example to encourage healthy behaviors. As an example, in a hospital or other health care setting, access to cooking shows or channels may be blocked, while access to exercise shows or nutritional advice may be permitted. Such selective access may also be based on compliance with an agreement; for example, a patient who performs physical therapy or who achieves weight loss goals may have full access on his or her device, while those not in compliance with the agreements or goals may have restricted access.

One or more embodiments may throttle devices for a group of users based on compliance with rules by one or more persons within the group or related to the group. For example, a group of parents or a school may establish rules or policies for an entire group of children that may be friends or classmates. Violation of rules or poor performance by any one of the children (or by a configurable subset of the children) may result in throttling of the devices for all of the children in the group. This group punishment and group reward feature may for example use peer pressure to encourage conformance with the rules and policies. Group throttling based on individual performance may be used in other environments as well, for example in work environments to collectively reward (or punish) employees based on collective performance of a work team.

In one or more embodiments the agreement, rules, or policies enforced by the system may limit or prevent addictive behavior. For example, users may exhibit addictive behavior such as checking, updating, or refreshing websites excessively frequently. Websites and applications may in fact be designed to encourage this type of addictive use. One or more embodiments of the system may track the frequency or pattern of use of these potentially addictive sites or applications, and may determine whether the usage is excessive or whether it indicates possible addictive behavior. If such excessive or additive behavior is detected, the system may throttle or limit the usage of the website or application or service to counteract the addiction. For example, if a user is detected checking or posting to his or her social media site multiple times per hour, the system may determine that this is addictive behavior, and may limit access to this site to once per day.

One or more embodiments may enforce compliance with an agreement using soft limits. These soft limits may for example gradually apply throttling actions, or may apply these actions after warnings or grace periods. As an example, the system may first provide a warning when noncompliance is detected, giving a user a grace period to comply with the agreement. If the user does not comply within a grace period, the system may then proceed to more severe actions such as throttling or disabling applications or disabling access to websites or information sources. Providing a warning and a grace period may also for example give a user an opportunity to save his or her work, or to complete an in-process action, prior to application of the access restrictions or the throttling actions. In one or more embodiments the system may decide whether to allow a grace period based on the user's prior patterns of behavior and compliance; for example, if the user has historically complied with an agreement but has only recently deviated for a first offense, the system may be more lenient and may provide a grace period or a warning; in contrast, for repeated violations there may be no grace period or warning at all, or the grace period may be shorter. In one or more embodiments the system may give the user an option to complete an action, possibly with the condition that extending access now may result in reduced access later. For example, if a user is determined to be in violation of an agreement but is in the middle of playing a game, the system may allow the user to complete the current game, but warn the user that additional game time used today will reduce future allowable game time accordingly. Throttling or disabling actions may be applied in successive, possibly gradual steps, potentially coupled with feedback or warnings that a subsequent step may be more severe if the user does not comply with the agreement.

One or more embodiments may use machine learning methods to develop throttling rules and algorithms. For example, the system may collect data from multiple users on the agreements and throttling policies established for each user. By mining this data, the system may determine what types of agreements and consequences for noncompliance are most effective. For example, the system could learn the types of access restrictions that are most effective at encouraging children to perform their homework.

One or more embodiments may support agreements that the agreement performer makes with himself or herself. For example, a person may want to reward himself or herself for taking certain actions or meeting certain personal goals, or to punish himself or herself for not taking these actions or meeting these goals. In addition to or instead of throttling a device, the system may enforce such a self-agreement using direct financial rewards or punishments; for example, the agreement performer may deposit funds into an account, and if the agreement is not met, the funds may be transferred to charity instead of returned to the agreement performer.

One or more embodiments may throttle a device by reducing the speed of communication between the agreement performer and selected other users. For example, the system may insert delays when an agreement performer makes a phone call or sends a text to one or more other people, such as the agreement performer's friends. The system may allow full-speed communication with certain other users, even when the device is throttled; for example, calls or texts to the agreement creator (such as a parent) or to emergency services may be at full speed in all situations.

One or more embodiments may apply location-based rules to throttle, disable, or partially throttle a device, for example by selectively allowing or disabling certain apps, features, websites, or information sources based on the device's location. Embodiments may use any technology or technologies to determine the location of the device, including for example, without limitation, GPS, triangulation based on cell tower signals or other radio signals, connection to local Wi-Fi networks at specified locations, and proximity services such as iBeacon™ or other beacon or positioning systems that use Bluetooth, Bluetooth Low Energy, or other wireless protocols.

BRIEF DESCRIPTION OF THE DRAWINGS

The above and other aspects, features and advantages of the invention will be more apparent from the following more particular description thereof, presented in conjunction with the following drawings wherein:

FIG. 4 illustrates at least one embodiment of the functionality employed by agreement monitor.

FIG. 5 illustrates embodiments of various components or electronic devices in the system that may be utilized to host an information monitor and information throttle or any combination thereof.

FIG. 6 illustrates a game interface showing an avatar of an agreement performer in the game, along with throttle information based on current information monitoring and limits in conditions along with a reward for performing an activity.

FIG. 7 illustrates a display coupled with a television, cable set top box, satellite set top box, or website video interface with condition information shown on a throttled program, channel or video, along with an override password entry option. FIG. 7A illustrates a game interface with a display stating that the throttled program, channel or video cannot be viewed based on the location and/or schedule.

FIG. 18 illustrates an embodiment of a screen that accepts entry of a condition for the agreement.

FIG. 19 illustrates an embodiment of a screen that accepts a task type for the condition.

FIG. 22 illustrates an embodiment of a screen that accepts entry of a "site pass" type reward, so that an agreement performer may be rewarded with web surfing access/time, and which expires at a particular date/time and which may or may not be paused or resumed, or a "remind me" type award, so that an agreement performer may be rewarded after the system reminds the agreement creator that the agreement performer has completed the agreement.

FIG. 28 illustrates an embodiment of a screen that is accessed from the main screen and which shows activity/status of various rewards associated with one or more agreement performer.

FIG. 30 illustrates an embodiment of a screen that is accessed from the main screen and which enables coupling with a school's calendar or other schedule to enable access of locations and times of particular activities and/or classes for schedule and location responsive agreement compliance controlled information throttle processing.

FIG. 40 illustrates an embodiment that partially throttles performance of a mobile phone of based on the agreement performer's grades.

FIG. 41 shows an embodiment that partially throttles performance by disabling selected applications and services.

FIG. 42 shows an embodiment that partially throttles performance by limiting the maximum audio output volume of a music application.

FIG. 43 shows an embodiment that partially throttles performance by disabling selected features of a music application.

FIG. 44 shows an embodiment that partially throttles performance by limiting a photo application to a smaller, lower-resolution window on a display.

DETAILED DESCRIPTION OF THE INVENTION

Figure 1:
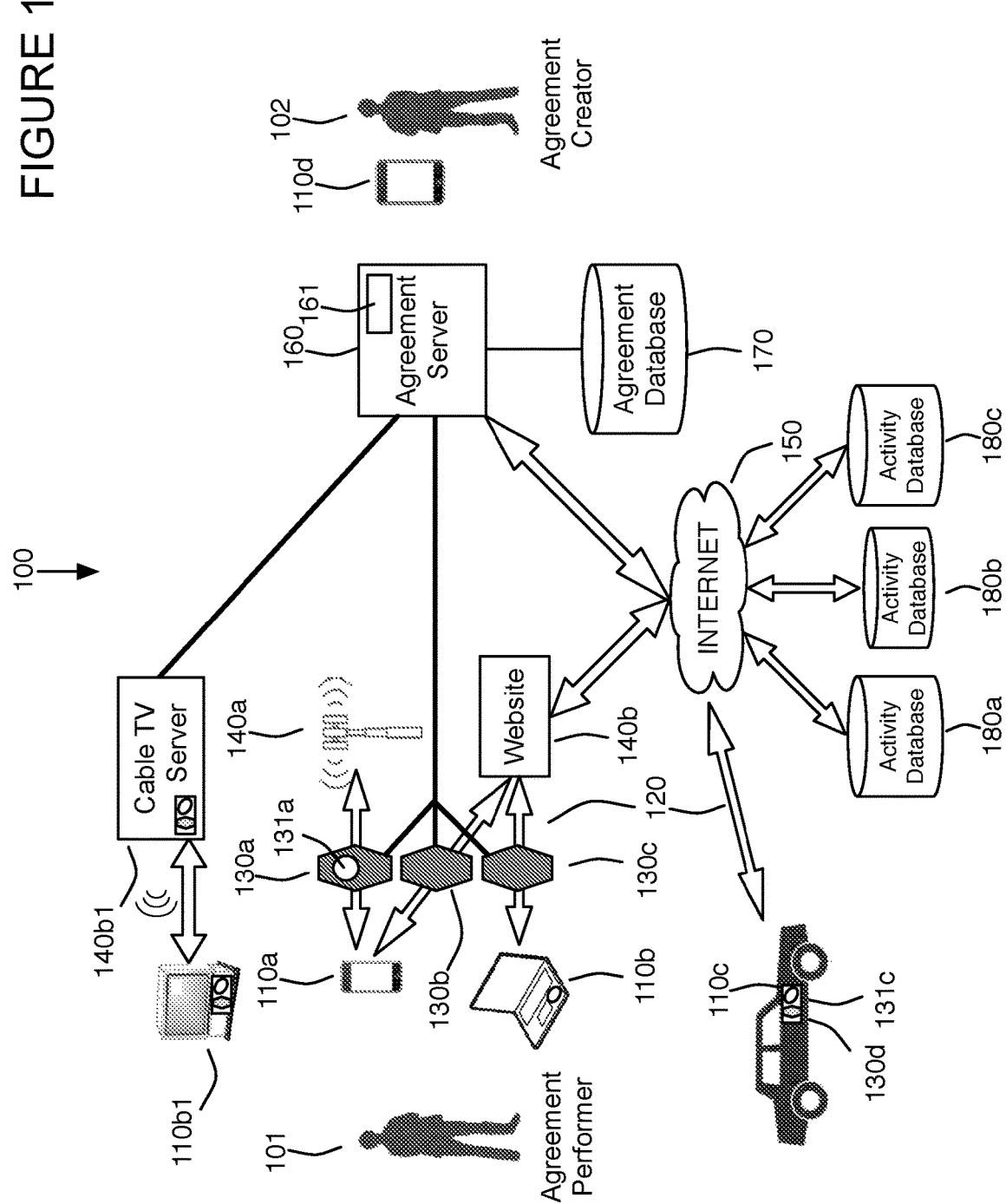
FIG. 1 illustrates an architectural view of an embodiment of a partial information throttle based on compliance with an agreement.

A partial information throttle based on compliance with an agreement will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Embodiment of the invention 100 may be utilized to throttle, or in any manner limit, alter, for example at least partially decrease or increase the functionality of electronic devices and/or throttle, or in any manner limit, alter, decrease or increase the information that is input to, output from, used on or exchanged with electronic devices based on compliance with an "agreement". For example, throttling may be utilized to continue to provide access to information such as websites or TV channels, albeit at a reduced rate or lower resolution/brightness/color space than maximum and/or continue to allow a person to drive a car albeit at a reduced acceleration, RPM or speed, for example based on the person's grades at school, etc., unlike the completely on/off content filters currently in use. This provides an incentive for the agreement performer to improve performance for example by providing an annoying level of performance of a device. An agreement includes one or more conditions to satisfy the agreement, such as one or more tasks or activities to be performed by an agreement performer for example based on a schedule and/or location, at a particular time, or time period, or events that may be encountered or monitored, and actions that are performed to enforce or assert the agreement with respect to any or all electronic devices associated with the agreement performer. Any electronic devices may be throttled including but not limited to telephones, computers, games, televisions, cable set top boxes, satellite set top boxes, routers, music players, vehicles, cars, motorcycles, remote controls for audio/visual components, household devices or any other stationary or moveable object. A parent may associate a particular device with a particular child by obtaining a serial number of the device, or any other identifier generated on the or for the device with the child. The association may be related to the location of the device in one or more embodiments, so that a particular television in a particular room is associated with a particular child. For example, embodiments enable throttling of electronic devices or associated information based on whether an agreement performer such as a child has finished assigned homework, chores or extracurricular activities or events such as weather or health related for example or any combination thereof to redefine the experience of parenting. Embodiments may reduce or block information from particular sources during a scheduled school class and increase or enable non-throttled web surfing for information related to that class based on a schedule and/or location of the electronic device. Other embodiments may be utilized for improved compliance and control of electronic devices in corporate or institutional settings or self-compliance single user settings.

FIG. 1 illustrates an architectural view of an embodiment of the schedule and location responsive agreement compliance controlled information throttle system 100. Embodiments generally involve an agreement that may be between two roles, which may be played by one or more humans, for example agreement performer 101 and agreement creator 102. Agreement creator 102 may be an employer or parent for example, while agreement performer 101 may be an employee or child, or for example may represent other relationships such as a doctor and a patient, warden and prisoner, etc. Alternatively, agreement creator 102 may be agreement performer 101 or agreement performer may include a group of two or more individuals, groups of parents, clubs, circle of friends, etc. The agreement is utilized to throttle electronic devices 110*a*, 110*b*, 110*b*1, 110*c* by setting parameters or other information that limits or alters their functionality in some manner or throttles information to/from/on electronic devices 110*a*, 110*b*, 110*b*1 and 110*c* and any other electronic devices associated with the agreement performer in an intelligent and integrated manner. Agreement performer 101 and agreement creator 102 may utilize electronic device 110*a*, 110*b*, 110*b*1 or 110*d*, for example a tablet computer, cell phone, personal computer, television, or any other device that is configured to communicate with the agreement server. In some embodiments, the agreement creator 102 may be the agreement performer and hence throttling may also be implemented on computer 110*d*. In one or more embodiments, the agreement includes conditions involving activities or events or any combination thereof that are generally created by the agreement creator or which may be default agreements. Only five types of electronic devices, including the control computer 110*c* of the vehicle, are shown for brevity, however the system may interface with any type of electronic device, as previously listed above.

System 100 may access and store agreements in agreement database 170, or in any other component of the system for example. The system may utilize agreement monitor 161 for example implemented as hardware in the form of a specific functional element, software or firmware that executes on agreement server 160, or on any other component that is coupled with the agreement database and the activity database. The agreement monitor is configured to check if a condition has been satisfied to determine compliance. One type of condition may be based on activity status in activity database 180*a*, or 180*b*, or 180*c* or otherwise communicated to the agreement server in any manner. One form of activity database is a School Information System or SIS, which holds assignments, tests, grades, times, dates, durations, locations and other school related activities and associated status. The databases may be accessible over Internet 150, or in any other manner for example. Another type of condition may be based on an event that may be discovered or otherwise determined by the system by polling, or by receipt of an event or by searching or in any other manner employed by the agreement monitor or information monitor discussed below. Internet 150 may be utilized by the system to obtain events related to weather, health, allergies, finances, road conditions or any other type of data that may be accessed on Internet 150 and for example that may form part of a condition of an agreement for example.

One or more embodiments of the invention may be implemented with the agreement database 170 that includes an agreement, any number of activity database(s), for example 180*a*, 180*b*, 180*c*, the agreement monitor and the information throttle. In one or more embodiments, the agreement is associated with the agreement creator 102 and the agreement performer 101. In at least one embodiment, the agreement further includes a first unique identifier associated with the agreement performer 101, a second unique identifier associated with the agreement creator 102 and at least one condition, that when satisfied results in an action to be performed. In one or more embodiments, the condition includes one or more of an activity to be performed by the agreement performer 101 or an event and the action to be performed is based on compliance with the condition by the agreement performer 101 or the event. In at least one embodiment, the agreement database includes at least one condition having a first activity that is independent of input into the at least one electronic device 110*a*, 110*b*, 110*b*1, 110*c*, (or 110*d* for self compliance embodiments), by the agreement performer 101. For example, the activity may include a piano lesson or taking out the trash, which when performed may enable the agreement perform to obtain at least partially increased functionality of any of the electronic devices associated with the agreement performer. If not performed, or if a bad grade is achieved for example, the performance may be throttled down, e.g., at least partially decreased for example.

An information monitor such as information monitor 131*a*, 131*b* or 131*c* may be utilized in many configurations wherein the information monitor is configured to determine monitored information associated with an electronic device that is associated with the agreement performer. The information input to, output from, used on or exchanged with or in any other manner utilized by electronic devices 110*a*, 110*b*, 110*b*1 and 110*c* and that is transmitted and/or received is depicted with arrows 120. Alternatively, or in combination, the information monitor may locally check conditions based on the monitored information to determine when a limit is reached. For example, if a certain number of text messages have been sent/received in a month, the system may limit or block access to all text based applications on all devices associated with a child/employee by broadcasting the monitored information and/or limit event to the agreement server and/or other electronic devices associated with the agreement performer. By determining the monitored information, for example the application being utilized, the information being viewed, the amount of text messages input, etc., the system may locally throttle one or more software apps or applications, or throttle the amount or speed of that monitored information, or allow or block the information altogether, for example to/from cell phone tower 140*a* or website 140*b* or any other information source, or directly throttle the device, i.e., set maximum acceleration or speed parameters for vehicle with computer 110*c*.

In one or more embodiments, the system utilizes information throttle 130*a*, 130*b*, 130*c* and 130*d*, or any other information throttles shown but not numbered in the figure for brevity, coupled with the agreement monitor and optionally with the information monitor wherein the information throttle is configured to perform an action, based on the compliance with the condition by the agreement performer. Information throttles 131*a-d* may throttle or for example at least partially increase or decrease capabilities or functionality or information related bandwidth or information type, e.g., from 0% to 100% functional and all values between and including fully blocked and fully functional. For example if employee 101 has not completed a required corporate training session, their bandwidth or access to text messages or websites may be decreased for example by throttling electronic devices 110*a*, 110*b*, 110*b*1, 110*c* or information to/from/used on electronic devices 110*a*, 110*b*, 110*b*1 or 110*c*. Alternatively, throttling of bandwidth or type of information may be increased, for example in the case of an event such as high pollen count or smog alert that the system detects or is otherwise made aware of. This encourages children or employees to remain inside to use electronic devices in case of hazardous outdoor conditions or alternatively encourages children or employees to locate outdoors in healthy conditions. For example, TV channels or time for television or game playing may be actually increased based on events not necessarily related to the agreement performers activity status. Although shown executing on some computers in FIG. 1, one skilled in the art will recognize that any computer associated with the agreement performer may include an information throttle and/or information monitor itself, i.e., although shown on computer 110*b*, these modules may also reside on 110*a*. In addition, the throttle may exist on the Cable or TV Server 140*b*1 or on website 140*b* for example or in any other component shown.

Thus the information throttle may be utilized to set information parameters within the electronic device to alter the functionality or otherwise control the device in addition to throttling information associated with the device. These types of actions may dim the screen, change the screen resolution/brightness/color space, change the audio volume allowed and/or quality, play sounds, slow the device or set parameters that alter the acceleration, maximum speed, RPM, total distance allowed for travel of the electronic device, for example when coupled with or mounted in a vehicle. As one skilled in the art will recognize, the computer associated with the particular Alternatively, the information throttle may increase information parameters that increase the functionality of the device, for example when a website determines that the outdoor pollen count is too high, implying the agreement performer should stay inside and surf the web or that the vehicle may have a higher speed setting based on road conditions. For cable or satellite or TV related throttling, a standard level of resolution may be set if one or more of the agreement performers watching a television broadcast have reached a reward limit or allotted time limit, or if their grades or chores or extracurricular activities are beneath a threshold or threshold of completion, e.g., bad grades or lawn not mowed, etc., for example as determined by any type of facial recognition technology utilized by a forward pointing camera from the television, computer or mobile phone that is coupled with the system and which identifies users watching the video, or otherwise listening to music, for example within a room having a nanny cam or web cam or any other camera. If the grades or activity status of all or a portion of the users is above a particular level, then the sound and/or video resolution may be set to high fidelity and/or high resolution, e.g., HD format. For high achievers, more channels may also be available, while for low achievers, less channels may be made available or otherwise accessible for example. Any type of facial recognition algorithm may be utilized as long as it may be implemented in the processor associated with the screen of the television or computer or that is on a processor that interfaces with any camera such as a nanny cam to obtain images to perform facial recognition on, including but not limited to U.S. Pat. No. 8,600,120, "PERSONAL COMPUTING DEVICE CONTROL USING FACE DETECTION AND RECOGNITION". In addition, if the particular device does not have a camera, but a camera in the same vicinity exists and is accessible, then that camera may be utilized for facial recognition. Any other type of recognition including body type, hair type recognition may be also utilized so long as separate users may be recognized from each other. If a child walks into a room and is too young for the video being watched, or has grades or other standing in the system beneath a particular threshold, the system may recognize the child, and change the video or channel, block the video or channel, pause the video or channel, display a warning, and may otherwise wait for the underage child or child with grades beneath a particular threshold to leave the room before enabling the video or channel to begin playing again. If a parent realizes that a child had misbehaved, is doing something wrong or for any other reason, the parent may pause or otherwise stop Internet access, video access, game access or at least partially decrease or otherwise throttle any electronic device associated with a child including a television, computer, music player, automobile or motorcycle or any other vehicle or any object having a computer. Multiple children may share one device, for example in the case of a television, which may automatically record the different children watching for reporting purposes, along with a computer having or associated with a forward pointing camera, for example using face recognition as described or in any other manner including requiring logging into add or switch users. Any computer in the system may implement recognition or identification of agreement performers and/or implement throttling as one skilled in the art will recognize.

For example, one or more embodiments of the invention may set the maximum acceleration, RPM or speed setting in engine control computer 110*c* or any combination thereof coupled with the vehicle that controls the vehicle based on performance on homework or a grade obtained on an examination as part of an agreement condition, or based on an event such as a weather event that is discovered by the system when a weather website indicates a chance of slippery road conditions or an accident local to an area where the vehicle is currently travelling or any combination thereof. Embodiments of the invention may throttle information parameters up or in an any increasing fashion as well, wherein the acceleration setting in computer 110*c* on the vehicle may be increased to allow for more aggressive driving performance if the agreement performer has complied with an agreement or in case of emergency as determined by the system or in case of exiting an area where an accident has been passed. Furthermore, the audio quality, volume of a car radio or stations allowed, or a music player utilized which represents computer 110*c* in this embodiment, whether or not moving in the vehicle, may be set based on the activities of the agreement performer, for example good grades or bad grades, or based on the weather events for example to set a station automatically to a weather or hazard channel if the weather event detected is of a particular nature. The combination of setting or throttling devices themselves or information associated therewith may be based on activity type conditions and event type conditions or any combination thereof, which is unknown in the art.

In one or more embodiments of the invention, the agreements may include actions/limits that are performed or enforced before a condition is satisfied. An information throttle may execute locally on devices 110*a*, 110*b* and 110*c* or remotely, for example on a router or other component not shown for ease of illustration, or in any other hybrid or distributed architecture. In one or more embodiments of the invention, the information throttle may be combined with or associated with the information monitor or part of the same functionality or apparatus. The information throttle may implement the action wherein the action is configured to limit the monitored information associated with one or more electronic device, for example slow or limit the number of text messages on a cell phone, display of web pages for any set of web sites, display a reminder on a television to finish homework if changed to a particular channel or program, or in any other manner limit, allow or block information, transfer money, perform notifications or take any other action not directed at limiting information on the electronic device, but in support thereof for example. Information may be locally monitored and enforced, for example the information throttle may locally limit the application, i.e., exit the application or slow it or limit it in any other manner if a local limit is reached for example, without requiring a data transfer over arrows 120, especially if the network is unavailable for example or for example if the condition does not depend on an external activity.

For example, electronic devices 110*a*, 110*b* and 110*c* may communicate over a LAN or using technologies such as BLUETOOTH® or any other wireless networking technology to discover and/or communicate monitored information and/or limits and/or actions between the devices. Any electronic devices may broadcast an agreement performer identifier and monitored information, which may be communicated in any encrypted manner for example. Embodiments of the invention may perform in a non-standalone or integrated manner in order to disable all texting on all devices associated with a child if a text message is sent from a particular location, for example if "grounded", or while moving over a threshold speed indicative of driving which is unknown in the art. In one or more embodiments of the invention, if a text message is sent via a mobile computer or tablet and a cell phone associated with the child is moving over a certain speed, then the computer or tablet may block access by obtaining a speed event from the cell phone and determine that the child is attempting to bypass text throttling through use of a device other than a cell phone to send a text message. This may be implemented by the information monitor 131*b* for example executing on electronic device 110*b* that intercepts input text characters, either from the input devices by intercepting input characters from the device drivers for the input devices, or from applications or browsers running applications that provide events that are sent to the information monitor which then broadcasts the application, event, and information or any combination thereof to any other electronic devices associated with the agreement performer. Once the other electronic devices receive the monitored information message, they may locally sum the usage and implement limits or pass the summed usage to an information throttle to implement the limit on the device. Any other mechanism that enables multiple electronic devices to obtain monitored information and throttle information based thereon is in keeping with the spirit of the invention.

The compliance and activity status may be based on trust, evidence or confirmation or any combination thereof. For trust-based assertions of activity status or completion, the agreement performer is allowed to set the status, e.g., assert that an activity has been satisfied, which may or may not fully satisfy a condition that asserts an action. In evidence-based compliance, the agreement performer is required to set status and provide evidence or submit any information that corroborates the status of the activity, for example photos, videos and/or text or any combination thereof or any other information. In one or more embodiments, the picture may include location information that is utilized to corroborate the evidence. This type of compliance may be utilized until trust is formed between the agreement creator and agreement performer for example. In confirmation-based compliance, the agreement performer submits the evidence. For example, activity status may be input for any type of compliance monitoring to an activity database 180a-c or to the agreement server, or for example on any electronic device 110a-c or via website 140b or cable or TV server 140b1, or via any other apparatus that may communicate with the system. For confirmation-based compliance, the agreement creator may then confirm that the activity has been satisfied before the condition enables an action to be performed for example. Any other granularity of compliance monitoring or assertion is in keeping with the spirit of the invention. Any type of interface may be utilized for input of the activity status by the agreement performer including a checkbox, character entry, mouse click, touch screen entry, etc., as one skilled in the art will appreciate.

In a parent/child embodiment, a parent may embody agreement creator 102 and may propose an agreement with a condition such as "IF all assigned homework is completed by 9 PM" and an action such as "enable social media websites for 1 hour at unlimited bandwidth across all electronic devices associated with an agreement performer, and 1 hour with 50% speed degradation up to 20 text messages". In this scenario, a child may embody agreement performer 101, and may agree to the conditions in order to obtain access to information, including websites, television shows, text messages, phone minutes, game time, music, etc. In this scenario, the condition is effectively an activity to be performed by the agreement performer, which may be stored in activity database 180a or anywhere else in the system for example. In other scenarios, the condition may be related to an activity performed by a third party, such as "if payment in bank account received is greater than $50" for example as a result of performing chores, then an action of "enable text messaging" for example may be implemented on the mobile phone associated with the child, for example if the child has earned enough money from a job or chores. Although not shown for ease of illustration, any other database may be accessed, for example by the agreement server including financial databases at a bank, medical databases associated with the agreement performer, or any other database including weather, and pollen related databases or websites or any other external information that may be obtained by the agreement server for example over Internet 150. Conditions may also include time components in addition to an activity, for example when some activity is due. Alternatively, or in combination, the time component may include a time range, for example a time start and time stop. The time component may be in any format and include any temporal information including a day, date, recurring interval such as "every other Friday", or any other description related to time. Embodiments of the invention may implement actions that throttle or limit monitored information in any manner. For example, actions may include a time limit that limits an amount of time that the monitored information may be utilized or displayed on the electronic device, or a total across all electronic devices associated with a particular agreement performer, a numerical limit that limits a number of data entries associated with the monitored information, a web limit that limits access to a website associated with the monitored information, an application limit that limits access to an application associated with the monitored information, a game limit that limits game parameters associated with the monitored information, a television limit that limits a television program or channel associated with the monitored information.

FIG. 7 illustrates a display coupled with a television, cable set top box, satellite set top box, or website video interface with condition information shown on a throttled program, channel or video, along with an override password entry option. For example, on a television, a child may have a particular favorite program that may be monitored via a set top box that other members of the family may or may not watch, or the television may be in an area accessed by the child. If an action limiting a channel is taken based on activities, then the cable set top box may show message 701 on an associated television showing the channel stating, "you cannot watch this video until your homework is completed", optionally with the name of the child needing to finish homework. In one or more embodiments, the resolution 640×480 versus 1920×1080, e.g., VGA versus HD quality may be altered to throttle the quality of the video down to VGA level or up to HD level based on the grades or other activity status for the agreement performer for example. See FIG. 5 for embodiments that enable identification of the users watching or otherwise utilizing the electronic device using cameras near the electronic device. Video interface 710, may couple with or be part of a television, computer display, video based website, electronic game interface or electronic device applications or any other device that enables video 705 to be displayed. Status message 701 is displayed or otherwise overlaid in one or more embodiments to show any type of information such as the amount of time left in viewing or total electronic device usage, and/or a message that states that the channel, program or video throttle limit has been reached until an activity is complete, e.g., homework has been completed as is shown. If someone else is watching the program, then the parent may override the limit as shown with password override 703. Access to a website that hosts videos may have a more direct authentication, for example through use of a webcam associated with a computer to determine which person is attempting to access videos based on images taken from the webcam associated with the computer that are then processed via facial recognition software or via other authentication methods, e.g., password and user account authentication. As shown, an information throttle may utilize an existing programmable interface within the cable set top box, computer operating system or API to display text or information, or may set the graphics or text values in memory which is automatically displayed, or alternatively generate the characters inject them into the output video feed which is then displayed on the television or computer monitor, or display the information in any other manner.

FIG. 7A illustrates a video interface with a display stating that the throttled program, channel or video cannot be viewed based on the location and/or schedule. The display may be coupled with a television, cable set top box, satellite set top box, or website video interface with condition information shown on a throttled program, channel or video, along with an override password entry option. For example, on a television, a child may have a particular favorite program that may be monitored via a set top box that other members of the family may or may not watch, or the television may be in an area accessed by the child. If an action limiting a channel is taken based on location and/or schedule of the agreement performer/child, then the cable set top box may show message 701*a* on an associated television showing the channel stating, "you cannot watch this video until as your location and/or schedule indicates that you are in math class at this time", optionally with the name of the child needing to finish homework. As discussed above, video interface 710, may couple with or be part of a television, computer display, video based website, electronic game interface or electronic device applications or any other device that enables video 705 to be displayed. Status message 701*a* is displayed or otherwise overlaid in one or more embodiments to show any type of information such as the amount of time left in viewing or total electronic device usage, and/or a message that states that the channel, program or video throttle limit has been reached, or accessed is enabled or disabled, until the agreement performer's location or schedule indicated matches, as is shown. If someone else is watching the program, then the parent may override the limit or accessibility as shown with password override 703. As stated, the system may automatically determine through facial recognition for example, who the users are that are watching the video using cameras coupled with the system. The system may add all of the user time or take the minimum time left from all users to determine whether the video may be watched or at what resolution based on their activity status respectively or in any combination. Access to a website that hosts videos may also utilize direct authentication, for example through use of a webcam associated with a computer to determine which person is attempting to access videos based on images taken from the webcam associated with the computer that are then processed via facial recognition software or via other authentication methods, e.g., password and user account authentication. As shown, an information throttle may utilize an existing programmable interface within the cable set top box, computer operating system or API to display text or information, or may set the graphics or text values in memory which is automatically displayed, or alternatively generate the characters inject them into the output video feed which is then displayed on the television or computer monitor, or display the information in any other manner.

FIG. 6 illustrates a game interface showing an avatar 101*a* or game piece or player associated with agreement performer 101 in a game, along with throttle information based on current information monitoring and limits in conditions along with a reward for performing an activity. With respect to games such as electronic games, an action of "limit game powers of soldier to have only type 1 weapons for game XYZ" may be implemented on a electronic game to limit attributes of a child until all of their homework is complete. This is shown as throttle information 601 and limited throttle options 602, which may be shown with text or graphically, which other local or remote users in the game may or may not see along with the action and/or reward associated with any upcoming activities. The agreement performer may be asked whether they would like to quit the game and earn their reward for completing a task, for example for completing their homework. Rewards may also include frequent flyer miles or points in some embodiments. In one or more embodiments of the invention, the game application makes calls to embodiments of the invention requesting current limits for game play or total combined usage limits associated with the game player, i.e., agreement performer 101. In other embodiments of the invention, the operating system on the electronic game hosts a service that implements the information monitor, which intercepts inputs and sends messages to the game to introduce notifications, etc., when external events occur on the agreement server or when limits are reached. In other embodiments, the information throttle may send the messages and/or disable the game, or introduce CPU cycles to slow the game for the agreement performer or delay inputs by the agreement performer to make the game less responsive, for example while homework is still to be done. This may be performed by the information throttle accessing the game or computer operating system and injecting cycles or using interfaces to the game application for example as one skilled in the art will appreciate. In other embodiments, a router may implement an information monitor or information throttle that closes ports after game limits have been reached or when total combined usage limits have been reached. Any combination of the above implementations may also be utilized in keeping with the spirit of the invention. In addition, any camera coupled with the system may be utilized to authenticate the user and for example make sure that anyone else cannot watch the game play if they are out of reward time or otherwise based on their activity status, e.g., grade point average, etc.

According to at least one embodiment of the invention, the action may direct the information throttle to at least partially increase or decrease a performance of the at least one electronic device 110*a*, 110*b*, 110*b*1, 110*c*, (and/or 110*d* for self compliance embodiments). As such, based on if the condition has been satisfied and during use of the at least one electronic device by the agreement performer 101, the information throttle may maintain functionality of the at least one electronic device 110*a*, 110*b*, 110*b*1, 110*c* and/or 110*d*, and at least one of at least partially decrease a speed of functionality or information bandwidth between fully blocked and maximum bandwidth of the at least one electronic device and limit speed of responsiveness of the at least one electronic device. In one or more embodiments, at least partially increasing or decreasing a performance of the at least one electronic device may occur through an insertion of at least one time delay between at least one of acceptance of an input of the information, between a display of the information, or between a transfer of the information to or from the at least one electronic device, while still enabling display of information or other functionality associated with the electronic device albeit at a slower/greater rate. The information throttle, in one or more embodiments, may perform the action to degrade or increase performance of the electronic device or an apparatus coupled with the electronic device, alter the resolution, dim or brighten a display, or change between black and white and color or any color space in between or alter the sound quality or lower or raise an allowed volume or play a sound on the electronic device or any combination thereof.

In one or more embodiments of the invention, the information throttle may perform the action, such as by limiting information displayed on the at least one electronic device 110a, 110b, 110b1, 110c and/or 110d based on the location of the at least one electronic device, and based on the schedule associated with the agreement performer 101. Therefore, the information displayed may be associated with the schedule and the location. If the agreement performer is in a specific class, course and/or at an event, for example, the information throttle limits or otherwise throttles information displayed on the at least one electronic device, 110a, 110b, 110b1, 110c and/or 110d, as used by the agreement performer 101, to allowable websites and/or applications. Hence, the information throttle allows information directly related to the specific class, course and/or event the agreement performer should be attending, by using the schedule and location the agreement performer is scheduled and/or registered to be in. The information throttle, in one or more embodiments, may perform the action, such as by enabling other information displayed on the at least one electronic device 110a, 110b, 110b1, 110c and/or 110d, if the location of the at least one electronic device is not associated with the location at which the schedule associated with an activity is to occur with respect to the agreement performer 101. As such, the other information is accessible if the agreement performer 101 is not at the location associated with the activity. If the agreement performer 101 is not scheduled and/or registered to be in a specific class, course and/or event at a particular time according to the agreement performer's schedule, for example if the agreement performer 101 is at home sick, not at school, the day is not a school day, and/or there is no event scheduled, then the agreement performer 101 is able to visit websites and/or access applications not associated with the one or more schedules activities, classes, courses and/or events. As such, information throttle may be contingent upon other throttling conditions, independent of or in combination with the activity, as determined by the agreement creator 102.

Figure 6A:
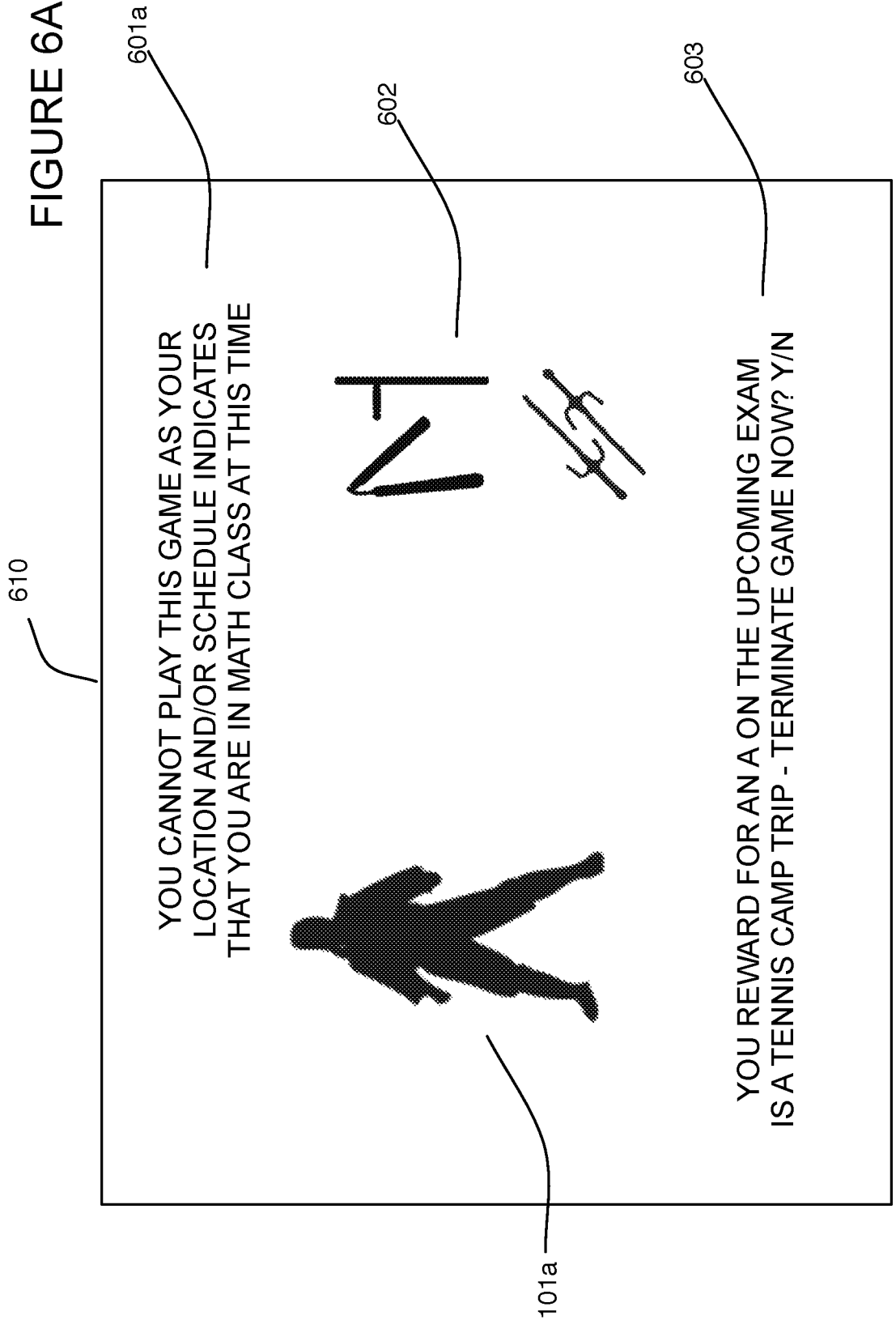
FIG. 6A illustrates a game interface with a message stating that the game cannot be played based on the location and/or schedule.

FIG. 6A illustrates a game interface with a message stating that the game cannot be played based on the location and/or schedule. As depicted in FIG. 6A, the game interface shows an avatar 101a or game piece or player associated with agreement performer 101 in a game, along with throttle information based on current information monitoring and limits in conditions along with a reward for performing an activity. With respect to games such as electronic games, an action of "limit access to game for game XYZ based on location and/or schedule" may be implemented on an electronic game to limit or not allow a child to play the game until the child's location and/or schedule is in parallel with where the child needs to be. This is shown as throttle information 601a and limited throttle options 602, which may be shown with text or graphically, which other local or remote users in the game may or may not see along with the action and/or reward associated with any upcoming activities in 610. For example, as shown in throttle information 601a, the electronic game may display a text and/or graphical image to the child or agreement performer stating "You Cannot Play This Game As Your Location and/or Schedule Indicates That You Are in Math Class At This Time". The agreement performer may be asked whether they would like to quit the game and earn their reward for completing a task, for example for completing their homework or studying for an exam as shown at 603. In addition, one or more embodiments may utilize a camera to determine the user or users watching and/or playing the game and throttle based on facial recognition for example as discussed with respect to the player and/or viewer(s). If the camera is covered or the agreement performer is attempting to hide from the camera, the system may throttle the output device for example until able to obtain image(s) of the viewers. Alerts may be sent to an agreement creator if the camera(s) proximal to a game, TV, computer, etc., are unavailable for example.

As limits are being accumulated per device, the limits may be combined to form a total limit of play time for example and agreement monitor 161 may add the usage of all electronic devices based on information gathered from information monitors 131a and 131b and add them together to derive the total time that is then utilized by information throttles 130a, 130b and 130c (or again, any other information throttle shown in the figure but not numbered for brevity), to then throttle the information on those devices to slow them significantly or disable them altogether once a threshold of monitored information is reached, whether on a per device or across-device basis. Activities may originate from the electronic devices themselves and may include any output that each electronic device is capable of generating, such as the output results of character inputs, to determine if a child has read an entire chapter, or completed an electronic test for example. Regardless of the origin, the activities may be saved locally and/or remotely in agreement database 170. Conditions, for example the that specify event and values thereof or ranges may be utilized including but not limited to orientation, location, speed or any other characteristic of an electronic device, along with a description of the application being used may then be utilized to assert an action, for example to limit text messaging across any or all devices, if driving for example. Events such as location-based events may be checked against agreements to find out whether to assert an action to control an electronic device or throttle information to/from/on the electronic device. For example, if a child is grounded, then bandwidth may be at least partially decreased or terminated outside of the grounded area and increased when the child is within the grounded area. In addition, events such as predefined distance events that occur if an agreement performer has moved themselves over an agreed upon distance and for example under the speed associated with a car may be utilized to throttle or increase the amount of bandwidth or type of data that the agreement performer may interact with or game playing levels may be increased or more aggressive games may be allowed or more weapons may be enabled within games or playlists with more energetic music may be enabled, etc. The activities may be recorded into the activity database associated with the activity, namely 180a, 180b or 180c or in any other manner recorded, for example locally until a network connection is obtained. Any local area network devices associated with the agreement performer may query and find each other using any type of network protocol, such as mNDS and share monitored information and throttle local devices accordingly.

Figure 2:
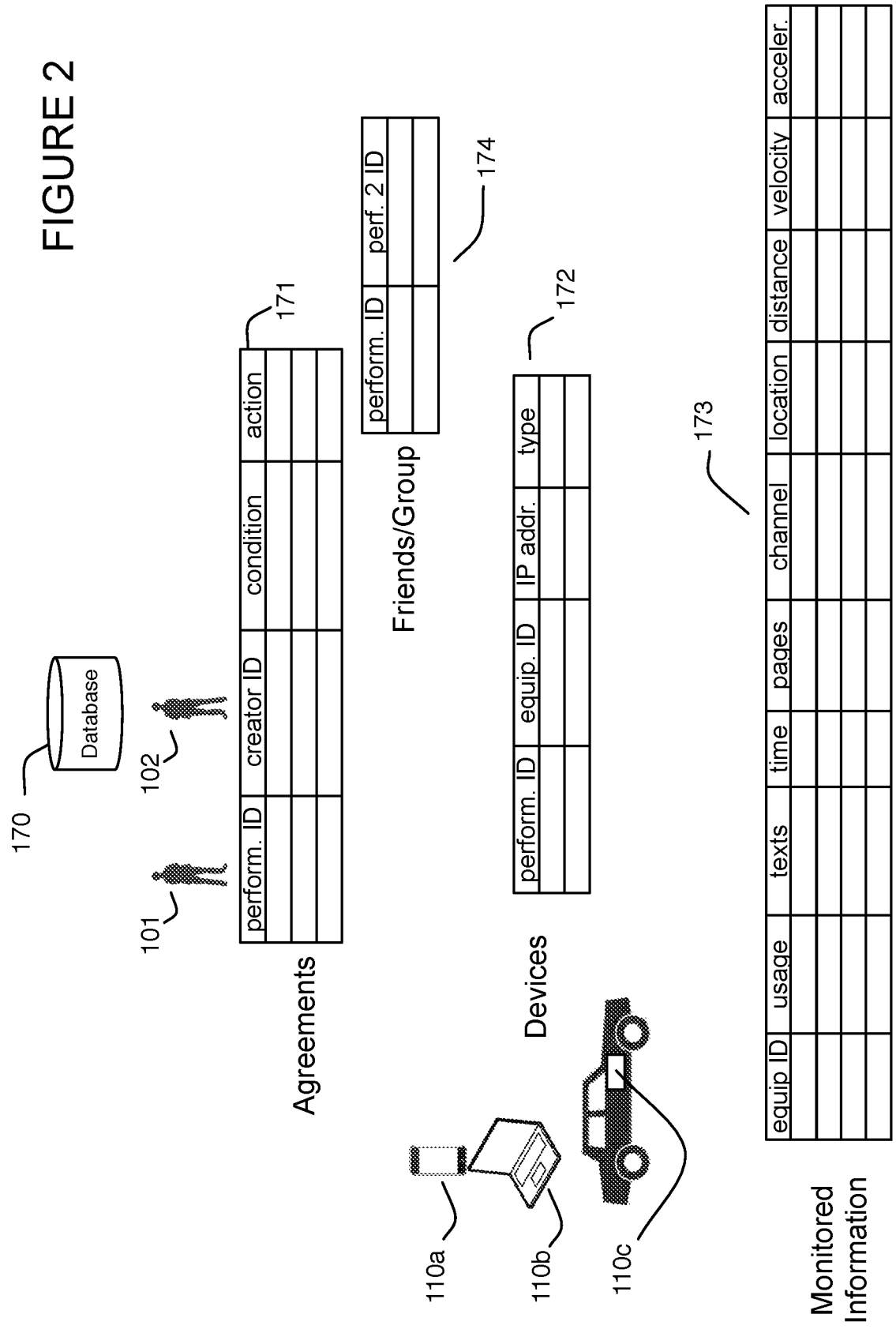
FIG. 2 illustrates an embodiment of a schema utilized in an embodiment of an agreement database.

FIG. 2 illustrates an embodiment of a schema utilized in an embodiment of an agreement database. Agreement database 170 may be an object oriented or relational database as shown for ease of illustration, or any other type of data retaining apparatus. This may include memory, distributed memory or any other type of device that is configured to retain data. The agreement held in the agreement table 171 generally includes information such as fields that related to a first unique identifier associated with the agreement performer, shown in the figure as a "perform. ID" field, a second unique identifier associated with the agreement creator, shown in the figure as "creator ID", a condition to be satisfied by the agreement performer, shown as the third field, and an action to be performed based on compliance with the condition by the agreement performer shown as the fourth field. Conditions may be in the form of text or XML or keys into other tables or references to other objects. The format of the conditions may be any format so long as the activity or event and associated action may be associated with one another. In addition, information related to the electronic devices associated with an agreement performer may be stored in device table 172 for example with the unique identifier of the agreement performer and a unique identifier associated with each electronic device, which is shown as the "equip. ID" field, with an address such as an IP address, or any other address, phone number of manner of identifying the particular electronic device, along with a type field for the type of the electronic device, which may for example be a manufacturer, model or serial number or any other quantity associated with the particular electronic device or any combination thereof. In addition, monitored information may be stored in monitored information table 173, with respective quantities for the types of information that the device may input, output, use or exchange. This table may alternatively be stored local to devices 110*a-c* or in any other component in the system in a distributed manner and communicated to the agreement monitor, or alternatively the agreement monitor may run local to a device or in any other configuration so long as throttling can occur. This may include fields such as usage, texts, time, pages, television channel, television program, game, location, distance traveled, velocity or acceleration values obtained from any device in the system, or any other quantity. The information may be stored and purged as desired for particular time periods for storage saving considerations or may be retained in entirety for data mining purposes for example. Embodiments of the invention may be configured to enable payment for data mining of the information regarding activities, usage, equipment identification or any other quantity stored in any element of the system. Embodiments of the invention may also be purchased on a fee for use basis, monthly basis, enterprise basis, or in any other manner to enable access to any records or any information in database 170, 180*a-c* across one or more agreement performers or agreement creators. In one or more embodiments, agreement server 160 may be utilized by a data miner to access information in the system, including but not limited to any of the fields or tables or other data shown in FIG. 2, or any other information utilized and saved by the system. Although not shown for brevity, other tables for personal data associated with the agreement performer and/or agreement creator may be utilized to store financial, medical, weather or allergy-related, or preference data or any other type of data, which may also be data mined, for example using agreement server 160. One or more embodiments may utilize tables that have a foreign key or other indicator to tie the records or objects to a particular agreement performer or creator, as one skilled in the art will recognize. This type of data may also be mined along with any of the other data utilized in the system, (see FIG. 11 for an example data mining interface). In addition, other tables including a "friends" or group table listing all friends of a child, or coworkers in a group associated with a child or employee i.e., perform. ID as the key, with friend ID, or second performer ID as shown, as a field, optionally with contact information, parent contact information, privacy level of access, associations/clubs/common activities, etc., may also be stored in any desired level. This enables quick lookup for example for users that are observed, for example via facial recognition or other identification technologies to determine throttling for games, TV channels, websites, etc., after obtaining image(s) from a camera proximal to the computer, TV, game console, etc. The friend associations may also be data mined and otherwise processed to determine optimal sets of friends for a child, and to alert a parent for example if one of the child's friends is in trouble, grounded, getting bad grades, etc., so that the parent may take appropriate corrective action as soon as possible.

Non-time oriented conditions, or conditions based on events may also be implemented, for example if a speed of an electronic device is indicative of driving, an action such as limiting or disabling text messaging from one or more electronic devices associated with an agreement performer may be implemented. This condition may be broadcast widely or locally to limit or disable text messaging if moving over a certain speed indicative of driving or may be conditional based on a location of movement, such as in a school zone. For example, speed and range may be utilized with respect to cell phones that commonly have GPS chips or other location based functional element such as cell tower triangulation location features. In this scenario a condition may be "if agreement performer is travelling faster than a defined speed at a particular location" with an action of "ground individual by sending messages to the agreement performer and agreement creator and limit cell phone usage to home number and 911 only and enable only informational television programs". By monitoring the speed of the cell phone and monitoring the location, which can be translated into a speed limit on each street being traveled, the system may ensure that the child is not in a vehicle that is speeding, whether driving or not. Conversely, if the cell phone has not moved during school a warning action may result in a text message to a parent notifying the parent that the child is attempting to circumvent the system by leaving the cell phone in a locker for the lunch period, or for example is texting using an app on a mobile computer or tablet other than the cell phone. Any quantity that may be monitored may be utilized to perform an action that limits or throttles information, or transfers money or notifies an interested party or performs any other action. The schemas described are not limited to the fields described and may be implemented with any other fields or the fields described or any combination thereof as desired for the particular implementation and electronic devices to be utilized with embodiments of the system for example. Any other condition or action that throttles information to one or more electronic devices associated with an agreement performer is in keeping with the spirit of the invention. Alternatively, or in combination, if an agreement performer has walked or run over a certain distance as per the GPS tracking on the electronic device associated with the agreement performer, then bandwidth or access may be increased. This may be utilized for medical purposes to ensure that the agreement performer is getting the prescribed amount of exercise. In addition, bandwidth or access time or access to particular games, websites, text messaging or any other electronic device usage may be increased for example on days with high smog or high pollen counts or based on any other external condition, whether medical or not.

Figure 3:
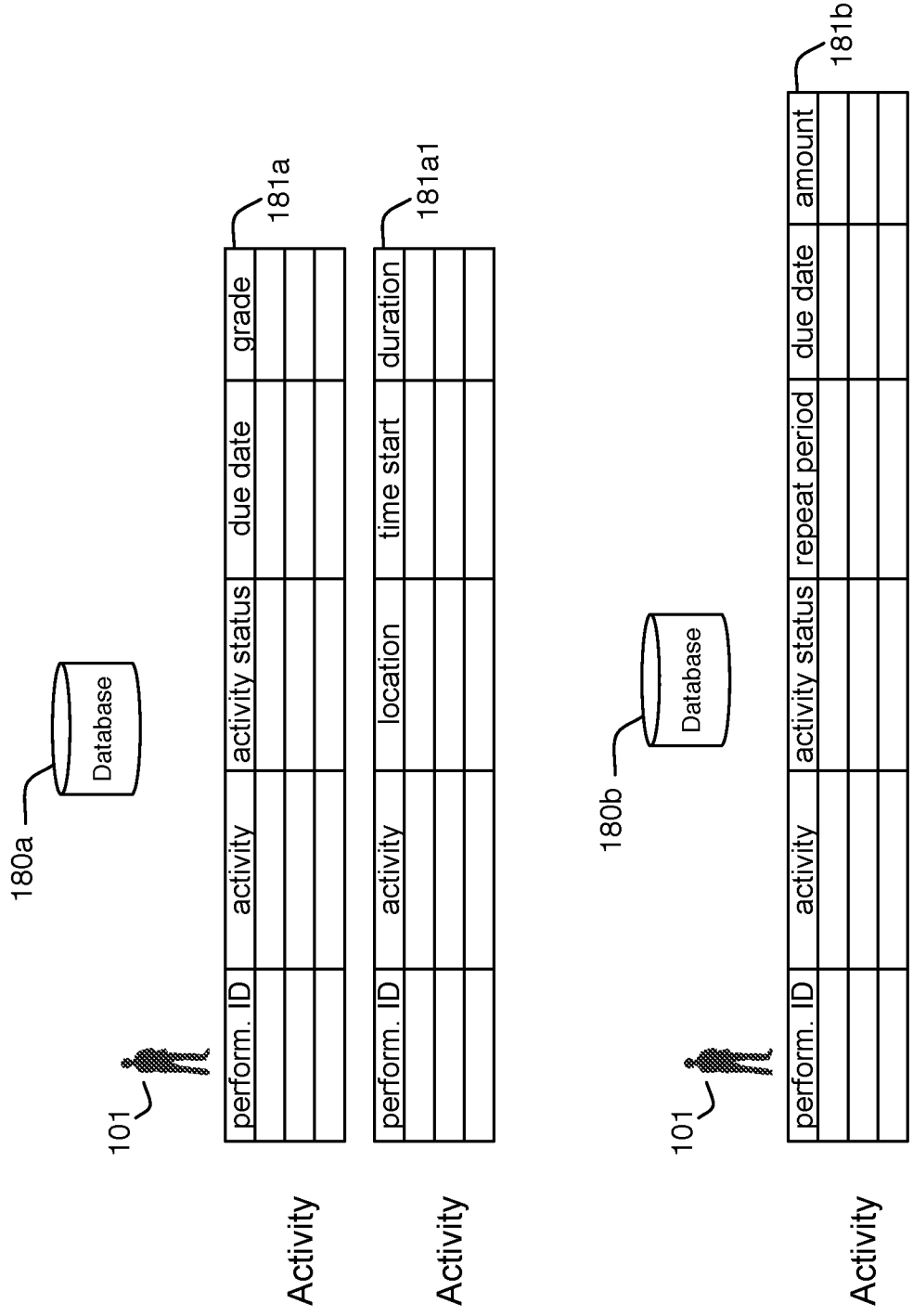
FIG. 3 illustrates multiple embodiments of schemas utilized in embodiments of activity databases.

FIG. 3 illustrates multiple embodiments of schemas utilized in embodiments of activity databases that contain activity status associated with the condition to be satisfied by agreement performer 101. Activity databases 180*a* and 180*b* may be integrated with the agreement database or separate or distributed in any manner as desired. As shown, the activity databases may include fields that describe the activity, activity status such as complete or not or a percentage complete for example, a due date or any other temporal quantity related to a task including start date, repeat period, or any other quantity along with performance data such as a grade. One or more embodiments of the invention may interface with or otherwise utilize one or more activity databases that include activities related to schoolwork, chores or extracurricular activities or any combination thereof. Activity table 181*a* may for example be targeted at homework or be part of a school information system (SIS) and which may include a class schedule so that throttling of information may occur based on the class that the student is currently supposed to be in based on a time and/or location of the class or electronic device, while activity table 181*b* may be targeted at chores and include amount of payment for particular activities such as mowing the lawn for example. Alternatively, or in combination, table 181*a*1 may include the class schedule of the agreement performer separate from or in addition to activity table 181*a*. Although shown on an activity basis, one skilled in the art will recognize that the location may be defined as any distance from the known location of a school or other location associated with the activity in the schedule. Any other schemas may be utilized as desired so long as they are capable of associating an agreement performer with an activity and status thereof. For example, an activity database such as a school information system that includes homework activities and other assignments or tasks and associated activity status may be utilized. In addition, a parent may implement a similar system with chore related activities including "mow the lawn every other Saturday" with associated activity status of True or False for the current time period. The associated action may include "enable 20 extra phone minutes" or "enable TV program XYZ" or any other action including "transfer $20 to allowance money card" for the payment of an allowance for example, which may be transferred on a recurring schedule. The activity status may information related to completion of an activity assigned to the agreement performer in the form of Boolean True or False, or a range, which may be utilized a range of actions based on a condition of "grade A", "grade B", "grade C" conditions in a particular class or on a particular test or as a cumulative average across classes or any other combination thereof. This range of conditions may be utilized to provide a corresponding range of actions that correspond to the different grades, for example "provide unlimited web browsing", "degrade browsing speed by 20%", "send alert when electronic device is greater than 0.25 miles from home and send text to agreement performer stating You Are Grounded", to implement a "grounding" respectively. Compliance with corporate or institutional requirements may also be performed with any activity data store capable of holding the agreements associated with these types of entities. The activity field or an additional field may be utilized to store a list of allowed URLs or programs for example that the agreement performer may utilize between the "time start" and "duration" and/or based on the "location". Any other tables or fields may be utilized to hold the allowed information or information sources based on the schedule and/or location as one skilled in the art will recognize.

According to at least one embodiment of the invention, the activity database 180*a*, 180*b* and/or 180*c* includes activity status associated with the activity of the condition to be satisfied by the agreement performer, in which the activity database includes a schedule associated with the agreement performer 101, for example a class schedule, task schedule, chore schedule or any other schedule having activities and associated times for example. In at least one embodiment, an agreement monitor 161 may be coupled with the agreement database 170 and the activity database 180*a*, 180*b* and/or 180*c*, such that the agreement monitor 161 may check if the condition has been satisfied based on the activity status or if the condition has been satisfied based on the event, in order to determine the compliance.

FIG. 4 illustrates an embodiment of the functionality employed by agreement monitor 161. As shown, the agreement monitor accepts input related to the agreement creator and agreement performer at 401 and in one or more embodiments of the invention creates unique identifiers for use in database 170 for example. In addition, the agreement monitor accepts at least one condition and at least one action. The information may be stored in any location in the system, or in multiple locations depending on the architecture employed, as one skilled in the art will recognize. The agreement monitor accepts any electronic device related information at 402, including any directly related IP addresses or phone numbers or television IP address, or any indirectly related information cable or satellite or other set top box identifier, any channels or shows that a particular agreement performer is known to view, or any other information which may be utilized to control information on the electronic device. The information monitors on the various electronic devices monitor information and sends the monitored information or characteristics of the monitored information to the agreement monitor. The monitored information may include key strokes, number of text messages, URLs, images from the screen of the electronic device or images taken with the camera of the electronic device, for example to ensure that the agreement performer is the one using the electronic device, speed and location of the electronic device or any other metadata associated with the device and not the input, output or exchange of data from the device. The agreement monitor may then accept the monitored information and sum usage or other information across multiple electronic devices associated with the agreement performer at 403. If there is no network connection available, but local BLUETOOTH® or other wireless local area network communications are available, then all of the local electronic devices may pass monitored information to one another to locally sum usage. The summed usage is sent to all electronic devices and/or information throttles at 404 for local use and to potentially implement previous limit settings, either from the agreement monitor or via local communications if no wide area network connection is available at the time. The agreement monitor checks activity status at 405 for activity-based conditions associated with the agreement performer and any accepts discovers or finds or in any other manner obtains events, such as weather, health, or any other events and when status changes or events occur, conditions are checked at 405. If a Condition has been satisfied, is within range or above or below a threshold, then the Action is performed at 406, otherwise, the agreement monitor accepts monitored information at 403. The action performed may be sent to all information throttles to update their local settings and enforce actions at 407 if conditions are satisfied. The action may throttle the electronic device or throttle information to/from/used/on the electronic device for example. Although shown as an event based architecture, the electronic devices may also poll the agreement server or other local electronic devices or any other device to determine if any condition has been satisfied. Any notifications may be sent at 408, for example to inform the agreement creator of compliance or non-compliance with the condition, or for status updates for monitored information for example. Alternatively or in combination, any apparatus in the system may be utilized to send any notification.

By way of one or more embodiments, the information monitor 161 may determine monitored information associated with at least one electronic device associated with the agreement performer 101 from each of the at least one electronic device 10a, 110b, 110c and/or 110d. In at least one embodiment, the information throttle may be coupled with the agreement monitor and optionally with the information monitor, such that the information monitor may perform the action based on the compliance with the condition, and with one or more of a location associated with the electronic device, the schedule associated with the agreement performer, and both the location and the schedule.

Any combination of hardware may be utilized to implement the system. In one or more embodiments, the agreement monitor is configured to execute on the server computer that for example be remotely accessed over a computer network. This is not required however and the agreement monitor may execute on any computational device in the system. For example, the information monitor may execute on a mobile phone associated with the agreement creator or in any other computational element or across multiple computational elements that make up the system.

FIG. 5 illustrates embodiments of various components or electronic devices in the system that may be utilized to host an information monitor, information throttle and optionally the agreement server if desired, or any combination thereof. The information monitor 131a or 131b and information throttle 130a or 130 (or the information throttles shown in the television in the middle lower portion or in the cable or TV server on the lower left side for example) may execute on an electronic device associated with the agreement performer, or shared or indirectly related devices such as router 501, or a cable set top box, electronic game apparatus for example which may be include or be part of or utilize any type of game controller and/or game console, music player, and any other type of electronic devices, which are not shown for brevity, or any other computational component coupled with the system or any combination thereof so long as the information monitor and information throttle may limit monitored information associated with the agreement performer based on compliance with an agreement, or external condition for example. In one or more embodiments, the information monitor is configured to interface with a proxy server or web filtering software or any other content filtering component 502, to enable existing hardware or software content filtering solutions to throttle monitored information based on compliance by an agreement performer, in addition to their inherent content filtering. At least one embodiment of the system may utilize an electronic device such as a telephone, a computer such as a laptop, tablet, smart phone, or a music player, a game controller, or a television, or associated set top box, or any other device such as a network interfaced device or any information input or output device, or any combination thereof. In one or more embodiments, any electronic device on a local area network may communicate with any other electronic device on the local area network to coordinate or in any other manner communicate information regarding monitoring and enforcement, for example using mDNS. Cameras 550 associated with or otherwise directly or indirectly coupled with the associated electronic device or with the system may be utilized to determine who is viewing the associated display of the electronic device that is for example displaying a game, channel, program, video, audio or any other information. Cameras 550 may be integrated into the television or personal computer or mobile phone or coupled wirelessly or via a wire to the associated device. Alternatively, the cameras 550 may be web cameras, for example a nanny cam 560, or car dash cam, etc., that is/are configured to obtain images proximal to an electronic device and send the image(s) to the system, for example the agreement server or electronic device itself to perform facial recognition or other identification algorithms in order to determine who is attempting to utilize the electronic device. Any method of obtain images from the remote camera 560 including wireless transmission and reception of images is in keeping with the spirit of the invention.

As shown, a hardware, software or firmware embodiment of information monitor 131a may be utilized in router 501 or Cable or TV server 140b1 (or even web server 140b for example as shown in FIG. 1), which may interface with information throttle 130a directly or indirectly, which itself may be implemented in hardware, software or firmware. Likewise, information monitors 131b shown respectively on smart phone 110a and computer 110b or the other devices shown may be implemented as software "apps" or part of an "app", service or in any combination of hardware or firmware. As smart phone 110a includes a telephonic interface as well as wireless interface, the usage of the telephone and browser and/or any applications that execute on the smart phone may be obtained by loading the app on the phone and executing the app. The app may hook into the operating system and not only obtain usage associated with the other applications and interfaces, but also with other components on the smart phone including the location and orientation interfaces to determine if the location is changing with respect to time to derive velocity. In addition, existing apps on the smart phone may be interfaced with in order to limit the apps wherein the apps may be locked or set to execute at a lower priority based on the action implemented by the information throttle. In addition, images may be taken from the screen for use in determining if the owner of the smart phone is attempting to bypass text or chat restrictions using a browser-based proxy. Images from the camera on the smart phone may be taken from the forward or rear-pointing camera if so equipped to ensure that the person using the smart phone is agreement performer. Image processing may be performed to determine if the face in a captured image matches the face of the agreement performer and send a notification if this is not the case. In the hardware embodiment shown in FIG. 5, the smart phone and the computer are wirelessly communicating with router 501 that in turn also implements an information monitor and information throttle, 131a and 130a respectively. The information monitors may monitor different information in a harmonized manner in order to minimize processing on each device. For example, the smart phone information monitor may monitor app specific usage while the router information monitor may monitor web URLs being viewed on the smart phone or may be utilized to detect known open proxy server addresses for an attempt to bypass the system. The information throttle on the smart phone may be capable of interjecting CPU cycles based on an action to slow the device or degrade performance while the information throttle on the router may add delays for the particular user with limits and allow other users of the router to pass on a priority basis or unhindered. The information throttles may also communicate over router 501 to the agreement server or the agreement monitor may run locally on any of the three devices depicted. Due to the ubiquitous nature of television and media websites with videos, television channels or programs that are available on television for example via a television tuner, satellite tuner, or cable set top box tuner, which may be also available on a smart phone via a cable company application may be limited in a synchronized manner so that the set top box and the smart phone allow only a particular amount of time to be watched with respect to a particular channel or television show so that a child cannot bypass the restrictions through use of multiple devices. In the architecture shown, if an agreement performer is able to bypass one information monitor or information throttle, then another information monitor and information throttle in the information pipeline enables the system to perform in a more robust manner. Embodiments that throttle electronic devices associated with apparatus such as vehicles for example may include software components that execute in one or more of the vehicles computers, or which interface to one or more information bus and send vehicle control messages on the bus, such as a CAN or Controller Area Network bus, or LIN or Local Interconnect Network bus, for example that interfaces with an On-Board Diagnostics connector, which has been required in all cars sold in the U.S. since 1996 as one skilled in the art will appreciate. This enables setting of acceleration or other parameters such as timing or maximum fuel injection that may be utilized to indirectly set maximum velocity or acceleration. In addition, one or more embodiments may interface or control a D2B or domestic digital bus high speed multimedia interface or any other communication interface in a vehicle to throttle sound or video for example.

In one or more embodiments, monitored information includes telephone time usage, a number of telephone calls, a telephone number, a number of text messages, a location of the electronic device, a speed of the electronic device, a website address, a computer application that is running or has run or attempted to run, a game, a television channel, a television program, a video, an image captured from the electronic device, an image captured from a camera coupled with the electronic device, a speed and location of the electronic device. Embodiments of the invention may implement an action configured to limit the monitored information to limit input to, output from or data exchange with the electronic device. Other actions may transfer money, send notifications to other parties, etc. Alternatively or in combination an action may be configured to limit the monitored information in a manner for example that degrade performances on the electronic device as previously mentioned. This may be implemented as processing cycles or time delays that may be inserted between accepting input or displaying information or transferring information to or from the electronic device.

In one or more embodiments, the action may be performed across two or more electronic devices associated with the agreement performer, for example a telephone, a computer, a music player, a game or a television, or any other information input or output device, or any combination thereof. In this embodiment, the agreement monitor is configured to sum the monitored information from each respective information monitor into a combined monitored information total and the information throttle is configured to limit the monitored information on each of the two or more electronic devices based on the combined monitored information total. This for example can be utilized to limit total time spent by a child online, watching television, playing electronic games, texting and talking on the phone, so that the child for example may do any of these activities so long as the time spent doing all of the activities is less than a particular threshold, after which for example a degraded performance may be employed on one or more of the electronic devices if desired. Although this example relates to time, it may also relate to any monitored information. For example, limiting a child to 1 hour web browsing across all electronic devices such as a cell phone, tablet computer and laptop computer is accomplished by adding the usage from all monitored devices and throttling all devices when the limit is reached. Embodiments may recognize multiple users, for example using cameras 550 or any other cameras coupled directly or indirectly with the system such as nanny cams or dash board cameras or security cameras for example to determine the identity of the users proximal to an electronic device and throttle the device based on the minimum or any function of the available time for the users or otherwise disable or throttle the electronic device until all users are identified by the system. This sophisticated throttling of information is unknown in the art with respect to agreement compliance and known content filters and makes the agreement monitor the enforcer, not the parent.

In at least one embodiment, the action may be performed across a plurality of electronic devices from the at least one electronic device 110*a*, 110*b*, 110*b*1, 110*c* and/or 110*d* associated with the agreement performer 101, wherein the plurality of electronic devices may include a telephone, a computer, a music player, a game or a television, a vehicle computer or a remote control or an appliance or any combination thereof. The agreement monitor, in at least one embodiment, may sum the monitored information from each respective information monitor from the at least one electronic device 110*a*, 110*b*, 110*b*1, 110*c* and/or 110*d* into a combined monitored information total. The information throttle, in at least one embodiment, may limit the monitored information on all of the plurality of electronic devices based on the combined monitored information total. By way of at least one or more embodiments, the at least one electronic device may notify the agreement performer 101 on one or more upcoming activities to be performed by the agreement performer 101 and/or on one or more upcoming events.

For example, in at least one embodiment, the agreement performer 101 may be pre-warned about an upcoming assignment, exam and/or homework, via the electronic device 110*a*, 110*b*, 110*c* and/or 110*d*, based on the agreement performer's schedule and location. As such, the agreement performer 101 may be warned 1 day before a due date of a homework assignment, 1 week before an upcoming exam, etc. As one of ordinary skill in the art would appreciate, any other pre-warning of an upcoming task or activity in advanced of the actual time or due date is in keeping with the scope of the invention.

In one or more embodiments of the invention, the agreement monitor may push new agreements to the at least one electronic device 110*a*, 110*b*, 110*b*1, 110*c* and/or 110*d*, or the at least one electronic device 110*a*, 110*b*, 110*b*1, 110*c* and/or 110*d* may poll the agreement database 170 to the new agreements. In at least one embodiment, the new agreements may include a serial number to enable robust transfer of the new agreements without loss of the new agreements.

Figure 8:
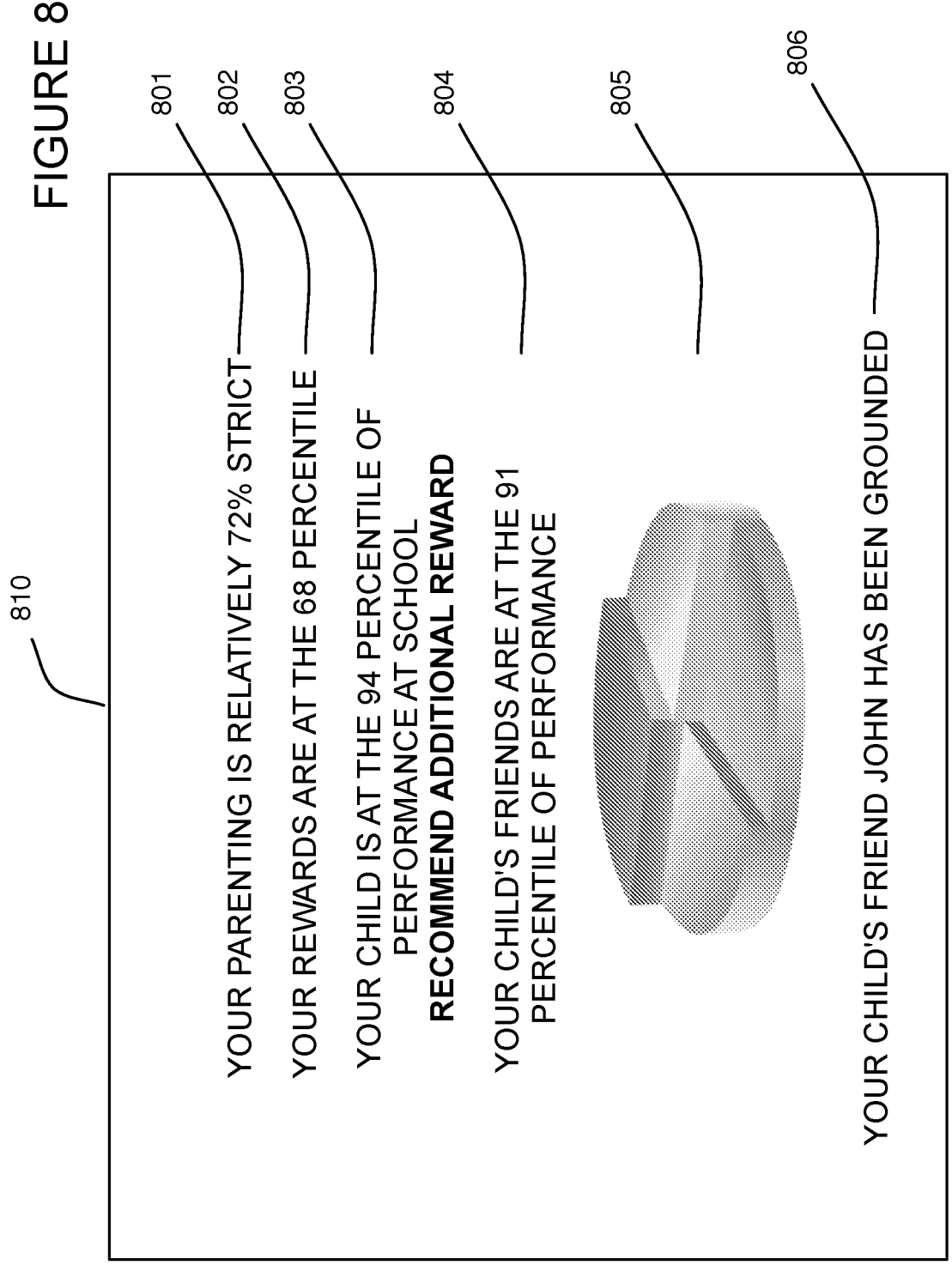
FIG. 8 illustrates an interface for an agreement creator, such as a parent, showing information that has been data mined relative to other parents, children, relative or absolute performance status of activities, actions such as rewards, or recommended rewards, graphical information depicting any combination of information and any warnings.

FIG. 8 illustrates an interface for an agreement creator, such as a parent, showing information that has been data mined relative to other parents, children, relative or absolute performance status of activities, actions such as rewards, or recommended rewards, graphical information depicting any combination of information and any warnings. At least one embodiment of the information throttle is configured to notify the agreement creator based on the compliance. This can be in the form of an email, text message, web page, voice message, or any other type of communication and may include a display such as a visual or audio display of information related to the compliance. As shown, the agreement creator may be notified in a visual display 810 showing relative strictness 801 of an agreement creator based on the level of reprimands or threshold for conditions required for compliance, or in any other manner. Audio or text based notifications are also in keeping with the spirit of the invention. For example, the agreement creator may be notified as to the relative level of rewards given for condition compliance at 802. Overall status of an agreement performer may be shown at 803 along with suggestions or recommendations based on any quantity including performance. In addition, the friends associated with a child, for example if a table of friends 174 in FIG. 2 is implemented with respect to agreement performers, i.e., an additional table is added to the system with a primary key of agreement performer with an additional field of another agreement performer, i.e., friend. In this embodiment, then the friend's performance may also be shown at 804. See also the description of FIG. 2 that details optional friend related information. This information may be utilized by a group of parents or employers to throttle electronic devices or associated information based on the activities and performance related thereto by the group. Any quantity or relationship of any of the data or any other data in the system may be shown with graphical interface 805. For example a map of available drivers may be displayed showing where vetted drivers for adolescent are available, for example if a child is stranded and needs a ride or is intoxicated. Warning information may be shown at 806 to warn an agreement creator of potential issues, so that corrective action can take place before problems occur instead of after problems occur. In addition, the agreement monitor may be configured to display information to the agreement creator or other party related to an attempt to bypass the action configured to limit the monitored information by the agreement performer.

Figure 9:
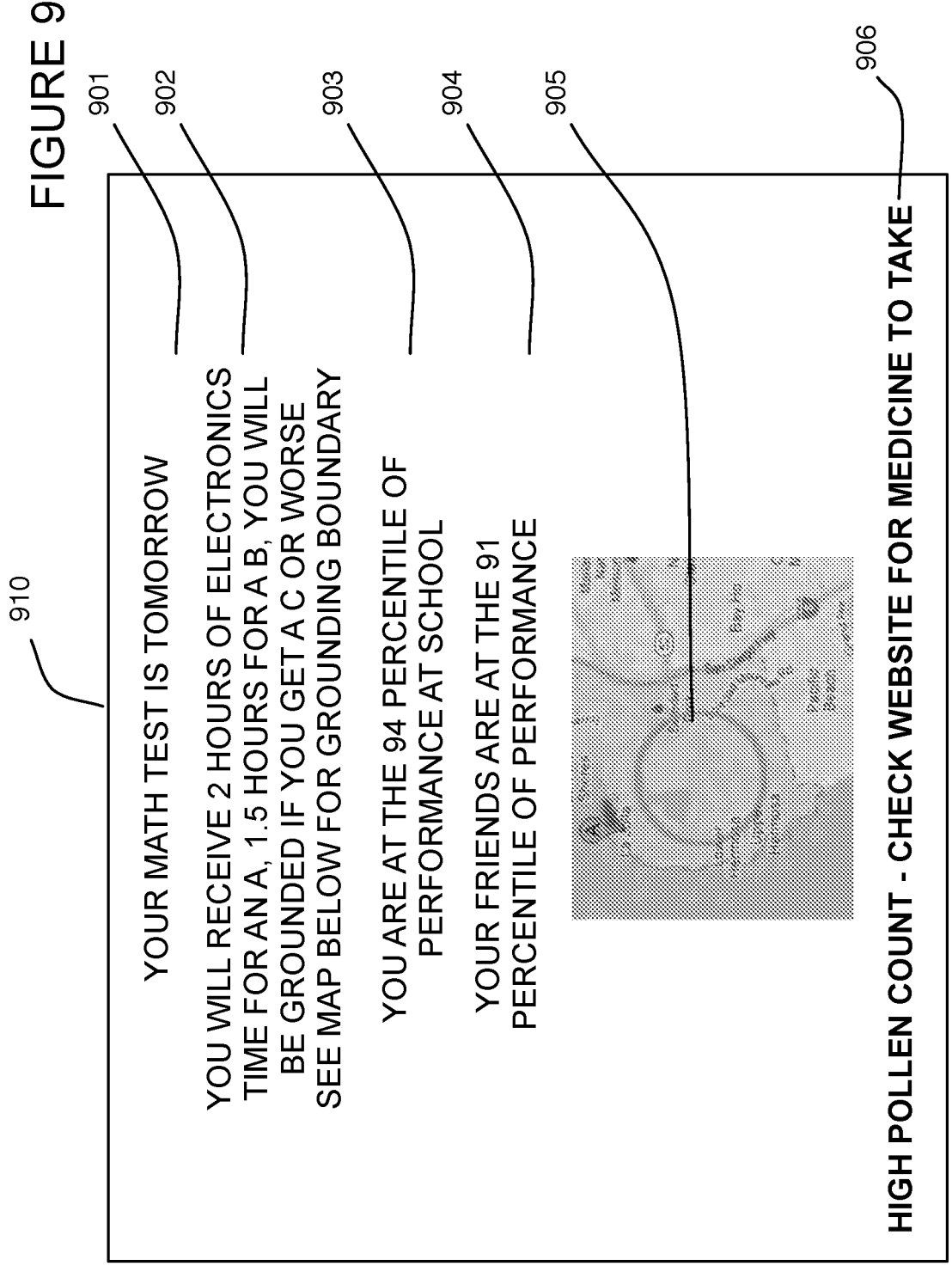
FIG. 9 illustrates an interface for an agreement performer, such as a child, showing upcoming deadlines or events, along with any actions such as rewards or reprimands, activity status, along with activity status that has been data mined with respect to a group of children that are the child's friends, graphical information for example a map which shows a boundary of grounding if a particular activity status is not achieved for a test for example, along with any medical or other warnings.

Alternatively or in combination, the agreement monitor is configured to display information related to the compliance and the monitored information. FIG. 9 illustrates an interface for an agreement performer, such as a child, showing upcoming deadlines or events 901, along with any actions such as rewards or reprimands at 902, activity status at 903, along with activity status that has been data mined with respect to a group of children that are the child's friends at 904, graphical information for example a map which shows a boundary of grounding at 905 if a particular activity status is not achieved for a test for example, along with any medical or other warnings at 906. Any other integrated information including medical records and/or financial may be utilized in combination with embodiments of the invention as part of a total platform to aid and/or for managing an agreement performer such as a child. In one or more embodiments of the invention, the information displayed in FIGS. 8-9, or any subset thereof may be played in audio format or any other format for example to an agreement creator and/or agreement performer. The agreement creator in one or more embodiments of the invention may view any or all portions of the notifications or status for any related agreement performer.

According to one or more embodiments, the at least one electronic device 110*a*, 110*b*, 110*b*1, 110*c* and/or 110*d* may display an average amount of time required to achieve a particular school grade based on performance associated with one or more other agreement performers. In one or more embodiments, the average amount of time required to achieve the school grade is obtained using data mining techniques, such as based on all students in a particular class. For example, the electronic device may display information to the agreement performer 101 stating that if the agreement performer studies for "X minutes" per day, the agreement performer is likely to receive an A on the upcoming exam, homework or assignment. In addition, the electronic device may display information to the agreement performer 101 stating that if the agreement performer studies for "Y minutes" per day, or "Z minutes" per day, the agreement performer is likely to receive a B or C, respectively, on the upcoming exam, homework or assignment. As one of ordinary skill in the art would appreciate, "X minutes", "Y minutes" and "Z minutes" may be of any time frame of minutes and/or hours. The displayed amount of time and associated grade, in at least one embodiment of the invention, may be displayed to either or both the agreement performer 101 and the agreement creator 102.

The agreement monitor is generally configured to accept input from the agreement creator to define the condition and the action. Any type of interface including text fields or pull-down lists may be utilized to enter data as is known in the art. Predefined agreements and/or conditions may be provided for default behavior. For example, a default of 1 hour per day of electronic usage from combined devices until all school related activities are complete wherein an addition 1 hour may be rewarded, may be a default for example. Any other type of default actions and/or conditions may be utilized in keeping with the spirit of the invention.

In addition, the notification system may be utilized to enable schools to determine if a child is behaving according to agreements at home, while the system enables a parent to determine if the child is behaving according to agreements at school. Such a system enables problems to be addressed earlier and corrective action to be taken by the system instead of making the parent or the teacher the "bad guy".

Figure 11:
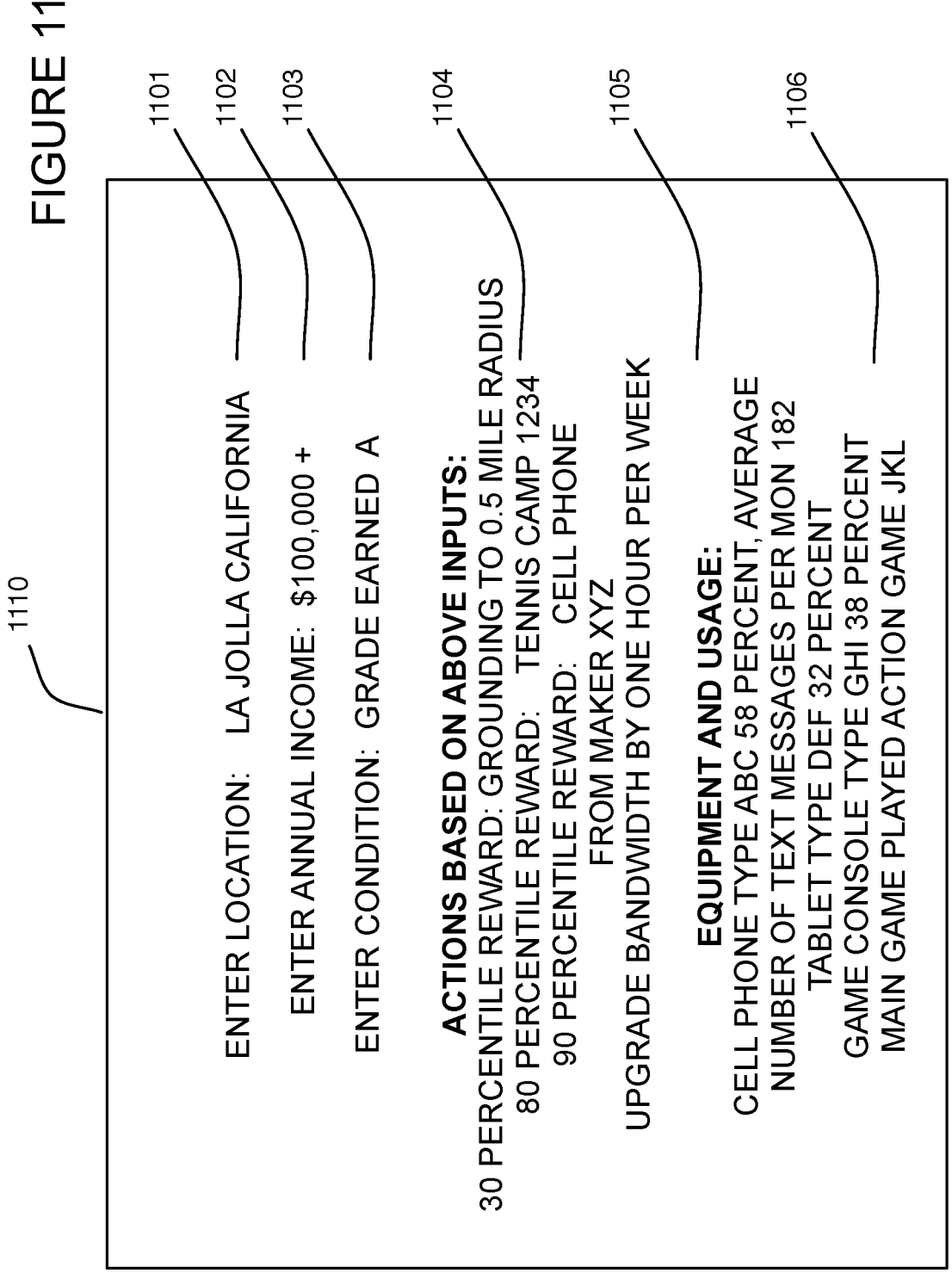
FIG. 11 illustrates a data mining interface to find actions, activities, products, equipment, usage or any combination thereof based on a query of information in the system related to data associated with any item of information in the system.

FIG. 11 illustrates a data mining interface 1110 for example that may execute on agreement server 160 or any computer that may communicate with the system shown in FIG. 1 to enter data queries 1101, 1102 and 1103 or any different or other data or types of data to find actions 1104, activities, products, equipment/usage 1105/1106, or any combination thereof based on a query of information in the system related to data associated with any item of information in the system. Agreement server 160 or any other component in the system may be utilized to charge for the data mining activities and accept payment or send payment to any financial entity that may couple with Internet 150 in FIG. 1 for example. For example, data mining of the information may be performed on any information in the system for example to extract patterns or any other type of information from the various data in the system. Embodiments of the invention may also be configured to enable manufacturers to data mine for types of rewards or incentives and target a group of parents or persons that may buy certain types of products, for example based on agreements and conditions. This also enables manufacturers to target parents of friends of a child that just won a particular reward for achieving a condition for example. For example, any entity may utilize the system to data mine for types of rewards that may be utilized for a reward that is similar to a reward for a condition that another parent or person has utilized, for example with respect to a particular condition, e.g., a reward for an "A" on a final exam. In one or more embodiments, access to agreement database 170 or activity databases 180*a-c* may be provided for example via website 140*b* or agreement server 160 for example. As shown in FIGS. 1-3, access to large numbers of agreement performers enables data mining of patterns that are associated with agreements, conditions, actions, equipment and usage. In addition, data mining may be performed using any personal data associated with agreement creators and agreement performers. In one or more embodiments, net asset or annual income of an agreement performer may be utilized to find patterns of rewards that are given based on compliance with agreements to enable manufacturers to target particular agreement creators, for example market particular products to particular parents that have children in an age group where a type of reward may have been given before. This type of direct marketing has a higher chance of success when patterns indicate that a particular parent may benefit from purchasing a reward for a child when activity status would indicate that a child is highly motivated to achieve satisfy an agreement when the product is available as a reward.

Embodiments of the invention also enable parents or other persons to remain up to date on items popular amongst children that are based on agreements that other parents have entered and which have resulted in rewards for meeting conditions of the agreements. This allows parents to receive product literature, overviews, pictures, movies, blogs or other information to keep a parent "hip". Embodiments of the invention may display or notify an agreement creator and/or agreement performer of potential rewards, using any apparatus that may couple with any portion of the system shown in FIG. 1 for example.

Embodiments of the invention may be configured to display potential rewards on an electronic device being utilized by a person, for example based on bandwidth usage based on information monitoring with respect to a condition of an agreement, to provide further incentive to perform a task for example. Alternatively or in combination, embodiments of the invention may also provide popups or text messages or audio messages during video, music or game play listing tasks to be completed according to agreements. This capability allows a child to sense a potential reward for studying, for example while playing a game, wherein the child may make a decision to go study or simply to remind the child that a test is coming up or that homework is due.

Figure 10:
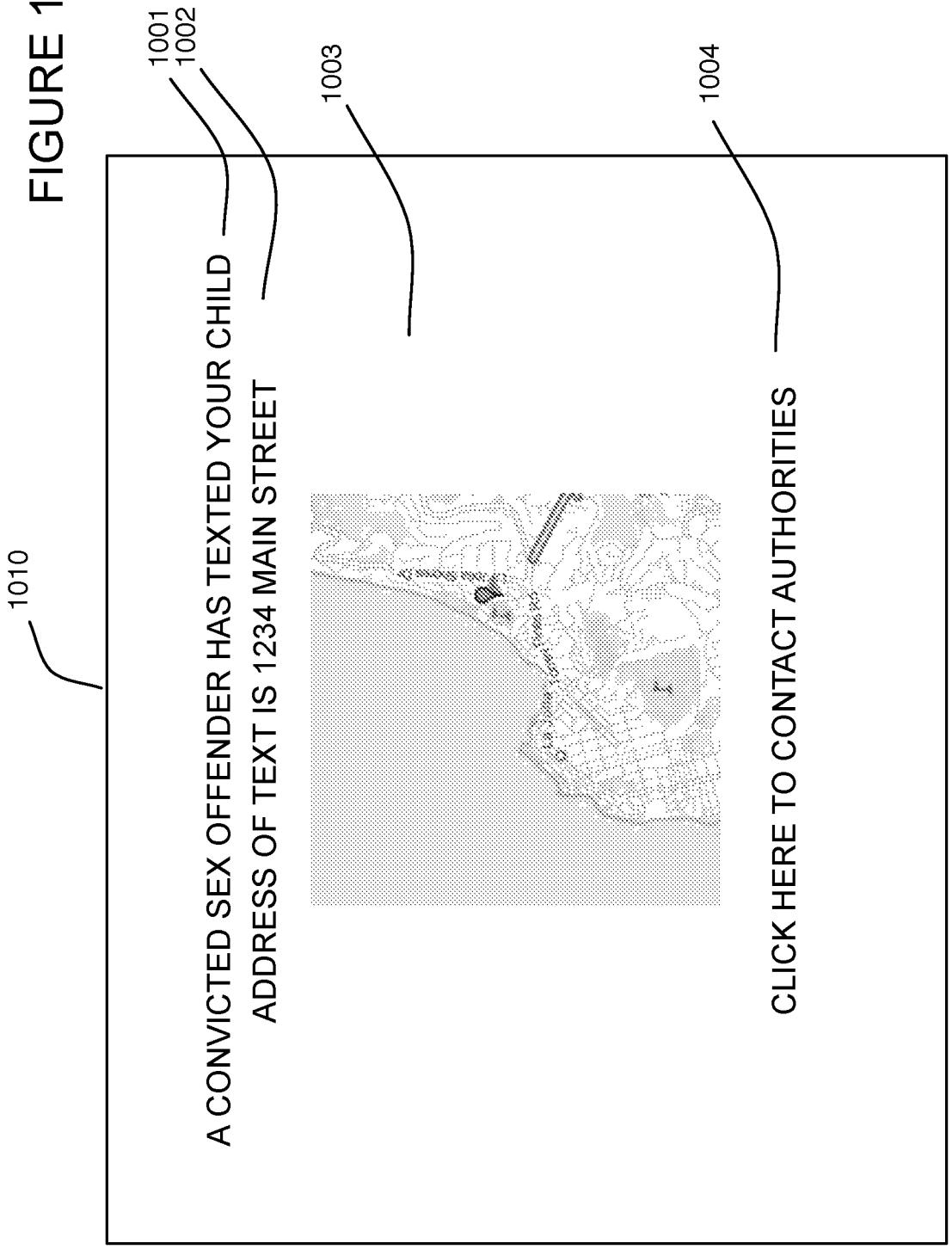
FIG. 10 illustrates a notification to an agreement creator and/or performer indicating that contact from a sex offender or other unwanted contact has been received along with an interface for contacting law enforcement.

FIG. 10 illustrates a notification 1010 to an agreement creator and/or performer indicating that contact from a sex offender or other unwanted contact has been received at 1001 along with an interface for contacting law enforcement. Embodiments of the system may plot the location of the sex offender based on or using sex offender addresses 1002 and/or maps 1003 and IP tracing, and alert authorities at 1004 and potentially throttle other forms of electronic device utilization to further protect a child. Other map-based displays may be utilized to show potential rides for children when they are stranded as has been discussed.

Embodiments of the invention may also alert a parent when a child's friends have gotten in trouble or are not meeting their agreements, so that a parent may limit a child's interactions with particular people or groups. Embodiments may be utilized in a one-person configuration to throttle usage based on addictive behavior such as online gambling or obsessive pornography viewing. Embodiments of the system may also allow for information in the system to be data mined, wherein an agreement database having multiple parents and children is mined to determine whether a parent is strict or not strict, or to rate how strict a parent is being with respect to other parents, agreements and conditions, or in any other manner rate what kind of parent a parent is based on how a child is performing and the rewards that a child is receiving for example. Embodiments of the invention may also provide tips or recommendations based on parent and/or child behavior with respect to agreements, for example as data mined to achieve better performance by the child. The system may provide a suggested type of action to take based on levels of performance of conditions by a child for example. The system enables grouping of multiple students and this may be utilized by schools for their mining purposes as well as to provide parents with control over who a child congregates with and which sets of kids are good or undesirable as friends. Then, a parent may choose to allow a child to perform activities with a certain group of children, e.g., the smart children (for example with the highest grades in the group of children), or the ones that are the hardest working (satisfy the most conditions), etc. Any electronic device in the system may be utilized to display or otherwise present status, notifications, tips or suggestions. Data mining may also be performed to detect attention deficit disorder (ADD) or any other medical condition, for example by mining for patterns in monitored information, such as reaction time in games, grades and derivatives of grades to determine if a child is improving or getting worse for example with respect to certain medications. Data mining may be utilized to suggest alternative courses of treatment that at least partially increase or decrease the throttled information or enable or disable particular forms of communication, channels, apps or games, etc., to improve an agreement performer or the performance of an agreement performer, for example with our without data mining information related to medical information.

Figure 12:
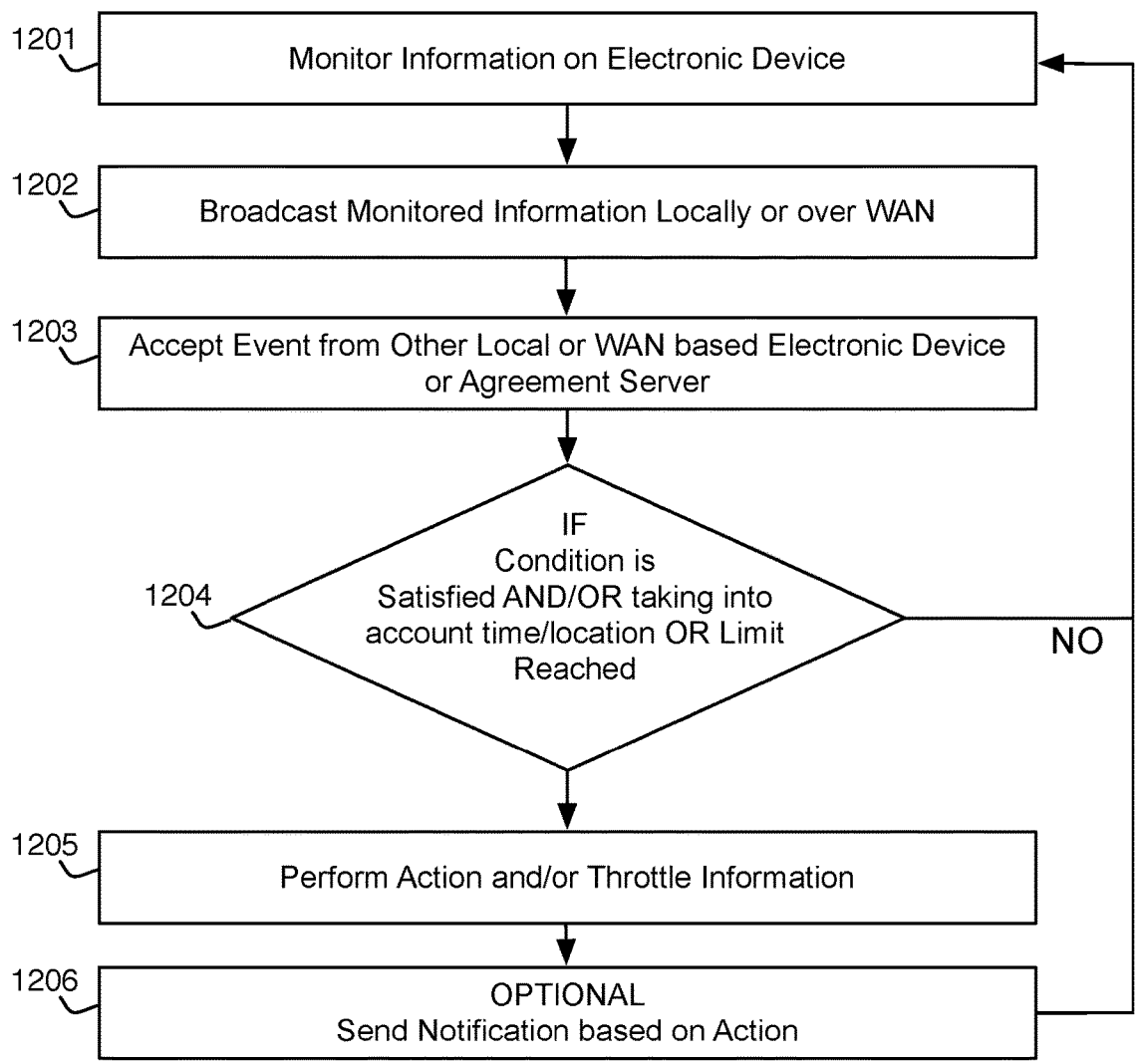
FIG. 12 illustrates a flow chart for the information monitors of FIG. 1.

FIG. 12 illustrates a flow chart for the information monitors of FIG. 1. As shown, information is monitored at 1201 on each electronic device associated with an agreement performer. In one or more embodiments a camera near or associated with the electronic device may be utilized to associate the electronic device with one or more users, one or more of which may be agreement performers. The monitored information is broadcast to the agreement server and/or the other electronic devices associated with the agreement performer at 1202. Any incoming events are received at 1203 by each electronic device, for example when activity status changes, i.e., some task has been performed by the agreement performer, or an external task has occurred, such as the agreement performer earned enough money from chores to pay for their cell phone. If a condition has been satisfied, e.g., associated with an activity or event as determined on the agreement server or locally on the electronic device at 1204, and/or based on the schedule or time or location of the scheduled activity or location of the electronic device, then an action or throttle is performed at 1205. For example, if a child is supposed to be in math class at a particular time based on the schedule, then the throttle may effectively limit the electronic device to math related websites and disable news or sports websites, if the location in the electronic device is in the location of the math class. If the location of the electronic device is in another area, e.g., the student is ditching class, then the electronic device may be further limited. However, if the student is at home sick, then the location may enable or increase access to other websites for example. If there are more than one agreement performers near, e.g., viewing the display of the electronic device, then at 1205, the system may throttle based on the lowest common denominator, i.e., if any of the agreement performers has no accumulated site pass, channel pass, or any other type of time left, then the system may throttle the device. Any method of obtaining images proximal to the electronic device including use of indirectly coupled cameras such as nanny cams or dash cams or security cameras for example in addition to cameras coupled directly or indirectly with the electronic devices is in keeping with the spirit of the invention. If the condition or limit has not been satisfied or reached respectively, then processing continues at 1201. If the action or throttle is performed at 1205, then optionally a notification may be sent to the agreement creator or anyone else including the agreement performer that the action or throttle has taken place at 1206.

Figure 13:
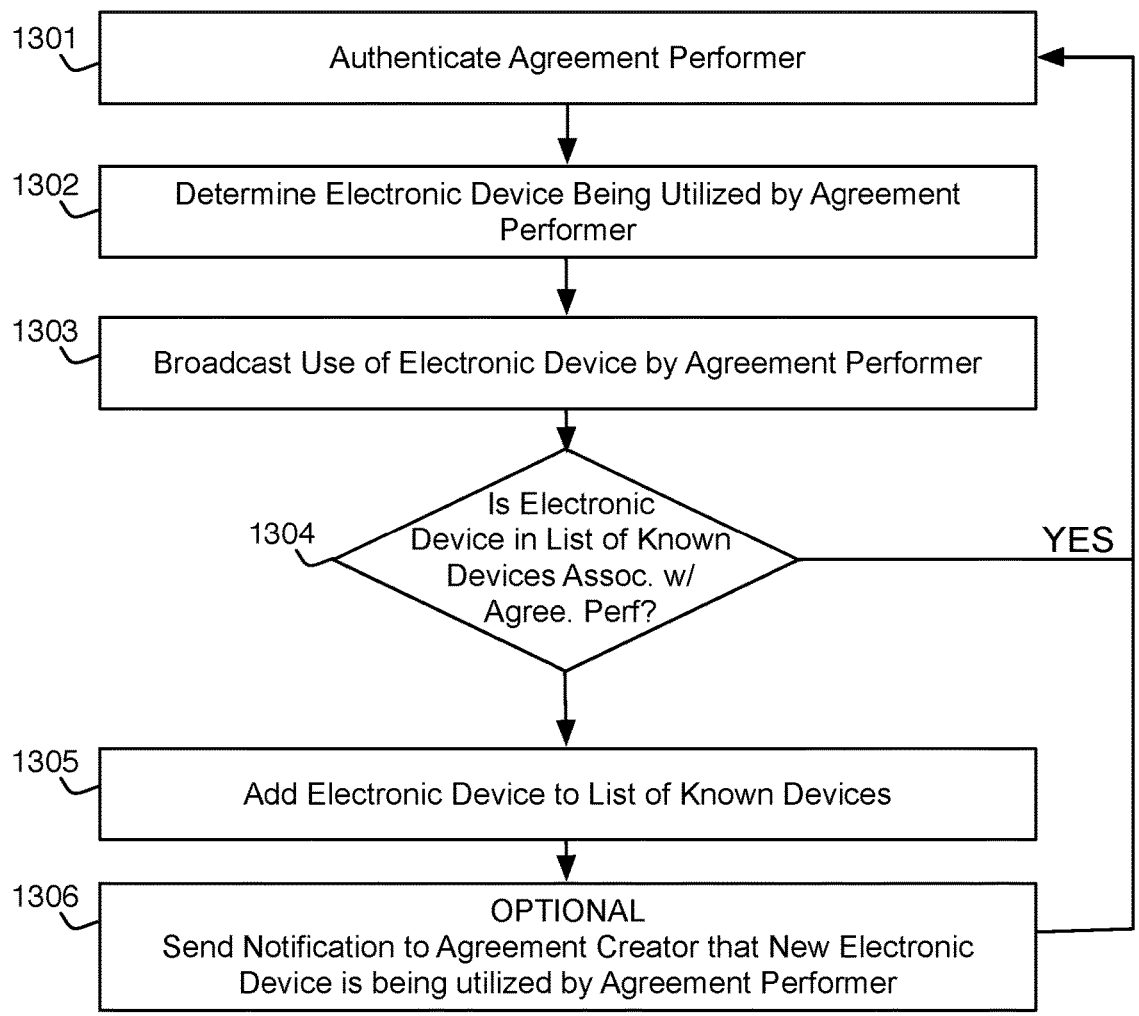
FIG. 13 illustrates a flow chart for the ensuring information that is monitored is associated with the correct agreement performer.

FIG. 13 illustrates a flow chart for the ensuring information that is monitored is associated with the correct agreement performer. Each electronic device, or application or service thereon that is capable of authenticating an agreement performer does so at 1301. This may include any type of input obtained by the system, text, image(s), audio, biometrics, etc. The identity of the electronic device, i.e., computer name, cell phone number, IP address of game controller, etc., is obtained at 1302. The identity of the device is broadcast at 1303 to the agreement server or local electronic devices along with the identity of the agreement performer using the device. If the electronic device is unknown to the system, which may indicate that a child is attempting to bypass the system by using someone else's computer, then the electronic device identifier may be stored as a new entry in table 172 of FIG. 2 for example, and an optional notification of the new device may be sent to the agreement creator, e.g., to alert them of any attempt to bypass the system. Authentication may utilize any known mechanism to determine who is utilizing the system, including hooks into social media websites when a user logins in for example, wherein the social media site may make usage calls to embodiments of the agreement server for example, i.e., act as an information monitor and alert the agreement server and/or any information throttles of the usage.

Figure 14:
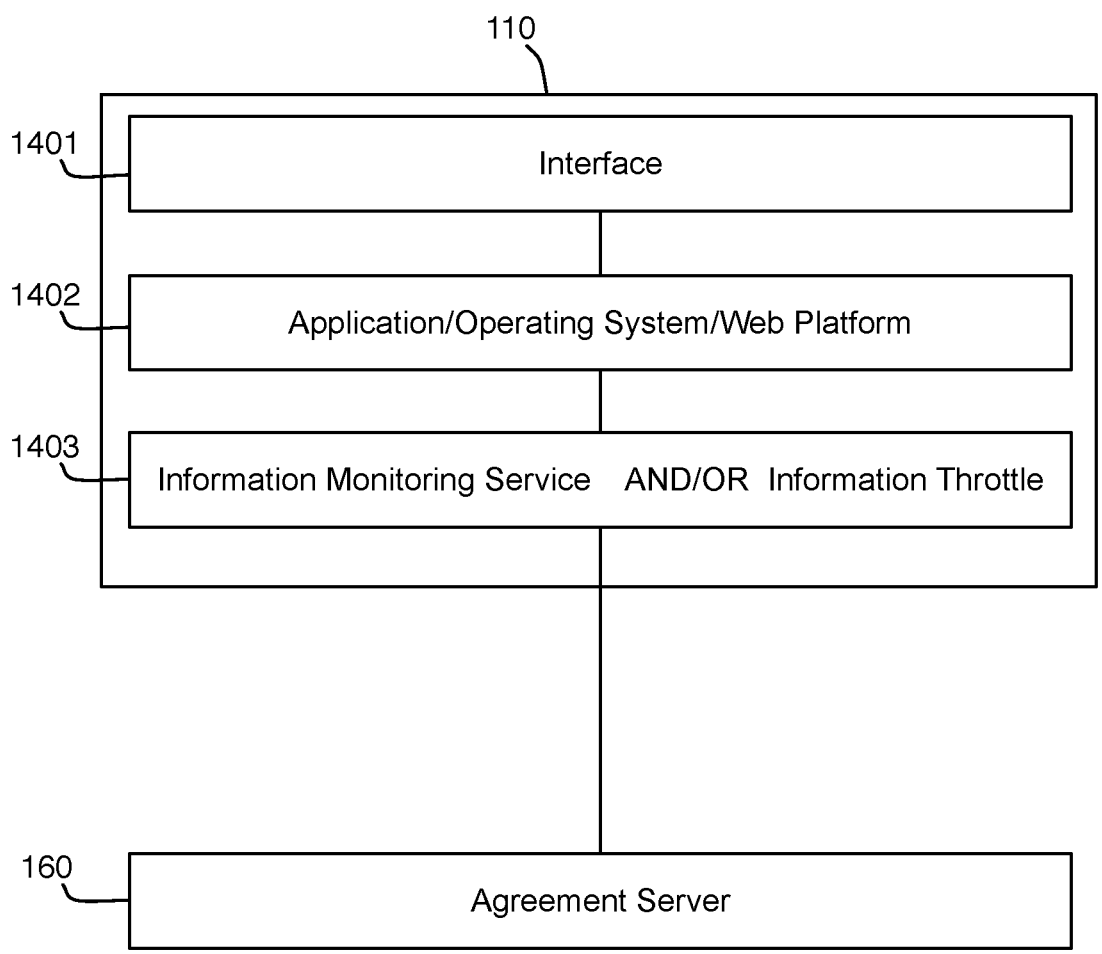
FIG. 14 illustrates a high level architecture for information monitors and information throttles and their relation to the electronic device and agreement server.

FIG. 14 illustrates a high level architecture for information monitors and information throttles and their relation to the electronic device and agreement server. Any electronic device 110 with an interface 1401, whether wireless or wired communication interface, that may be throttled by one or more embodiments of the system. The application may be a standard executable, which executes on an operating system or web platform as script or code in a remote server for example. Embodiments of the information monitor hook into the application or operating system or web platform and monitor inputs and potentially throttle information at 1403. For example as previously discussed, the information monitor may intercept key strokes or other input device events from the operating system and/or device drivers associated with the input devices, or accept events from the application 1402 for example that allows the information monitor to monitor information. The information monitor and information throttle may communicate to local electronic devices or to an agreement server 160 as shown. Alternatively, the agreement server may be local to electronic device 110 or in any component or that may communicate with any component shown in FIG. 1. The information throttle may limit information exchange or display and/or make calls to the operating system to slow the system, dim the display, introduce delays, set any parameters, or exit the application for example based on the monitored information and any limits stored locally or remotely. Any other architecture that enables an electronic device to monitor and throttle information is in keeping with the spirit of the invention.

Figure 15:
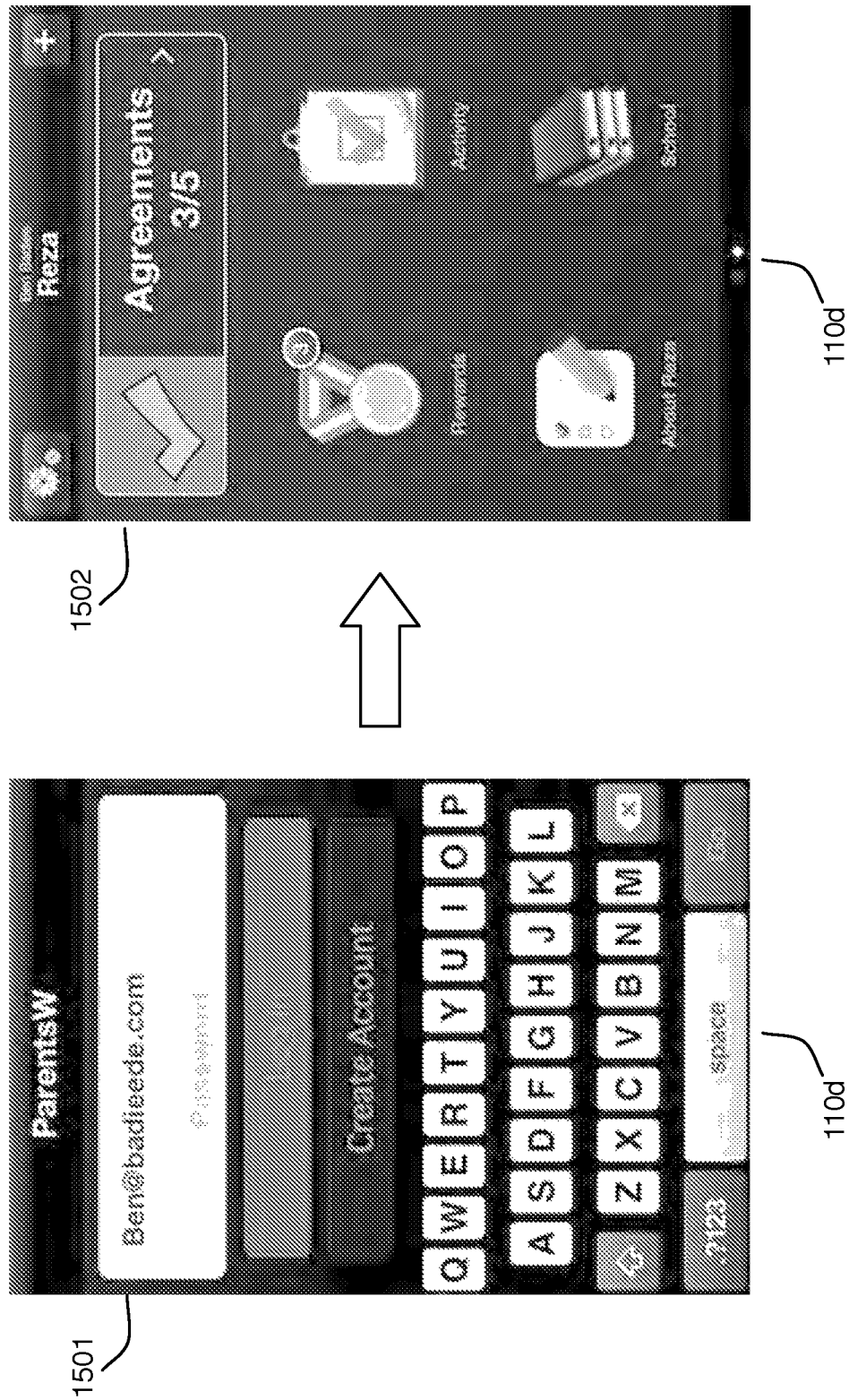
FIG. 15 illustrates an embodiment of a login screen and main screen of an implementation executing on the computer associated with the agreement creator, for example executing on a tablet computer.

FIG. 15 illustrates an embodiment of a login screen and main screen of an implementation executing on the computer associated with the agreement creator, for example executing on a tablet computer. In one or more embodiments, the agreement performer 101 and/or the agreement creator 102 may utilize one or more applications on the electronic devices 110a-c (see FIGS. 33-38) and on computer 110d. As shown, an application login screen 1501 is displayed enabling the agreement creator 102 to enter a valid user e-mail address and password to access the application, and/or may opt to create a new account. For example, in at least one embodiment of the invention, once the agreement creator 102 has successfully logged in, the application may display a main screen 1502 showing information about one or more agreement performers, such as agreement performer 101, including agreements associated with agreement performer 101, rewards associated with agreement performer 101, activity associated with agreement performer 101, information about agreement performer 101, and a school information system associated with agreement performer 101. In one or more embodiments, although the application is displayed according to agreement performer 101, shown at the top of the display, as one of ordinary skill in the art would appreciate, the application may in addition to, or alternatively, display information associated with one or more other agreement performers.

Figure 16:
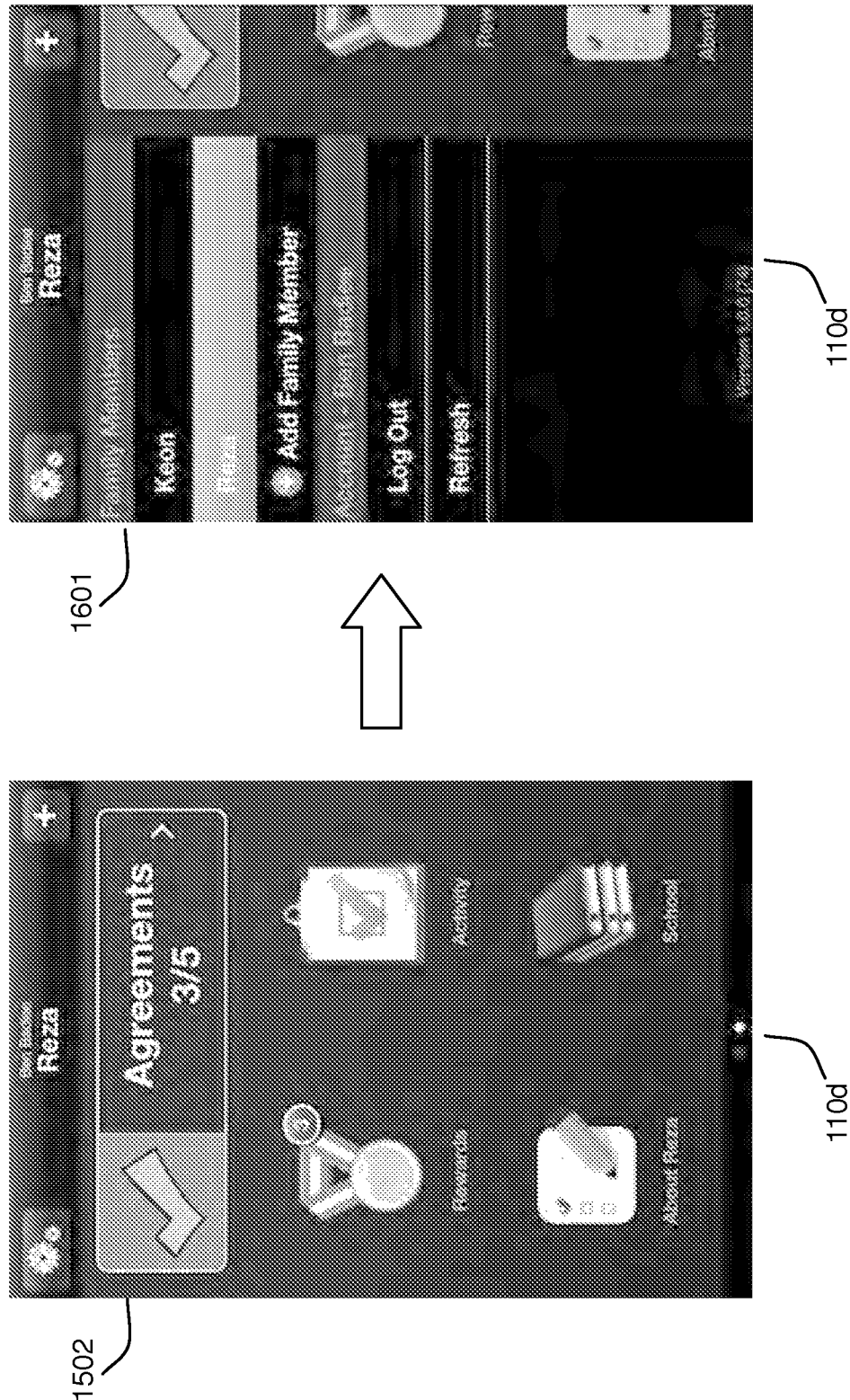
FIG. 16 illustrates an embodiment of a screen that accepts entry of another user, for example another family member, after the main screen is "swiped" to the right.

FIG. 16 illustrates an embodiment of a screen that accepts entry of another user, for example another family member, after the main screen is "swiped" to the right. In one or more embodiments of the invention, the agreement performer 101 may include a plurality of agreement performers, and the agreement creator 102 may include a plurality of agreement creators. In one or more embodiments, after the main screen 1502 is "swiped" to the right, agreement creator 102 may optionally add one or more other family members as agreement performers at screen 1601. Once added, the agreement creator 102 may select which one of the plurality of agreement performers listed to display information about. In at least one embodiment of the invention, a logged-in user of electronic device 110d, such agreement creator 102, may swipe one or more screens displayed to the left and to the right in order to access previous screen and/or access additional screens that may be displayed in the application.

As per FIG. 16, embodiments of the invention may display a list of the plurality of agreement performers to one or more of the plurality of agreement creators in an orderly manner, on electronic device 110d, such as displayed on screen 1602, based on a history of actions associated with each of the plurality of agreement performers. In one or more embodiments. For example, if more than one agreement performer are being monitored, such as siblings in one household, the list of the plurality of agreement performers are listed in an orderly manner based on how good or bad they have previously complied with required activities and/or tasks, as will be discussed further below. As such, it may be easier for one or more of the agreement creators 102 to view and determine which agreement performer 101 of the plurality of agreement performers that does not comply with required activities and tasks and may be given more tasks and activities to complete, with a fewer number of associated rewards, compared to a second agreement performer from the plurality of agreement performers, such as siblings in a household.

Figure 17:
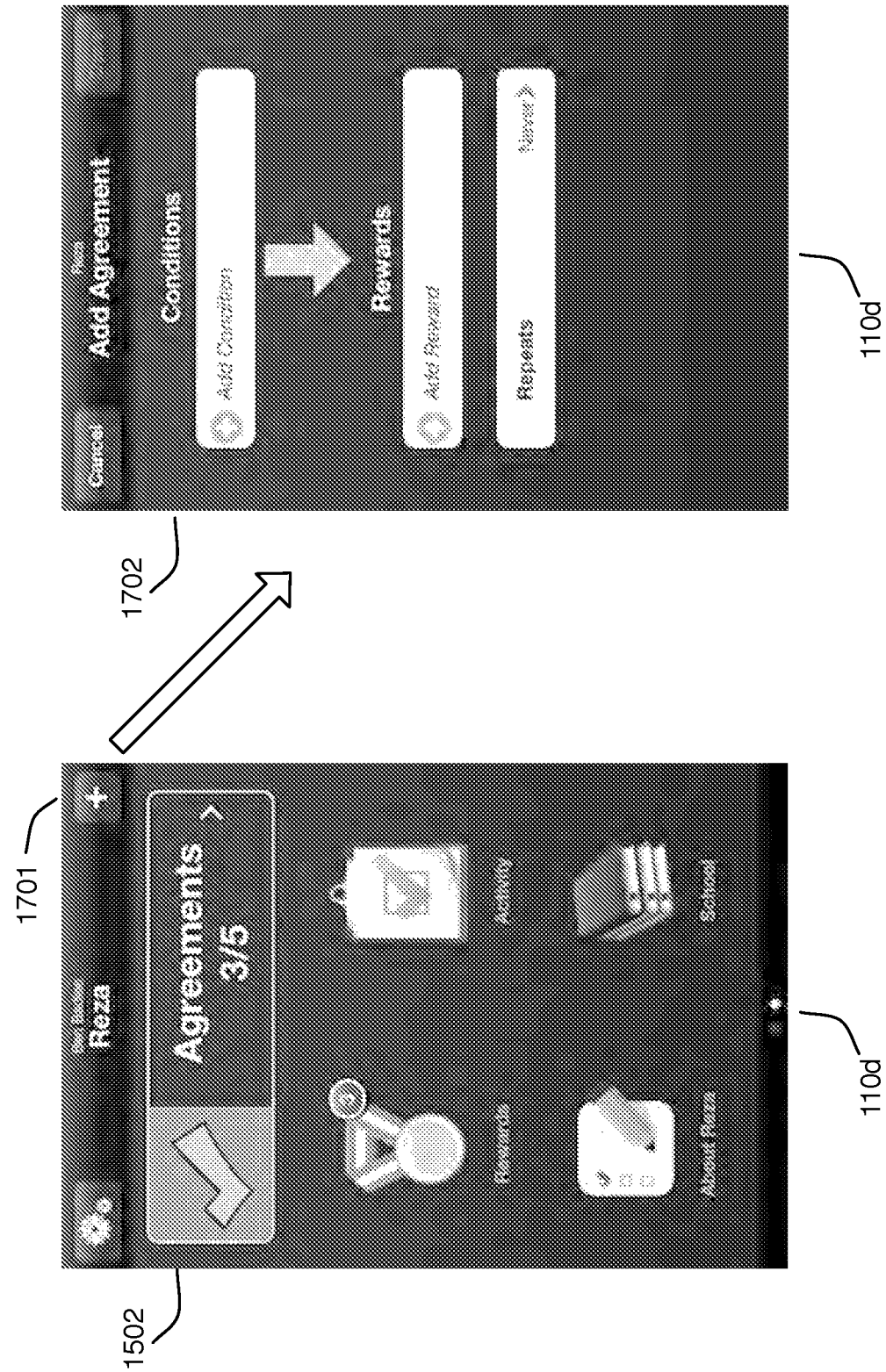
FIG. 17 illustrates an embodiment of a screen that accepts entry of an agreement associated with an agreement performer, including one or more conditions, one or more rewards and any repeating time intervals for the agreement.

FIG. 17 illustrates an embodiment of a screen that accepts entry of an agreement associated with an agreement performer, including one or more conditions, one or more rewards and any repeating time intervals for the agreement. Main screen 1502, in at least one embodiment, may include an add-button 1701 to access an agreement screen 1702. Agreement screen 1702 displays an add condition option and an add rewards option, allowing the logged-in agreement creator 102 to enter and add one or more agreements, conditions and rewards, associated with the selected agreement performer 101, to be accepted by the system. In one or more embodiments, the agreements screen 1702 may display a repeats agreement option allowing the agreement creator 102 to select one or more repeated agreements, conditions and rewards in a temporal manner, or never.

In at least one embodiment of the invention, rewards may be given to the agreement performer(s) for on time performance of homework, chores, behavior, exercise, proper diet, music/sports practice and may be in the form of tokens. In one or more embodiments, the tokens may be accumulated and utilized as rewards for predefined levels. Rewards may include increase data throughput on one or more of the one or more electronic devices 110*a*, 110*b* and 110*c*, or may include physical items such as gifts, food, events, cash or time, e.g., to enable activities of a certain time, such as spending time with a relative or friend. All of these quantities may be stored in an account and utilized by the activity performer as desired. For younger children, in one or more embodiments, stickers and/or other toys may be utilized. In at least one embodiment, tokens may be deducted for timeouts, bad manners, not obeying, disruptive behavior, incomplete homework, incomplete chores, use of bad words, fighting or aggressive behavior. For example, in at least one embodiment, the agreement creator(s) 102 may increase or deduct the number of token to respective increase or decrease rewards, based on good or bad behaviors. Alternatively, the "currency" of the system may include cash, time, events or any other quantity other than a token. Embodiments of the invention enable the account to accrue interest at a negotiated rate. In addition, the tokens or cash may be donated by the activity performer to a specific charity for example. Alternatively, or in combination, the activity performer may donate or otherwise transfer tokens and/or cash to another account, such as a sibling's account or family account. In addition, the tokens may also be exchanged for time with other individuals such as parents. Alternatively, the system may also store time earned from activity completion for example. For example, an activity performer may earn an hour with an uncle or other friend or relative, e.g., for performing some chores, etc.

FIG. 18 illustrates an embodiment of a screen that accepts entry of a condition for the agreement. At agreements screen 1702, once the agreement creator 102 selects the add condition option, the application displays an add condition screen 1801 allowing agreement creator 102 to add one or more types of conditions, such as one or more tasks, and allow agreement creator 102 to add a subject or title associated with the added one or more conditions, such as one or more tasks. The agreement, in at least one embodiment, may include a plurality of conditions, such that the agreement monitor may accept the compliance as associated with each of the plurality of conditions in any order, as performed by the agreement performer 101. As such, an agreement may comprise a plurality of conditions, and the agreement monitor may accept compliance associated with each condition, of the plurality of conditions, in any order as obtained from the agreement performer 101. Alternatively or in combination, the agreement monitor may provide and/or accept compliance associated with each condition or a group of conditions in a particular order. In one or more embodiments, the multiple conditions may be associated with one or more rewards provided in a particular order or any order as either indicated by the agreement creator and/or selected by the agreement performer, as will be further discussed below.

In at least one embodiment, the information monitor may transmit one or more notices to the agreement creator and to a plurality of other users. The plurality of other users, in at least one embodiment, may include a plurality of other agreement creators, or other interested parties for example. In one or more embodiments, the one or more notices may include one or more of the activity status, a reward associated with the activity status, and the condition. For example, in at least one embodiment, the plurality of other agreement creators may comprise one or more of at least one parent, at least one boss, at least one supervisor, at least one older sibling, at least one professor, any other responsible guardian, or any combination thereof.

FIG. 19 illustrates an embodiment of a screen that accepts a task type for the condition. At add conditions screen 1801, the agreement creator 102 may select the type of condition button, in which the application then displays a task type screen 1901, allowing the agreement creator 102 to select one or more types of tasks desired to associate with the selected agreement performer 101. For example, the agreement creator 102 may add a homework task, a take out the trash task, and/or any other task to be associated with and completed by the agreement performer 101.

Figure 20:
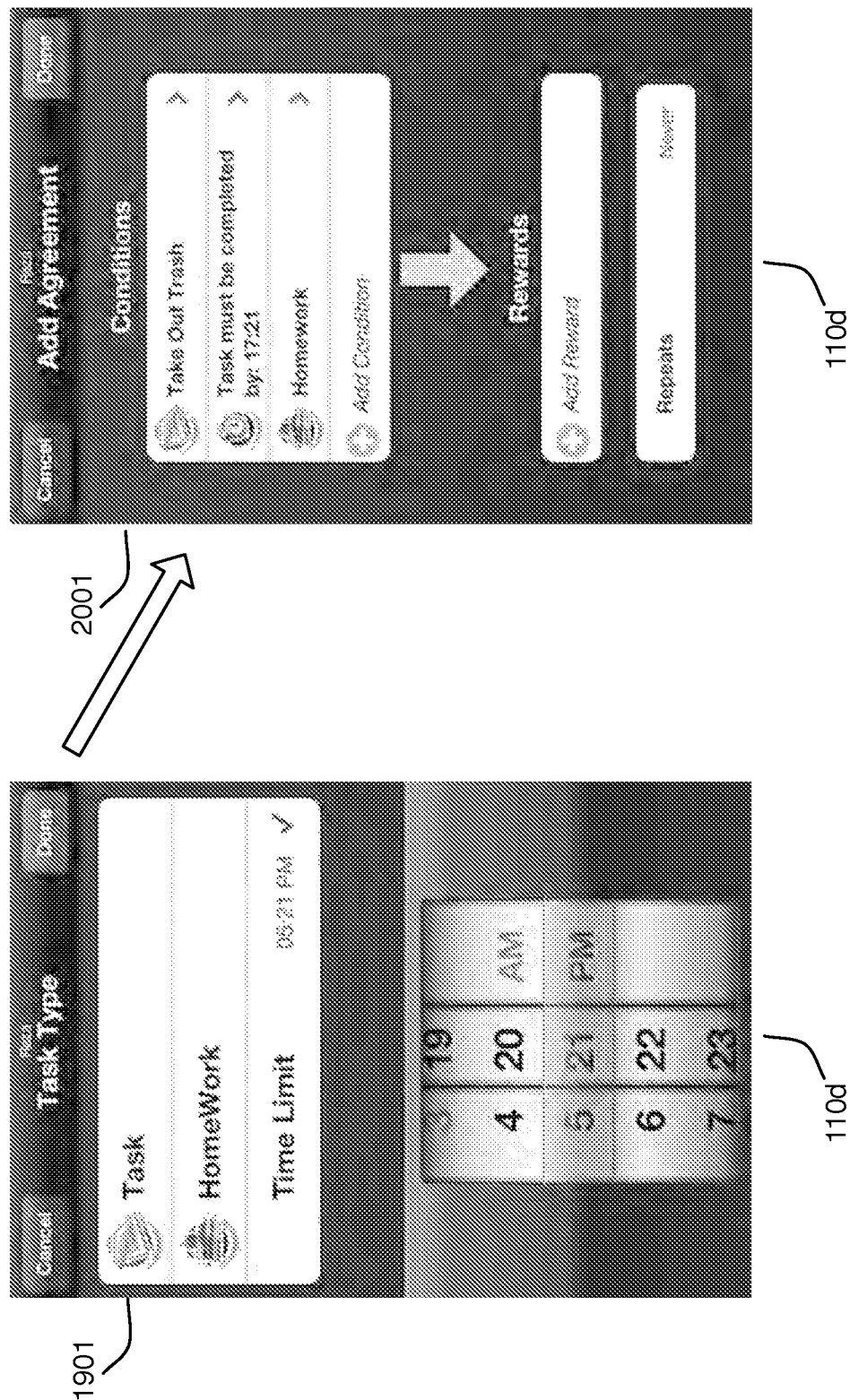
FIG. 20 illustrates an embodiment of a screen that accepts a task completion time for the task.

FIG. 20 illustrates an embodiment of a screen that accepts a task completion time for the task. Task type screen 1901, in at least one embodiment, may display a time limit option allowing the agreement creator 102 to add a task completion time for the selected and accepted task. As shown, for example, the task time limit may include a specific time of day that the agreement performer 101 is required to complete the selected and accepted one or more tasks by. Once the time limit option has been selected, the application may re-display the add agreement screen depicting the selected and accepted one or more conditions, one or more tasks and time limits associated with the one or more tasks, at screen 2001.

Figure 21:
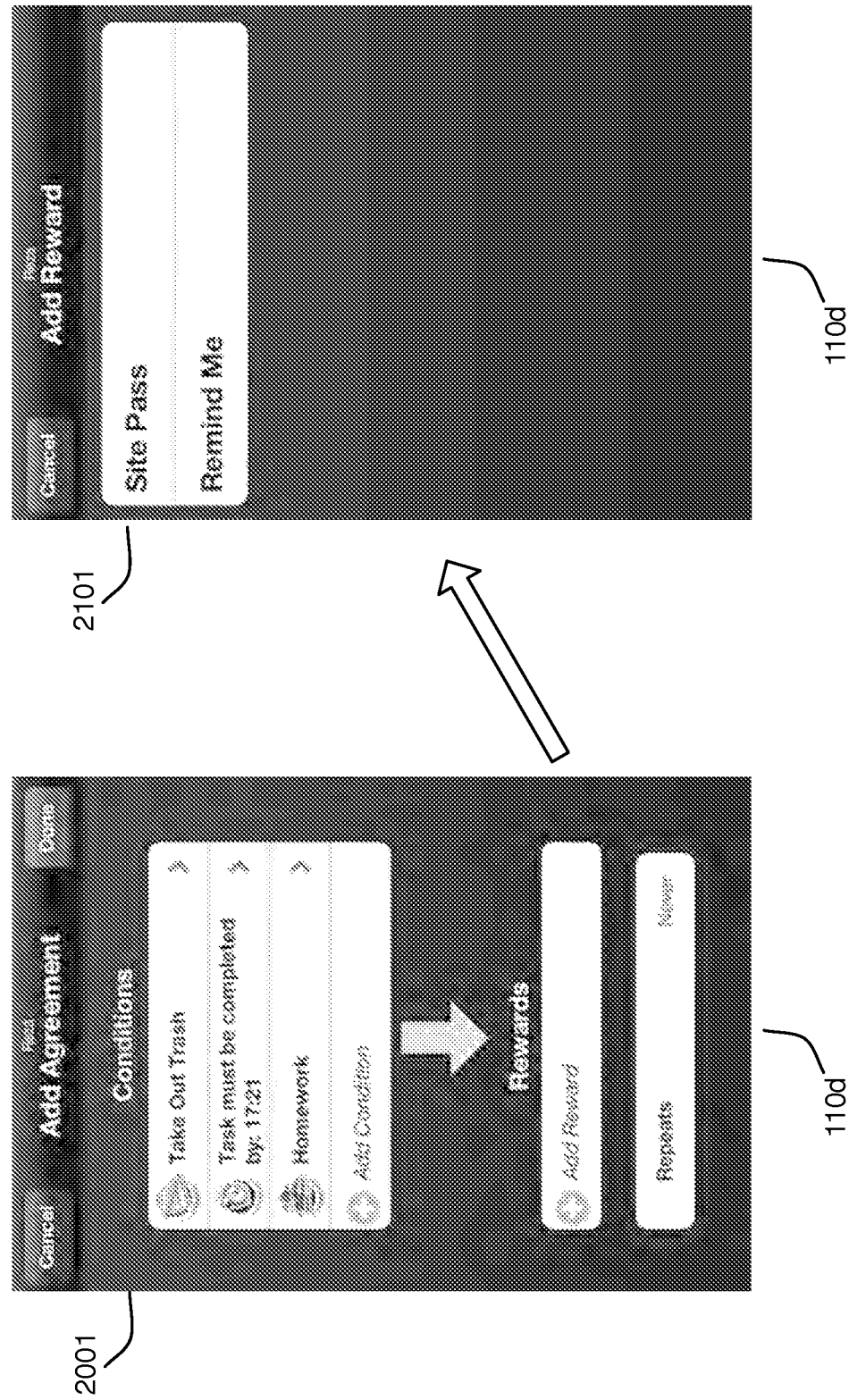
FIG. 21 illustrates an embodiment of a screen that accepts entry of a reward of completion of the conditions of the agreement.

FIG. 21 illustrates an embodiment of a screen that accepts entry of a reward of completion of the conditions of the agreement. At screen 2001, in at least one embodiment of the invention, the agreement creator 102 may select an add rewards option, in which the application then displays an add rewards screen 2101. At add rewards screen 2101, in one or more embodiments, the agreement creator 102 may select one or more of a site pass rewards option or a remind me rewards option, as will be discussed further below.

FIG. 22 illustrates an embodiment of a screen that accepts entry of a "site pass" type reward, so that an agreement performer may be rewarded with web surfing access/time, and which expires at a particular date/time and which may or may not be paused or resumed, or a "remind me" type award, so that an agreement performer may be rewarded after the system reminds the agreement creator that the agreement performer has completed the agreement. At add rewards screen 2101, the agreement creator 102 may select the site pass rewards option that enables the application to display a site pass screen 2201, allowing agreement creator 102 to add one or more site passes rewards, associated with the selected agreement performer 101. Once the site pass option is selected, site pass screen 2201 is displayed, in one or more embodiments, wherein site pass screen 2201 may include an access all sites option, a duration option for each of the added one or more site passes allowing the agreement creator 102 to set a duration of time allowed for each of the one or more site passes, an expires option allowing the agreement creator 102 to set an expiry time for each of the one or more site passes, and an allow pause/resume option to allow agreement creator 102 to pause and/or resume access to the one or more selected site passes.

Figure 22A:
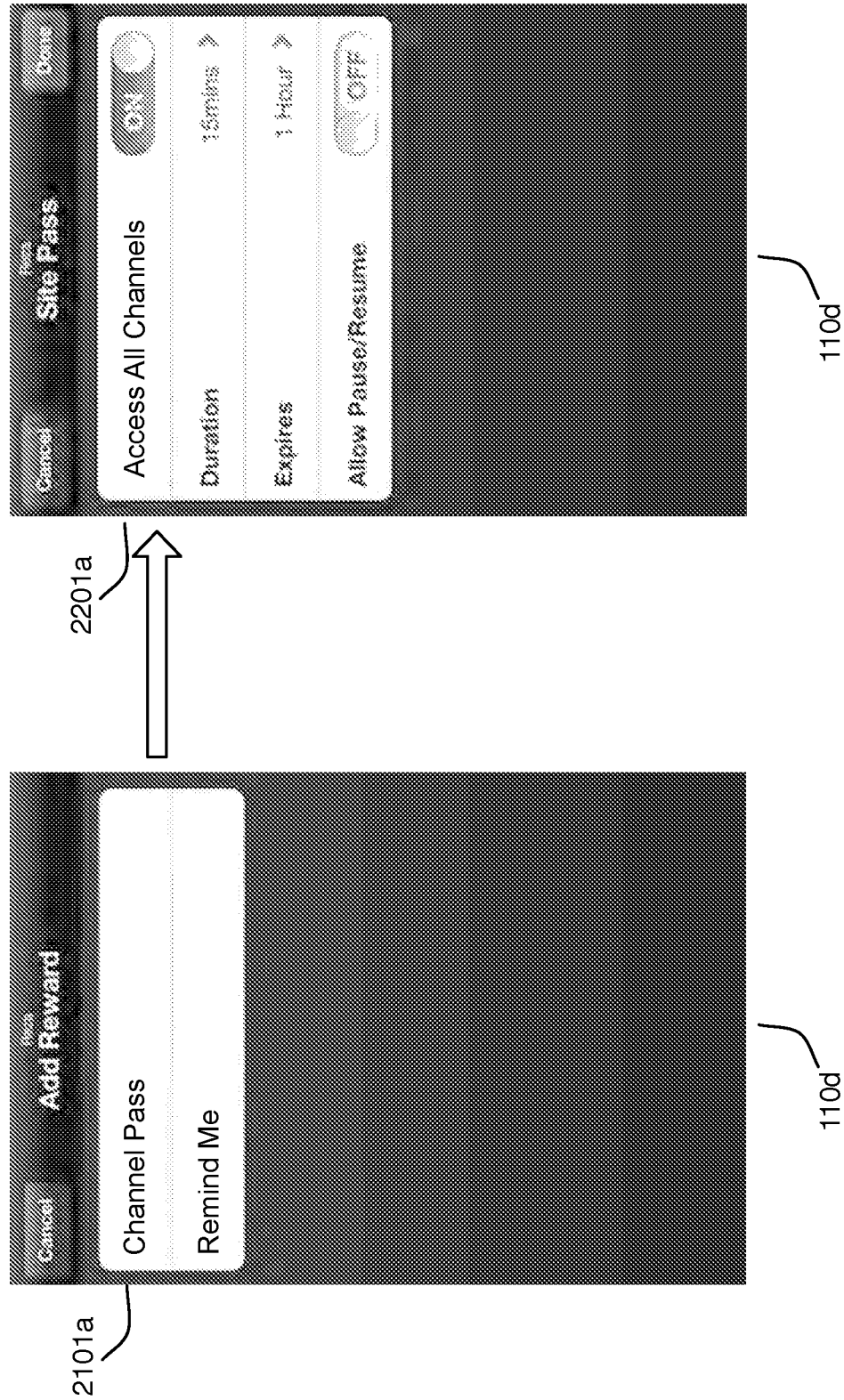
FIG. 22A illustrates an embodiment of a screen that accepts entry of a "channel pass" type reward, analogous with "site pass", but directed at TV or cable or Internet channels for example with settings for content optionally as shown with respect to the site pass settings of FIG. 23.
Figure 23:
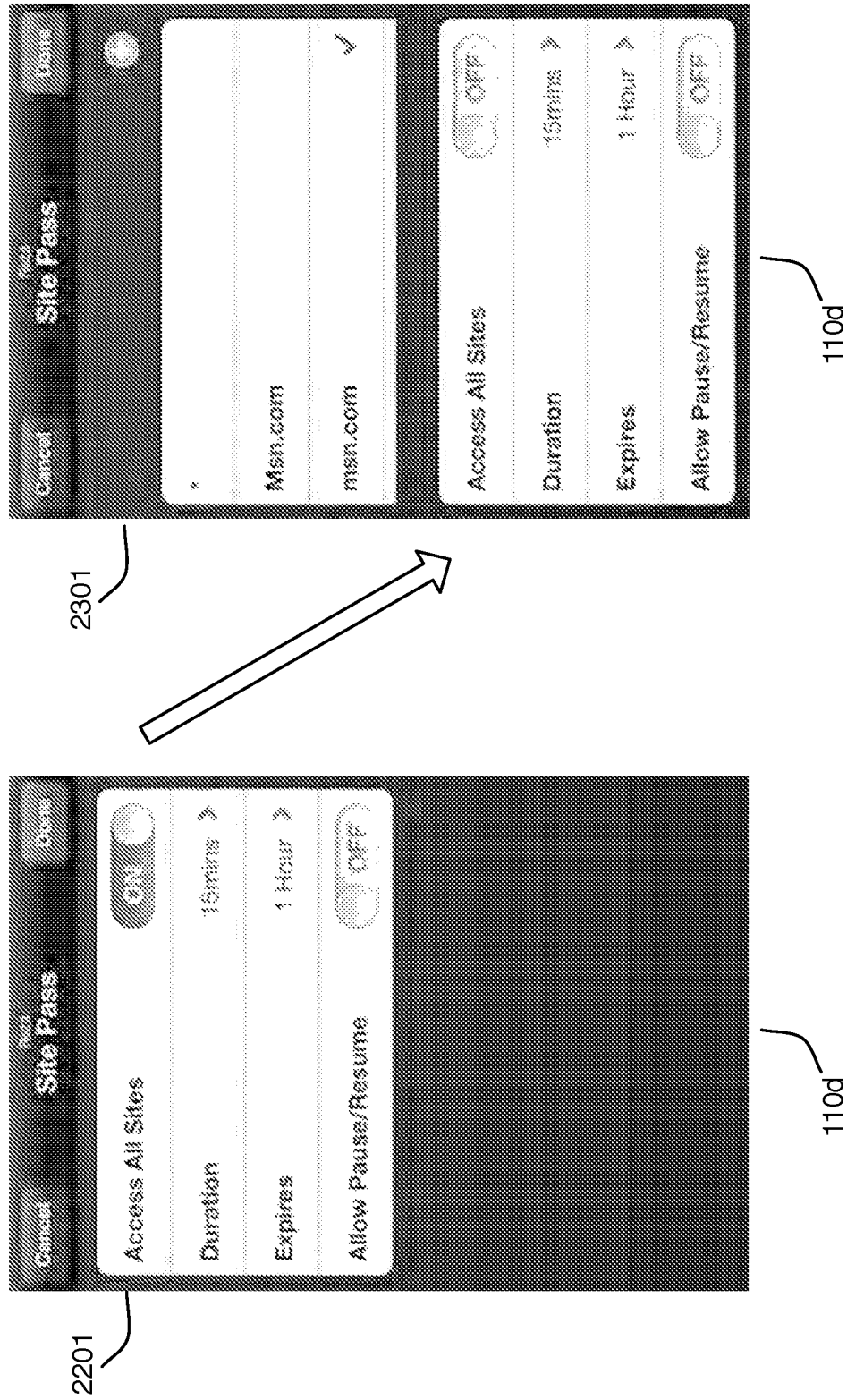
FIG. 23 illustrates an embodiment of a screen that accepts entry of settings for the site pass associated with a particular website after accepts of an "off" entry for the "access all sites" user interface element.

FIG. 22A illustrates an embodiment of a screen that accepts entry of a "channel pass" type reward, analogous with "site pass", but directed at TV or cable or Internet channels for example with settings for content optionally as shown with respect to the site pass settings of FIG. 23. Since TV and cable channels may be found on the Internet, or alternatively, since computers may display television channels, the site pass may include a channel number or channel name and associated time and content settings as well. One or more embodiments may phrase this as a channel pass or as a site pass since the line is blurring between television and video from the Internet. Hence, the set top box, or computer associated with the agreement performer may include the information throttle or both.

According to one or more embodiments of the invention, the information throttle may perform the action based on one or more of a site pass, a reward or a partial reward, as selected. As such, in at least one embodiment, the site may include a list of websites, amount of time of enabled access and/or expiration of time thereof. For example, if the agreement performer 101 performs the actions required based on multiple conditions, such as taking out the trash and completion of assignments and/or homework, the agreement performer may receive more than one reward, such as one or more site passes and/or other rewards such as monetary rewards and rewards at the discretion of the agreement creator 102.

In one or more embodiments, the agreement creator 102 may select the remind me awards option. Once selected, in at least one embodiment, the agreement creator 102 may be reminded, via the agreement monitor, that the agreement performer 101 has complied with the required conditions and performed the action(s) and for example remind the agreement creator that the agreement performer should receive at least one reward.

In one or more embodiments, a partial reward may be associated with a time-based and/or quantity-based partial activity performed by the agreement performer 101. For example, the agreement performer 101 may study for an upcoming exam, as scheduled, by studying for a limited amount of time per day for a number of days. As such, the agreement performer 101 may receive a reward, such as one site pass, per day for each of the days the agreement performer studies. As one of ordinary skill in the art would appreciate, other rewards may be given to the agreement performer, as well as other types of partial activities may be monitored, other than studying for an exam, are in keeping with the scope of the invention.

In at least one embodiment of the invention, the condition selected to add may include a list of one or more conditions, wherein the agreement monitor may allow the agreement performer 101 to pick from the list that results in a higher compliance ratio. As such, for example, instead of forcing a reward onto the agreement performer 101, the agreement performer 101 is able to select a desired one or more rewards, such as selecting a movie ticket versus money, and the agreement performer 101 would be more apt to complete the required tasks as entered by the agreement creator 102 at conditions screen 1801. As one of ordinary skill in the art would appreciate, any other combination of rewards is in keeping with the scope of the invention.

According to at least one embodiment of the invention, the rewards and/or tokens may be tied to existing point systems, for example if capable of external access and/or integration, in order to provide the agreement performer(s) with the necessary token(s) and/or reward(s).

FIG. 23 illustrates an embodiment of a screen that accepts entry of settings for the site pass associated with a particular website after accepts of an "off" entry for the "access all sites" user interface element. At site pass screen 2201, the agreement creator 102 may select the access all sites option in order to select an "on" entry or an "off entry" to access all sites. In one or more embodiments, the agreement creator 102 may select and accept the "off" entry to access all sites, in which a site pass screen 2301 may then be displayed showing a list of websites entered by the agreement creator 102. In at least one embodiment, the agreement creator 102 may then select which sites may be accessed by the agreement performer 101, or opt to select no sites allowed to be accessed by the agreement performer 101.

Figure 24:
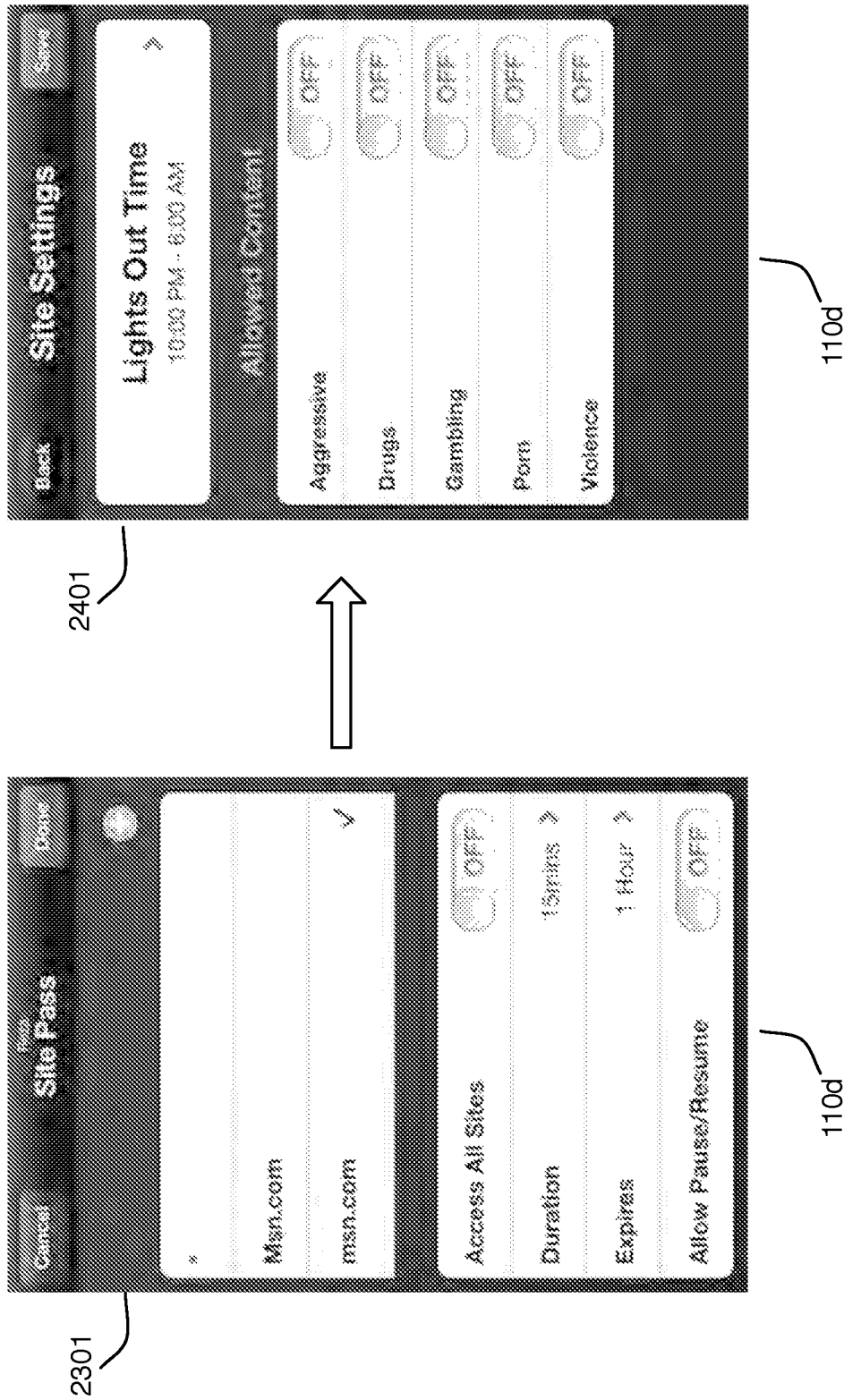
FIG. 24 illustrates an embodiment of a screen that accepts entry of a "lights out time" and "allowed content" settings for the particular website, or alternatively for all or any portion of electronic communications.

FIG. 24 illustrates an embodiment of a screen that accepts entry of a "lights out time" and "allowed content" settings for the particular website, or alternatively for all or any portion of electronic communications. At screen 2301, the agreement creator may select one or more sites of the list of sites displayed in order to control one or more settings of the selected one or more websites. Once a site has been selected, such as "msn.com" as shown, a site settings screen 2401 is displayed. Site settings screen 2401, in at least one embodiment, allows the agreement creator 102 to select a lights out time option, specifying a lights out time associated with the selected agreement performer 101, such as a duration of time from a start time to an end time. In addition, in at least one embodiment, at the site setting screen 2401, the agreement creator may determine and select allowed content settings for the selected website. Although not limited to, the allowed content settings may include "on" and "off" entry selections for one or more of aggressive content option, drugs content option, gambling content option, porn content option and violence content option, allowing the agreement creator 102 to select allowed content for each selected website from the list of websites.

Figure 25:
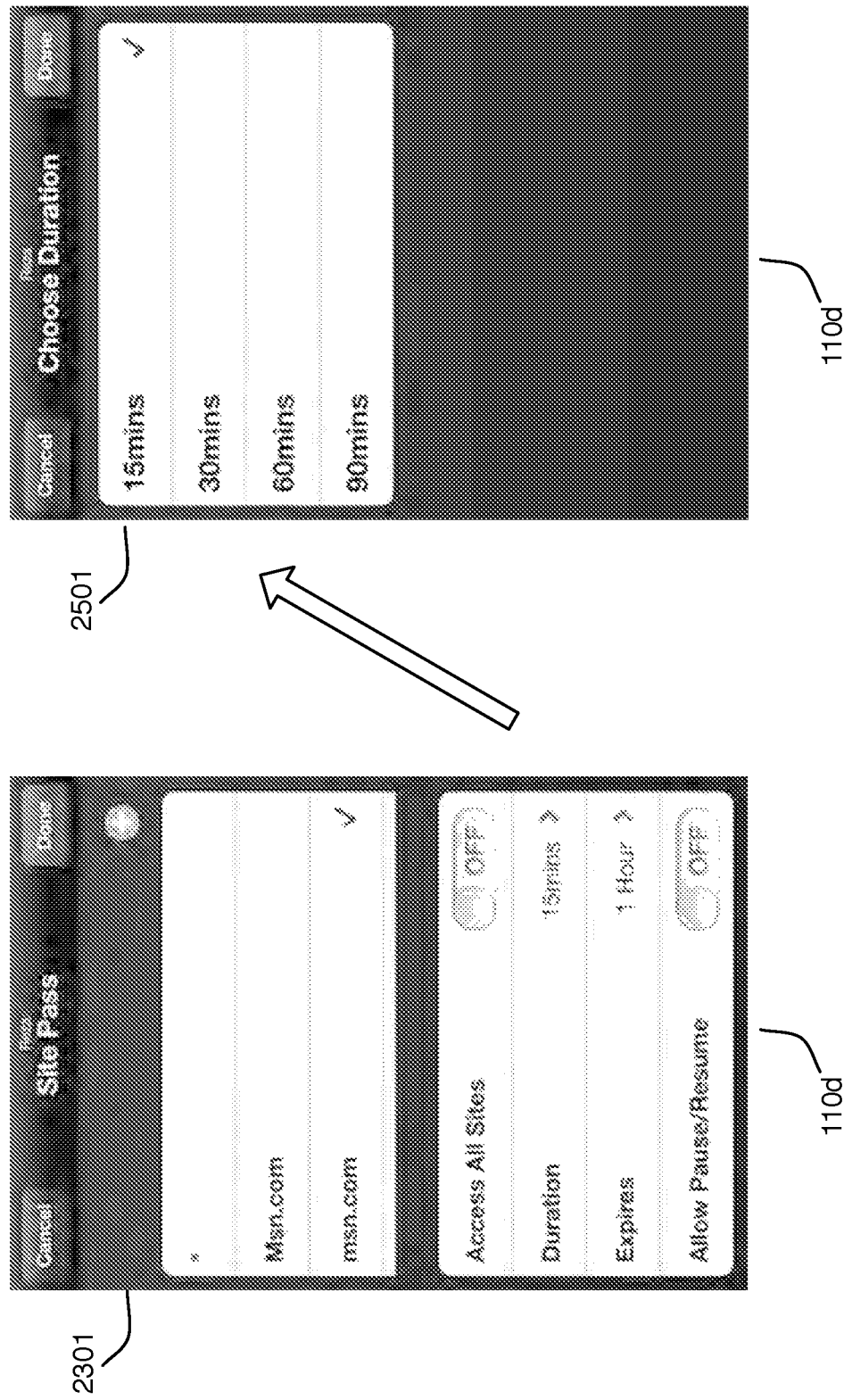
FIG. 25 illustrates an embodiment of a screen that accepts entry of duration for the site pass.

FIG. 25 illustrates an embodiment of a screen that accepts entry of duration for the site pass. At site pass screen 2301, according to one or more embodiments of the invention, the application allows the agreement creator 102 to select the durations option, which then displays a choose duration screen 2501. In at least one embodiment, the choose duration screen 2501 allows the agreement creator 102 to enter a duration for the site pass selected, using a selection of a number of minutes or hours.

Figure 26:
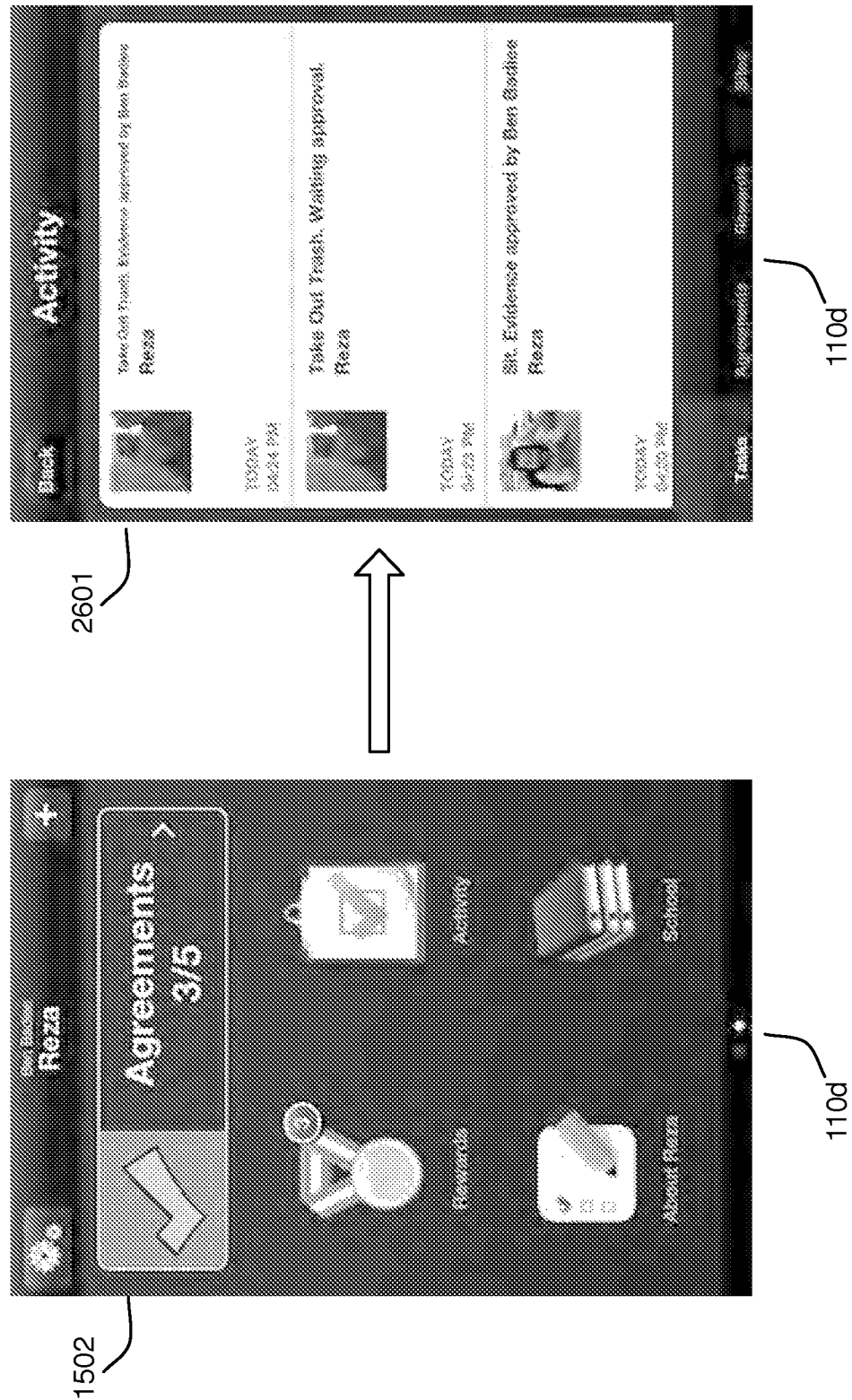
FIG. 26 illustrates an embodiment of a screen that is accessed from the main screen and which shows activity/status of various tasks associated with one or more agreement performer.

FIG. 26 illustrates an embodiment of a screen that is accessed from the main screen and which shows activity/status of various tasks associated with one or more agreement performer. At main screen 1502, the agreement creator may select the activity option associated with the selected agreement performer 101. Once the activity option is selected, in at least one embodiment, the application displays an activity screen. In one or more embodiments, the activity screen may display a tasks tab, agreements tab, rewards tab and a sites tab. At the activity screen 2501, the agreement creator 102 may select any tab from the tasks tab, agreements tab, rewards tab and sites tab, in order to display a list of tasks, agreements, rewards and sites, respectively, associated with the selected agreement performer 101. In at least one embodiment, when the tasks tab is selected, the activity screen may display an activity-tasks screen 2601, listing the one or more tasks required to be completed by the selected agreement performer 101, the status of the one or more tasks required to be completed by the selected agreement performer 101 and an associated status time, and whether the one or more tasks have been approved by the agreement creator 102 and associated approval time.

Figure 27:
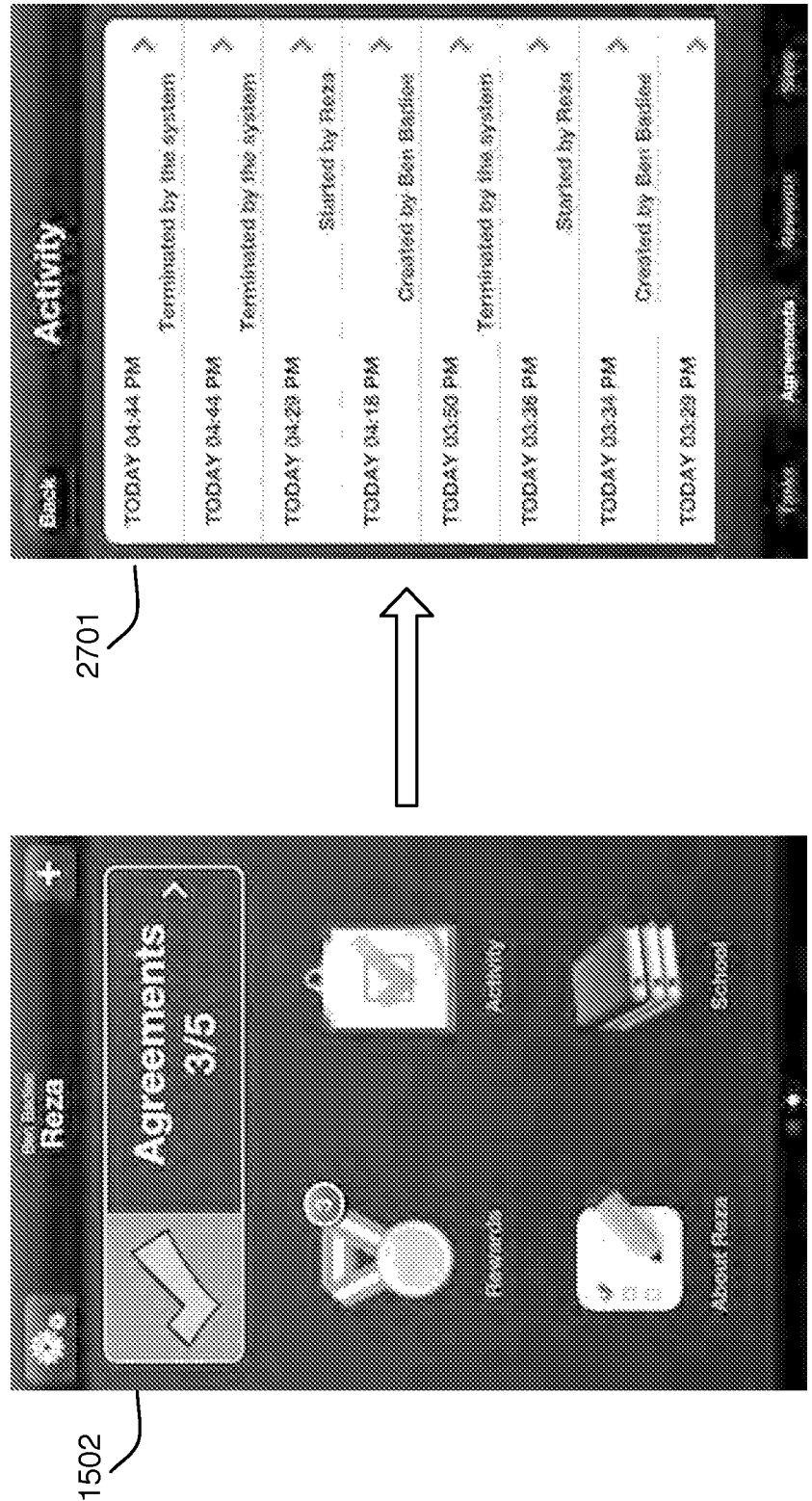
FIG. 27 illustrates an embodiment of a screen that is accessed from the main screen and which shows activity/status of various agreements associated with one or more agreement performer.

FIG. 27 illustrates an embodiment of a screen that is accessed from the main screen and which shows activity/status of various agreements associated with one or more agreement performer. In at least one embodiment, when the agreements tab is selected, the activity screen may display an activity-agreements screen 2701, listing the one or more entered agreements and status thereof associated with the selected agreement performer 101. In one or more embodiments, each agreement listed from the list of agreements at activity-agreements screen 2701 displays the start time, termination time and creation time, as started, terminated and/or created by one or more of the agreement performer 101, the agreement creator 102 and/or by the application.

FIG. 28 illustrates an embodiment of a screen that is accessed from the main screen and which shows activity/status of various rewards associated with one or more agreement performer. In at least one embodiment, when the rewards tab is selected, the activity screen may display an activity-rewards screen 2801, listing the one or more entered rewards and status thereof associated with the selected agreement performer 101. In one or more embodiments, each rewards listed from the list of rewards at activity-rewards screen 2801 displays the selected one or more reward as selected by either the agreement performer 101 and/or the agreement creator 102, and the status time thereof. In at least one embodiment, the status time displayed for each of the one or more rewards displays the day and time of when the reward was selected and activated by the agreement performer 101 and/or the agreement creator 102.

Figure 29:
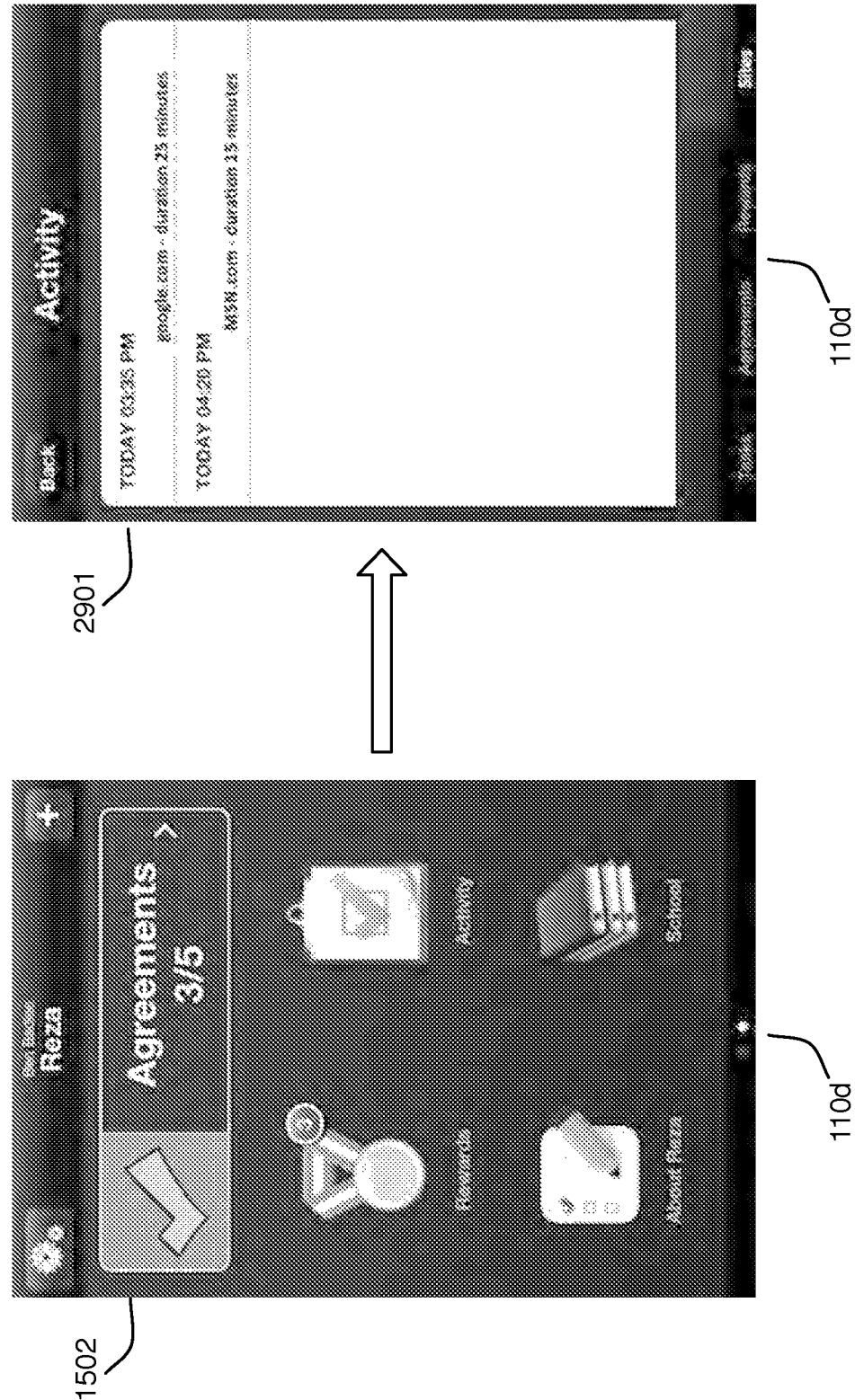
FIG. 29 illustrates an embodiment of a screen that is accessed from the main screen and which shows activity/status of various websites surfed by one or more agreement performer.

FIG. 29 illustrates an embodiment of a screen that is accessed from the main screen and which shows activity/status of various websites surfed by one or more agreement performer. In at least one embodiment, when the sites tab is selected, the activity screen may display an activity-sites screen 2901, listing the one or more websites accessed and/or surfed by the selected agreement performer 101, time of access and time access or surfing duration time thereof. In at least one embodiment, the status time displayed for each of the one or more websites displays the day and time of when the website was accessed and surfed by the agreement performer 101.

FIG. 30 illustrates an embodiment of a screen that is accessed from the main screen and which enables coupling with a school's calendar or other schedule to enable access of locations and times of particular activities and/or classes for schedule and location responsive agreement compliance controlled information throttle processing. At main screen 1502, the agreement creator may select the school option associated with the selected agreement performer 101. Once the school option has been selected, the application displays a school screen 3001. In one or more embodiments, the school screen 3001 displays a school name entry option and a calendar "URL" option for the agreement creator 102 to enter respective information into. As such, in at least one embodiment, the school screen 3001 allows the application to couple with a school's calendar or other schedule, associated with the selected agreement performer 101, from one or more agreement performers, to enable access of locations and times of particular activities and/or classes for schedule and location information associated with the selected agreement performer 101. This enables the application to control information throttle based on the locations and times of particular activities and/or classes for schedule and location information of the selected agreement performer 101.

Figure 31:
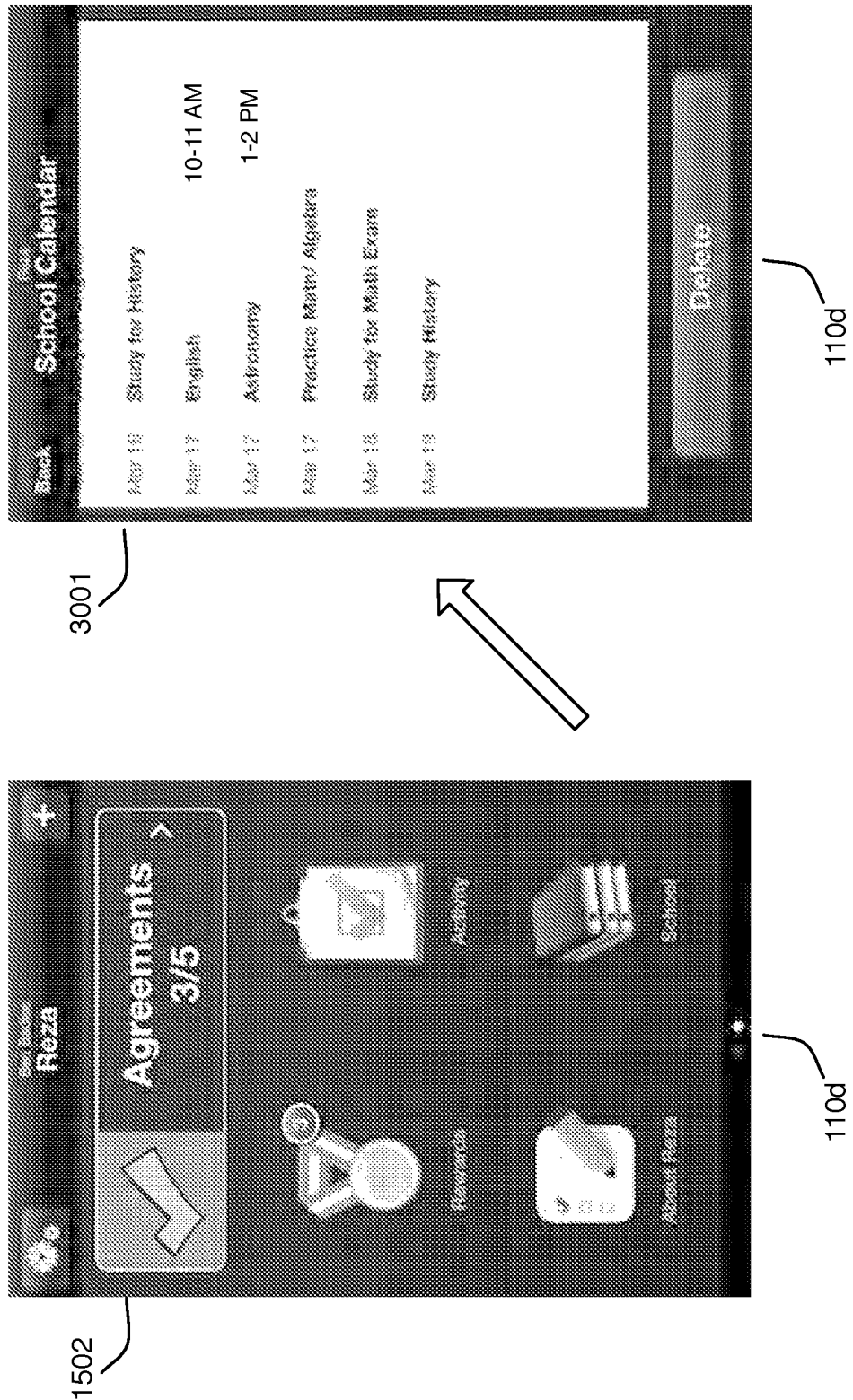
FIG. 31 illustrates an embodiment of a screen that is accessed from the main screen and which displays a school's calendar associated with a particular agreement performer.

FIG. 31 illustrates an embodiment of a screen that is accessed from the main screen and which displays a school's calendar associated with a particular agreement performer. Once coupled with the entered school's calendar, the school screen 3001 may then display a school calendar screen lists scheduled dates, times and duration of one or more classes, activities and/or school tasks associated with the selected agreement performer 101. In at least one embodiment of the invention, the school calendar screen may display a delete option button enabling the agreement creator 102 to delete one or more of the listed scheduled dates, times and duration of one or more classes, activities and/or school tasks associated with the selected agreement performer 101.

Figure 32:
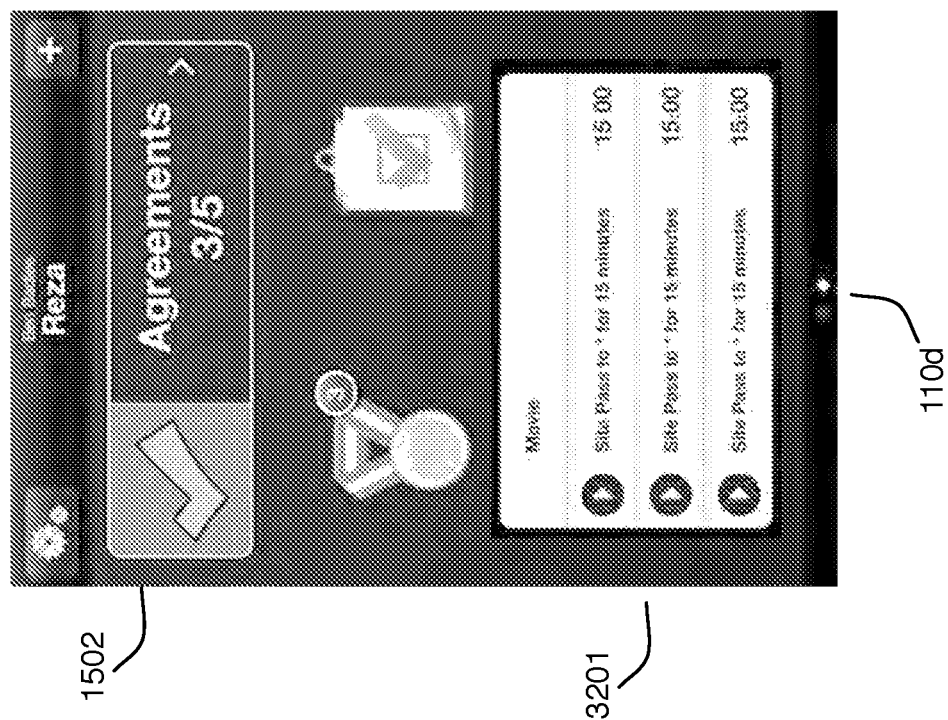
FIG. 32 illustrates an embodiment of a screen that displays rewards in a popup menu.

FIG. 32 illustrates an embodiment of a screen that displays rewards in a popup menu. At main screen 1502, in one or more embodiments, once the rewards option is selected, the application may display a rewards list 3201, listing one or more rewards associated with the agreement performer 101. For example, in at least one embodiment, the list of one or more rewards may include a movie and one or more site passes with associated time durations allowed for each of site pass listed or any other type of rewards. Although shown as a pop-up, a separate screen may be implemented to display the information in one or more embodiments.

In one or more embodiments, a partial reward may be associated with a time-based and/or quantity-based partial activity performed by the agreement performer 101. For example, the agreement performer 101 may study for an upcoming exam, as scheduled, by studying for a limited amount of time per day for a number of days. As such, the agreement performer 101 may receive a reward, such as one site pass, per day for each of the days the agreement performer 101 studies. As one of ordinary skill in the art would appreciate, other rewards may be given to the agreement performer, as well as other types of partial activities may be monitored, other than studying for an exam, are in keeping with the scope of the invention.

According to at least one embodiment of the invention, the action may be associated with one or more monetary rewards, such that the one or more monetary rewards may be provided to the agreement performer 101 based on the compliance by one or more of the agreement creator 102 and one or more third party users. In at least one or more embodiments, the one or more monetary rewards may be associated with a financial institution, such that the one or more third party users may increase, or add onto, the one or more monetary rewards based on the monitored information. For example, in at least one embodiment, monetary rewards may be placed in a financial institution, such as a bank, and tracked in the agreement database. As such, one or more agreement creators or other third party users, such as one or more of friends, professors, teachers, local businesses, colleges and/or universities, may sign up to match the monetary rewards provided in the financial institution and add onto the monetary rewards, giving the agreement performer an incentive to perform the required activities and/or tasks.

Figure 33:
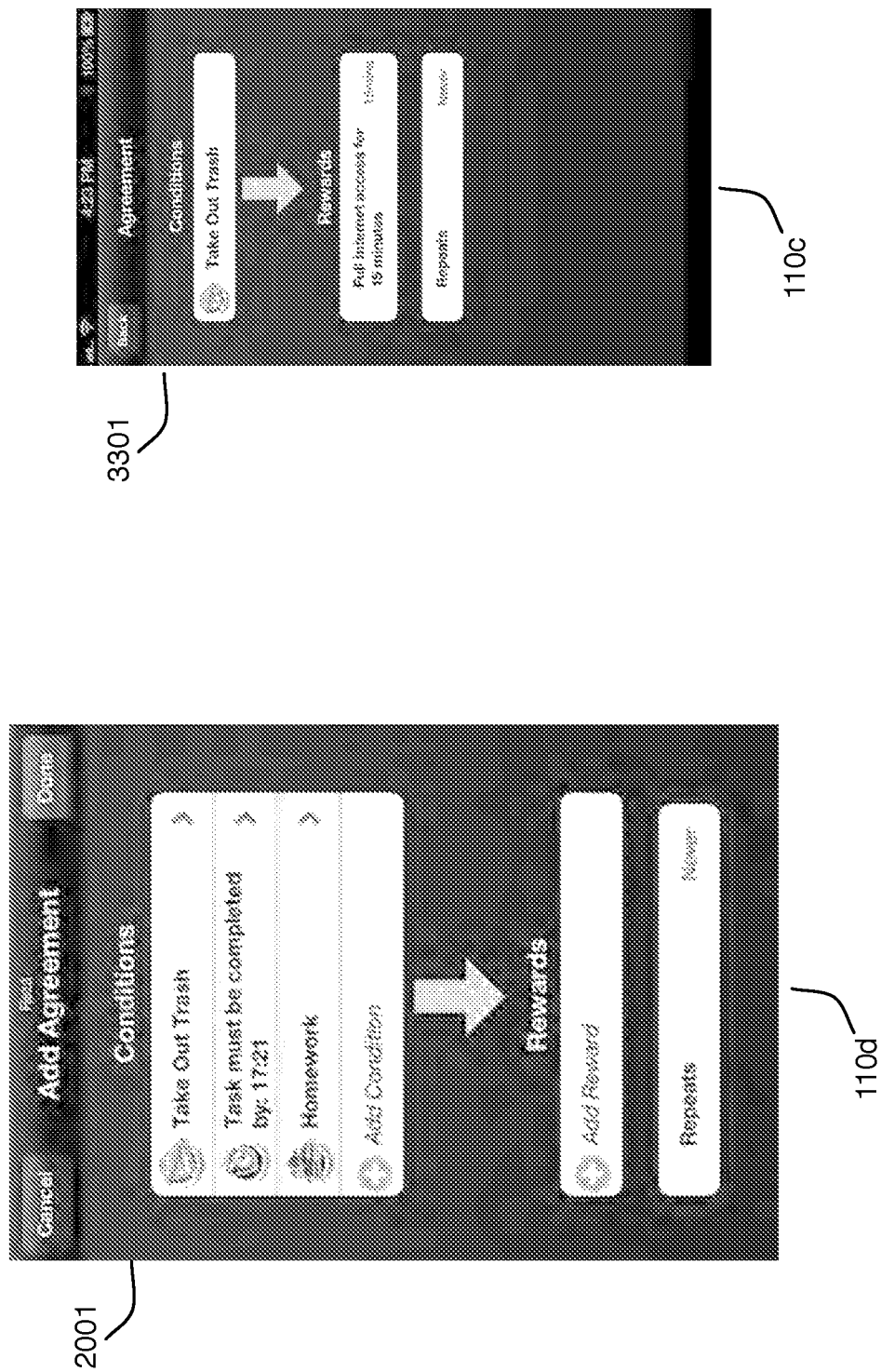
FIG. 33 illustrates an embodiment of an agreement screen implementation executing on the computer associated with the agreement performer along with the corresponding agreement screen executing on the computer associated with the agreement performer, shown on the right for example executing on a cell phone.

FIG. 33 illustrates an embodiment of an agreement screen implementation executing on the computer associated with the agreement performer along with the corresponding agreement screen executing on the computer associated with the agreement performer, shown on the right for example executing on a cell phone. At the add agreements screen 2001, the selected conditions and the associated rewards selected, by the agreement creator 102 are displayed. In at least one embodiment, the selected agreement may be displayed on an agreement performer agreements screen 3301 on one or more of the agreement performer's electronic devices 110*a,* 110*b,* 110*b*1 and 110*c,* shown here by example as a screen associated with a music player in a car to exemplify the wide range of displays that embodiments may utilize. As such, the agreement performer 101 may monitor the agreements, conditions and rewards associated therewith as created by the agreement creator 102 on electronic device 110*d.*

Figure 34:
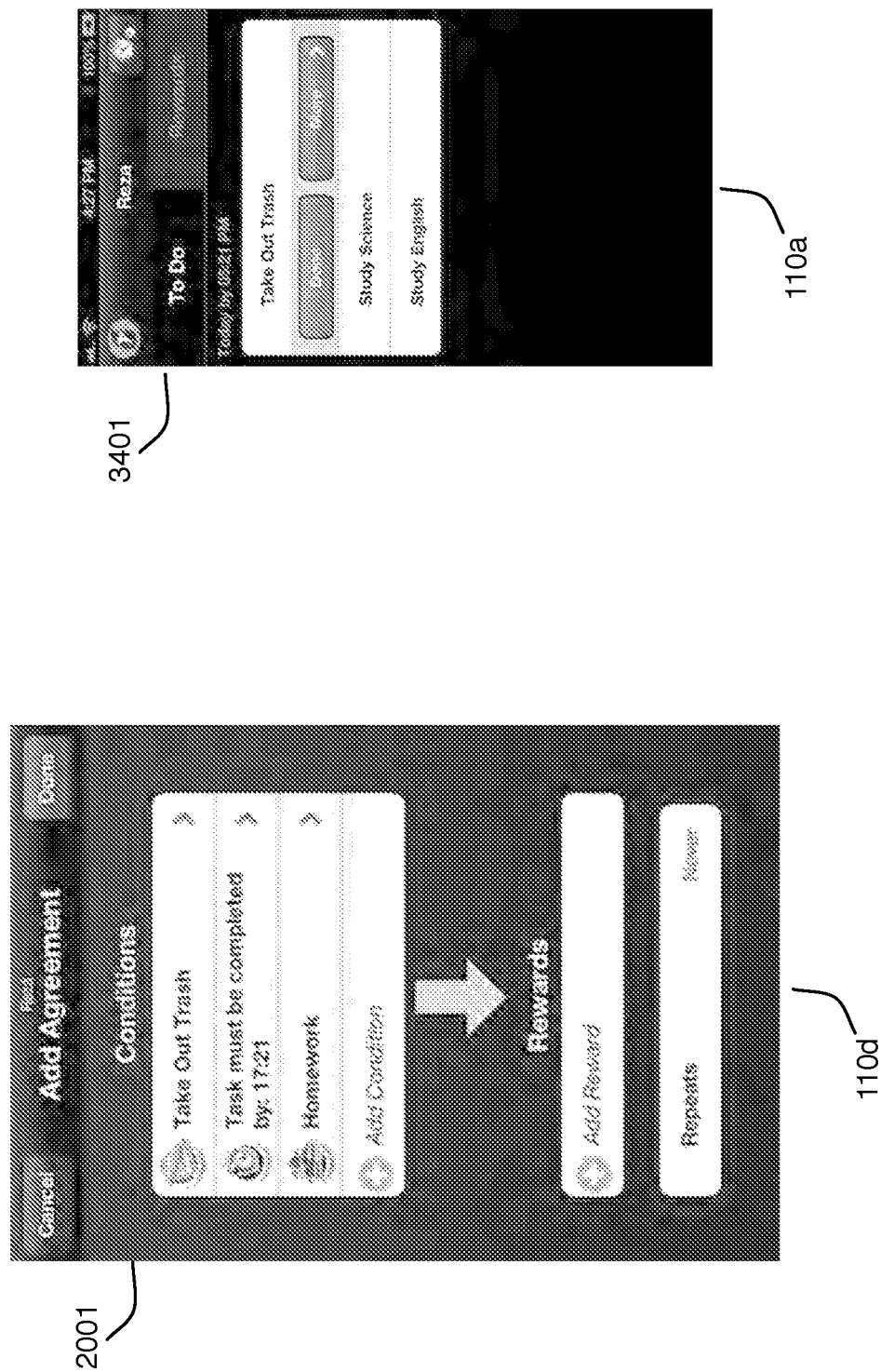
FIG. 34 illustrates an embodiment of a screen that accepts input from the agreement performer to assert completion of one of the tasks associated with a condition of the agreement.

FIG. 34 illustrates an embodiment of a screen that accepts input from the agreement performer to assert completion of one of the tasks associated with a condition of the agreement. Using one or more agreement performer electronic devices 110*a,* 110*b* and/or 110*c,* a task status screen 3401 is displayed, allowing the agreement performer 101 to assert completion of the required tasks, as created by the agreement creator 102 on electronic device 110*d.* Task status screen 3401, in at least one embodiment, may display a done option button and a more option button for the agreement performer 101 to select one or more of to assert completion of the one or more tasks. In one or more embodiments, the camera on the mobile device may be utilized to authenticate or identify the user setting the status or using the electronic device to be throttled or any combination thereof.

Figure 35:
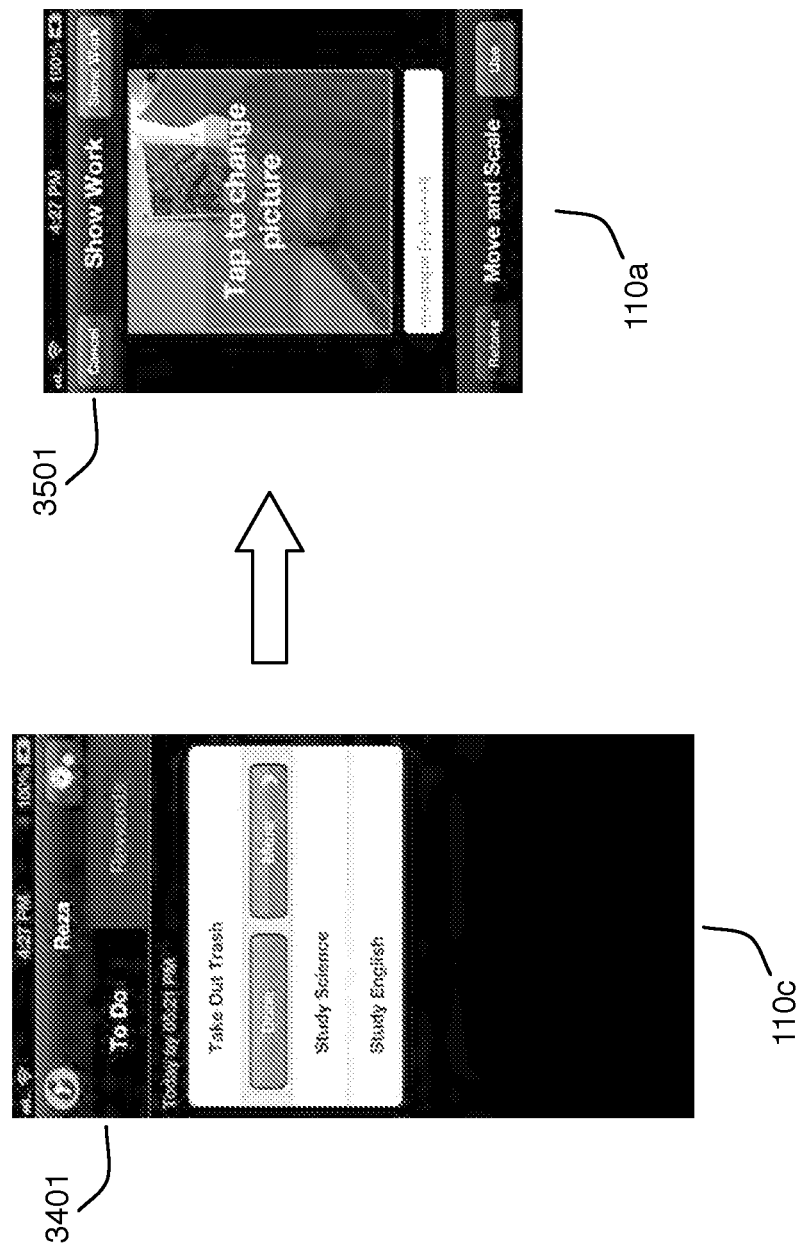
FIG. 35 illustrates an embodiment of a screen that accepts an image or video input from the electronic device associated with the agreement performer to submit proof in order to prove that the task has been completed.

FIG. 35 illustrates an embodiment of a screen that accepts an image or video input from the electronic device associated with the agreement performer to submit proof in order to prove that the task has been completed. At task status screen 3401, once the agreement performer selects the more option button, electronic device 110*c* or any other devices, may then display a show work screen 3501, for example electronic device 110*a,* for example that includes a camera. In at least one embodiment, the show work screen 3501 allow the agreement performer 101 to input an image or a video, or any other proof, in order to assert completion of the required one or more tasks, to be viewed by the agreement creator 102 using electronic device 110*d.* For example, if the task required to be completed by the agreement performer 101 is to take out the trash, the agreement performer 101 may take a picture of the completed task as proof, trash taken out, to be viewed by the agreement creator 102.

Figure 36:
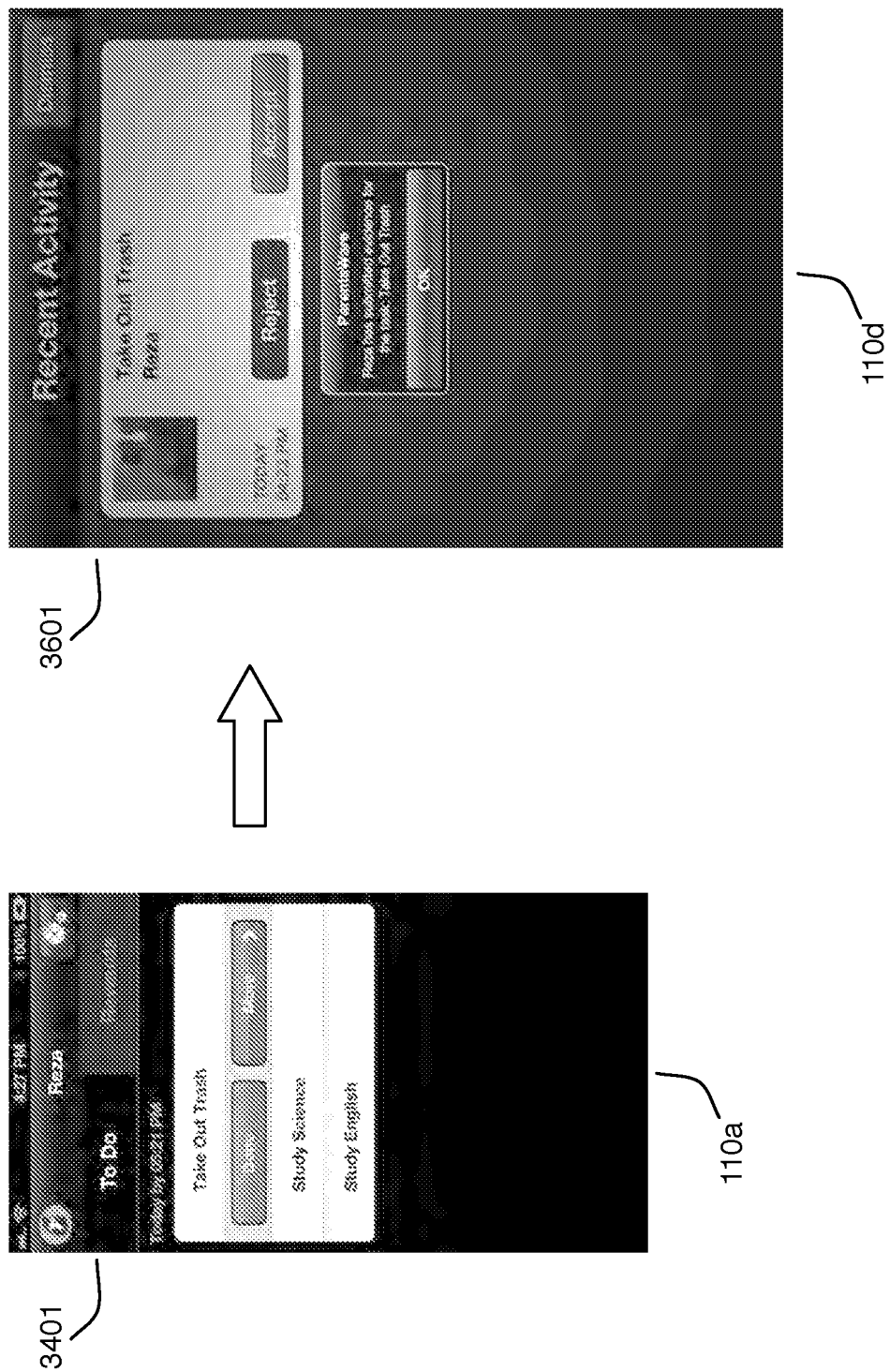
FIG. 36 illustrates an embodiment of a screen that enables the agreement creator to view the proof electronically communicated through the system, and accept or reject the completion status of the task as submitted and received from the agreement performer.

FIG. 36 illustrates an embodiment of a screen that enables the agreement creator to view the proof electronically communicated through the system, and accept or reject the completion status of the task as submitted and received from the agreement performer. In at least one embodiment, the agreement monitor and the agreement creator's electronic device 110*d* may accept at least one image or video, or proof, to confirm the compliance from the agreement performer 101 or the agreement creator 102 if the proof, image or video has been obtained remotely. As such, at screen 3601 of electronic device 110*d,* the agreement creator 102 may accept or reject the at least one image, video or proof sent by the agreement performer 101 as assertion for task completion. Optionally a text message may be sent back and forth or in either direction along with the completion status so that the agreement performer and agreement creator may explain or discuss the status in further detail.

Figure 37:
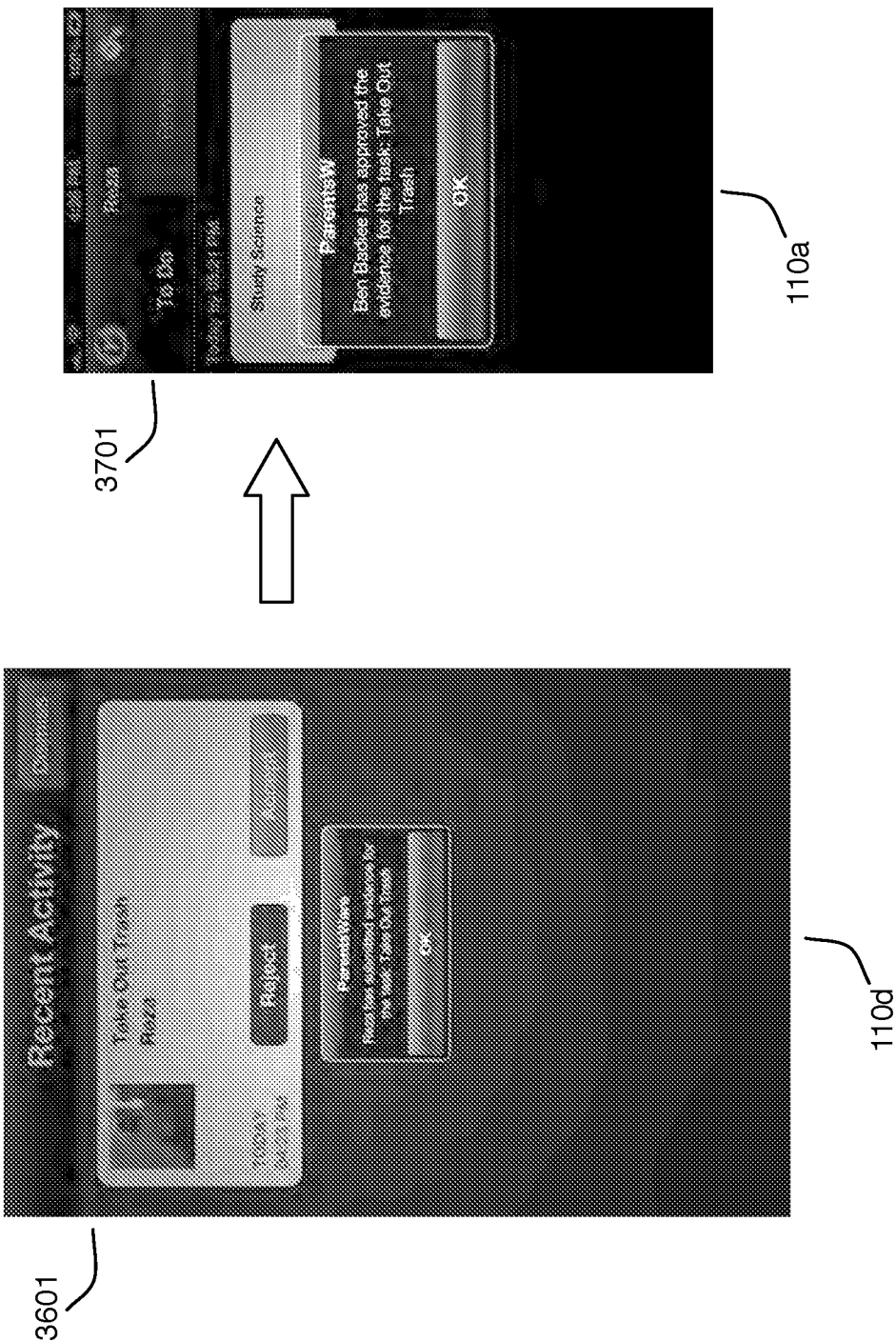
FIG. 37 illustrates a screen that enables the agreement performer to view the acceptance or rejection of the completion status of the task as determined by the agreement creator.

FIG. 37 illustrates a screen that enables the agreement performer to view the acceptance or rejection of the completion status of the task as determined by the agreement creator. In or more embodiments, once the agreement creator 102 has accepted or rejected the one or more image, video or proof from the agreement performer 101, a screen 3701 may be displayed on agreement performer's electronic device 110*a* displaying the approval or disapproval status as determined by agreement creator 102. In at least one embodiment, screen 3701 may display a pop-up screen with a status message illustrating the approval or disapproval from the agreement creator 102.

Figure 38:
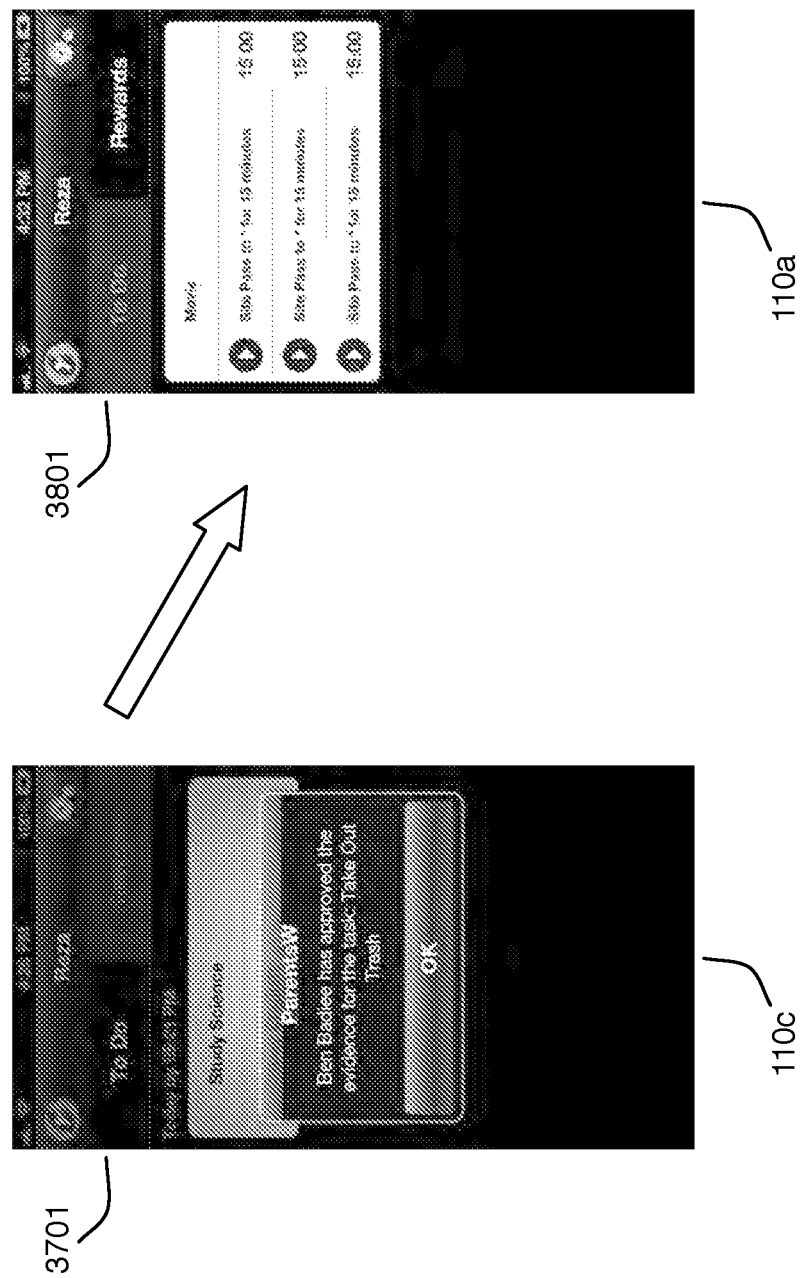
FIG. 38 illustrates a screen that enables the agreement performer to view the list of rewards received through completion of various tasks.

FIG. 38 illustrates a screen that enables the agreement performer to view the list of rewards received through completion of various tasks. By way of one or more embodiments, the at least one electronic device may provide a list of rewards and may accept a selection of a particular reward from the agreement performer 101 using electronic device 110*a.* As such, the agreement performer 101 may be provided with a list of rewards at screen 3801, that may result in a much higher compliance, in that the agreement performer 101 may be allowed to pick one or more rewards to apply at a certain time, giving the agreement performer 101 more inventive to complete the required activity to gain the selected reward(s).

In at least one embodiment, the list of rewards may be categorized based on one or more categories selected from one or more of an age group, sex and behavioral patterns. In one or more embodiments, the electronic device 110*a* may provide recommendations to the agreement performer 101 for one or more rewards from the list of rewards and from the one or more categories prior to accepting the selection from the agreement performer 101.

In one or more embodiments of the invention, one or more businesses and/or companies may provide free samples, trial offers, coupons, discounts, etc., to use as rewards for the agreement performer(s). In addition, in at least one embodiment, one or more businesses and/or companies may provide product feedback(s) and/or survey(s) for the agreement performer and/or the agreement creator to respond to.

Figure 39:
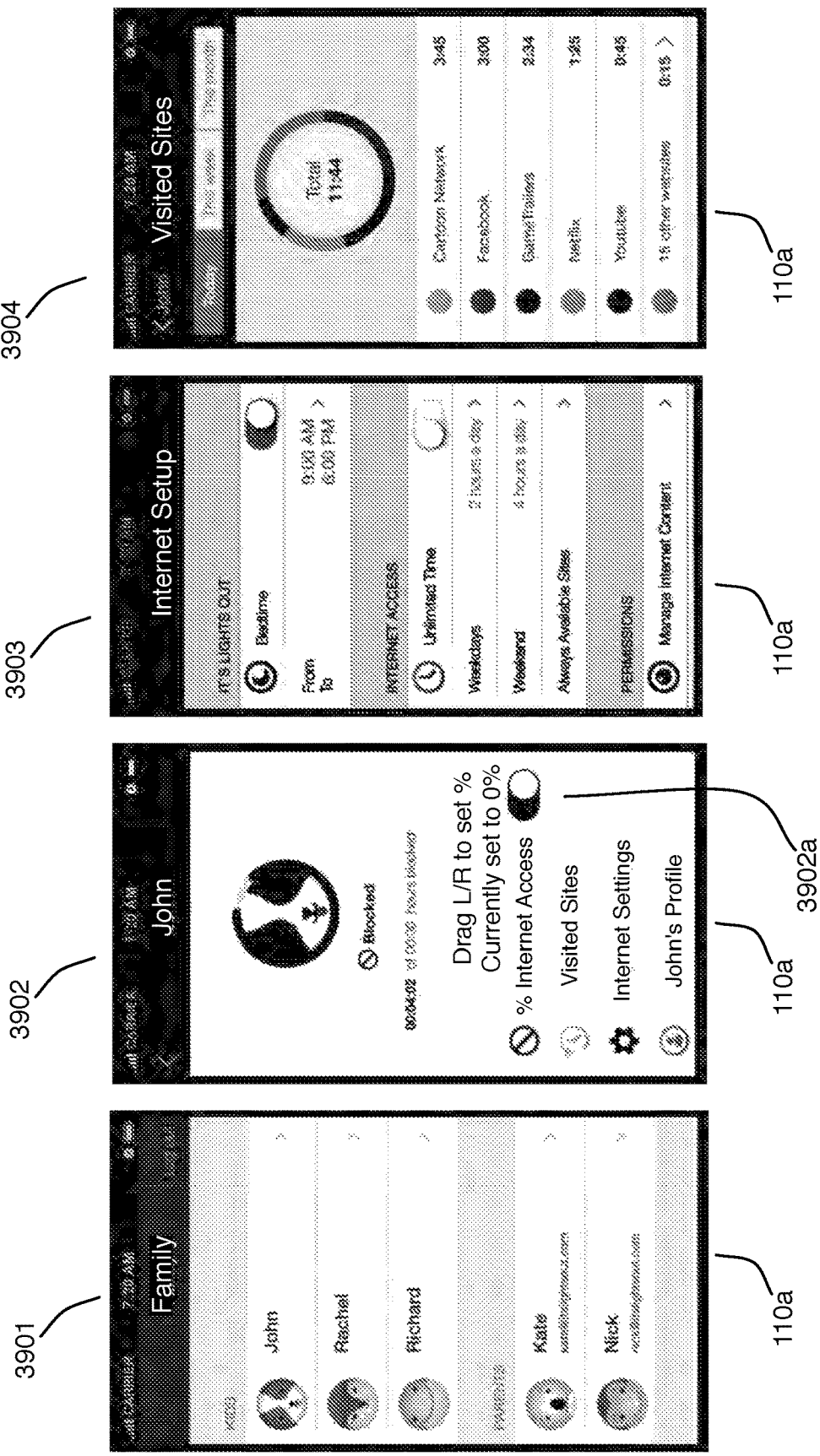
FIG. 39 illustrates another embodiment of the displays for a particular family, showing multiple children in the top portion of display 110a, for example as shown on a parent's mobile phone along with two parents in the leftmost screen. The second screen from the left shows that a slider to throttle Internet access may be utilized to shut off, enable or at least partially increase or decrease at least one electronic device associated with an agreement performer, such as child "John" in this example. The third screen from the left shows the various Internet access times for "lights out" settings, in this case showing that the agreement performer may access the Internet between 9 AM and 6 PM, for 2 hours a days during the week and 4 hours a day on the weekend. Screens to accept inputs associated with websites that may always be accessible and others with permissions may also be accessible from this screen in one or more embodiments. The fourth screen from the left shows the reporting features of this embodiment, showing the websites that the agreement performer has accessed and the times of access of each site. The time limits for each site may be set in one or more embodiments by double tapping on the site for example.

FIG. 39 illustrates another embodiment of the display for a particular family 3901, showing multiple children in the top portion of display 110*a,* for example as shown on a parent's mobile phone along with two parents in the leftmost screen. The second screen from the left 3902 shows that a slider 3902*a* to throttle Internet access may be utilized to shut off, enable or at least partially increase or decrease at least one electronic device associated with an agreement performer, such as child "John" in this example. Other embodiments may employ an on/off button if desired. The third screen from the left 3903 shows the various Internet access times for "lights out" settings, in this case showing that the agreement performer may access the Internet between 9 AM and 6 PM, for 2 hours a days during the week and 4 hours a day on the weekend. Screens to accept inputs associated with websites that may always be accessible and others with permissions may also be accessible from this screen in one or more embodiments. The fourth screen from the left 3904 shows the reporting features of this embodiment, showing the websites that the agreement performer has accessed and the times of access of each site. The time limits for each site may be set in one or more embodiments by double tapping on the site for example.

One or more embodiments may partially throttle performance of an electronic device without fully disabling the device. FIG. 40 illustrates an embodiment that partially throttles performance of mobile phone 110*a* used by agreement performer 101. Agreement 4001 between agreement performer 101 and the agreement creator (such as for example a parent) stipulates that the performer 101 must achieve result 4002 on a test activity or in a course. Action 4003 is a consequence for noncompliance with condition 4002. The condition 4002 and action 4003 are illustrative; one or more embodiments may incorporate any condition on any activity of a performer into an agreement, and may partially throttle performance of a device using any action that affects the device's performance or functionality. In this example, the action 4003 taken if condition 4002 is not met is to slow down the Internet browser on the device 110a. This action is a partial information throttle because the device 110a remains usable, and in this example the browser also remains usable albeit with poorer performance. In the scenario illustrated in FIG. 40, the activity database 180d contains the result of the test activity, which in this case does not satisfy condition 4002. The agreement monitor 161 therefore determines that condition 4002 is not satisfied, and it commands information throttle 130 to carry out action 4003 on device 110a. The partial throttling in this example applies only to application 4010, the Internet browser. The application 4010 is not completely disabled; instead its performance is reduced, in this case by inserting delays 4012 between the entry of information 4011 (a web address entered into the address bar of the browser) by user 101 and the response with a loaded web page. In this example, other applications such as text messaging application 4020 are not throttled; for example, no delays are inserted between the entering of message 4021, the transmission of that message, and the receipt of response 4022. This example is illustrative; one or more embodiments may partially throttle any application or service or any combination of applications and services. Partial reductions in performance may comprise, without limitation, disabling of a subset of applications or services on a device, insertions of delays, reductions in execution speed, reductions in quality of display or audio outputs, reductions in display size, reductions in maximum volume, limitations on features, disabling of selected features, reductions in access to information or to information sources, reductions in allowed amount of information viewed or transferred in a time period, or limitations on speed or acceleration in a vehicle.

One or more embodiments may increase performance when an agreement performer satisfies conditions such as condition 4002 of agreement 4001. For example, in the embodiment shown in FIG. 40, if agreement performer's subsequent test satisfies condition 4002, the information throttle 130 may reverse the action 4003 and may remove delays 4012 from the browser, thereby increasing the browser's performance back to its original level. In one or more embodiments the information throttle 130 may reduce performance of all or selected applications and services by default, and may increase performance only when condition 4002 is satisfied.

One or more embodiments may partially throttle performance of an electronic device by disabling one or more applications or services on the device. For embodiments that partially throttle performance, the device remains usable because the information throttle may not disable all of the applications and services on the device. FIG. 41 illustrates an example of partial throttling by disabling selected applications and services. Agreement performer 101 is using electronic device 110a, which has applications and services shown on home screen 4100. Initially four applications and services are available and enabled, including phone service 4101, music player app 4102, game app 4103, and educational app 4104. Based on an agreement, the information throttle 130 executes action 4003a to partially throttle the device 110a. In this example, the action 4003a disables apps and services other than the phone service and the educational apps. Thus the new home screen 4100a of the device after throttling has available service 4101a and available app 4104a, but music player 4102a and game app 4103a are disabled (shown in the figure as greyed out). One or more embodiments may throttle any desired number or any desired subset of applications and services. One or more embodiments may classify applications or services into categories, and may selectively disable specific categories. For example, one or more embodiments may disable game applications or entertainment applications, while not disabling essential services like phone or educational applications. In one or more embodiments, the disabling of applications or throttling may be based on schedule and location as well and may be utilized in a corporate setting or educational setting to disable a camera in areas not authorized for picture taking, may disable the microphone or ability to save data for example if the agreement pertains to a particular area and/or schedule. Embodiments for corporate use may be employed for "Bring Your Own Device" or BYOD environments wherein features or apps that are not allowed at work or during work hours are disabled or partially throttled or alternatively enabled for use at work but not at home.

FIG. 41 illustrates an embodiment that performs partial throttling of a device by disabling a subset of the applications and service on the device. Instead of (or in addition to) completely disabling selected applications or services, one or more embodiments may perform partial throttling by reducing the performance of selected application or services. Applications and services that are throttled for reduced performance may remain usable, but with reduced capabilities. One or more embodiments may reduce the performance of selected applications or services in any desired manner. FIG. 42 illustrates an example that reduces audio performance of a selected application to achieve partial throttling of a device based on compliance with an agreement. Agreement performer 101 is using music player application 4201 on device 110a, and has set the volume control to a very high volume level 4202, resulting in a high volume output 4203. Information throttle 130 performs action 4003b, since the agreement performer is not in compliance with a condition of the agreement for homework completion. This action 4003b reduces the maximum audio output volume of the music player 4201. Thus the volume level is reduced to 4202a by the information throttle 130, resulting in a lower output volume 4203a. In this example the user 101 is unable to return the volume to level 4202 after the action 4003b occurs, because the action limits the maximum output volume for this application. In this example, only the output volume of the musical player app 4201 is affected; other applications and services may have normal volume levels and full volume controls.

FIG. 43 illustrates an embodiment that reduces performance of a selected application by disabling a subset of the application's features. Agreement performer 101 is using music player application 4201 on device 110a. Prior to throttling, there are four features available on the music player app: playlists feature 4301, radio feature 4302, sharing feature 4303, and buying feature 4304. The agreement performer is initially using feature 4304 to browse for new tracks to purchase. Information throttle 130 executes partial throttling action 4003c, since the agreement performer is not in compliance with the condition that requires completing homework. This action disables selected features of the app 4201, specifically the sharing feature 4303 and the buying feature 4304. The app 4201 is not completely disabled since it remains usable, but with reduced functionality. After throttling action 4003c, features 4301a and 4302a are still available, but features 4303a and 4304a are disabled and are shown as greyed out.

FIG. 44 illustrates an embodiment that reduces performance of a selected application by causing the application to run in a smaller window on the display with reduced resolution. Agreement performer 101 is using photo viewing app 4401 on device 110*a*. Prior to throttling the photo 4402 is seen in a full screen, high resolution view on the display of the device. Information throttle 130 executes partial throttling action 4003*d,* since the agreement performer is not in compliance with the condition that requires achieving a minimum grade result. This action 4003*d* reduces the window size for the app to a small window 4401*a* on the display. In addition, the photo 4402*a* is shown at a reduced resolution.

While the invention herein disclosed has been described by means of specific embodiments and applications thereof, numerous modifications and variations could be made thereto by those skilled in the art without departing from the scope of the invention set forth in the claims.

What is claimed is:

1. A partial information throttle system based on compliance with an agreement, comprising:
   an agreement between an agreement creator and an agreement performer, which is stored in an agreement database in a memory of a computer, comprising
     a condition comprising an activity to be performed by said agreement performer, and
     an action to be performed based on compliance with said condition;
   an activity database comprising
     an activity status associated with said activity to be performed by said agreement performer;
   an agreement monitor coupled with said agreement database and said activity database and configured to check said activity status to determine said compliance with said condition;
   an information throttle coupled at least intermittently with said agreement monitor and configured to perform said action on at least one electronic device associated with said agreement performer;
   wherein said agreement database further comprises a first condition having a first activity that is independent of input into said at least one electronic device by said agreement performer;
   wherein said action is configured to direct said information throttle to partially decrease a performance of said at least one electronic device when said condition has not been satisfied, without fully disabling said at least one electronic device wherein said partial decrease of performance of said at least one electronic device further comprises an insertion of at least one time delay between at least two of an acceptance of an input of information into said at least one electronic device, a display of said information on said at least one electronic device, and a transfer of said information to or from said at least one electronic device; and
   wherein said action is further configured to direct said information throttle to reverse said partial decrease of said performance of said at least one electronic device when said agreement performer satisfies said condition, after said partial decrease of said performance occurs, to increase said performance of said at least one electronic device.

2. The partial information throttle of claim 1, wherein said partial decrease of performance of said at least one electronic device comprises at least one of
   disabling one or more application or services on said at least one electronic device without disabling all applications and services on said at least one device, and
   reducing performance of one or more applications or services on said at least one electronic device without completely disabling said one or more applications or services such that said one or more applications or services remain usable with reduced capabilities,
   wherein said reduced performance causes at least one of
     one or more of said one or more features of said one or more applications or services to run more slowly on said at least one electronic device,
     one or more features of said one or more applications or services to be disabled, without disabling all features of said one or more applications or services,
     one or more applications or services to run in a window on a display of said at least one electronic device, wherein said window has one or more of a reduced size, a reduced resolution, a reduced color space, or a reduced brightness, and
     audio output from said one or more applications or services to have one or more of a reduced volume and a reduces sound quality.

* * * * *